US009681165B1

(12) United States Patent
Gupta et al.

(10) Patent No.: US 9,681,165 B1
(45) Date of Patent: Jun. 13, 2017

(54) METHODS AND SYSTEMS FOR ENHANCING MEDIA VIEWING EXPERIENCES ON MULTIPLE DEVICES

(71) Applicant: Rovi Guides, Inc., San Carlos, CA (US)

(72) Inventors: Vikram Makam Gupta, Karnataka (IN); Vishwas Sharadanagar Panchaksharaiah, Tumkur District (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/095,868

(22) Filed: Apr. 11, 2016

(51) Int. Cl.
| | |
|---|---|
| H04N 7/16 | (2011.01) |
| H04N 7/173 | (2011.01) |
| H04N 21/254 | (2011.01) |
| H04N 21/41 | (2011.01) |
| H04N 21/488 | (2011.01) |
| H04N 21/84 | (2011.01) |
| H04N 21/442 | (2011.01) |
| H04N 21/4627 | (2011.01) |
| H04N 21/258 | (2011.01) |
| H04N 21/45 | (2011.01) |

(52) U.S. Cl.
CPC ... *H04N 21/2541* (2013.01); *H04N 21/25891* (2013.01); *H04N 21/4122* (2013.01); *H04N 21/44222* (2013.01); *H04N 21/4532* (2013.01); *H04N 21/4627* (2013.01); *H04N 21/4882* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 6,757,906 B1 * | 6/2004 | Look | ............ | G11B 27/034 348/E5.103 |
| 8,881,193 B2 * | 11/2014 | Gorbatov | ............ | H04N 7/088 725/139 |
| 2004/0034873 A1 * | 2/2004 | Zenoni | ............ | H04N 7/17318 725/135 |
| 2005/0036547 A1 * | 2/2005 | Vetro | ............ | H04N 21/21805 375/240.12 |
| 2007/0033617 A1 * | 2/2007 | Bloebaum | ............ | H04N 5/76 725/58 |
| 2007/0092204 A1 * | 4/2007 | Wagner | ............ | H04N 5/782 386/241 |
| 2007/0196076 A1 * | 8/2007 | Jeong | ............ | H04N 5/775 386/291 |
| 2009/0150553 A1 * | 6/2009 | Collart | ............ | G06F 17/30017 709/229 |
| 2011/0181496 A1 * | 7/2011 | Lanier | ............ | G06Q 20/102 345/2.2 |
| 2015/0070587 A1 * | 3/2015 | Emeott | ............ | H04N 21/4316 348/589 |

(Continued)

*Primary Examiner* — Jason K Lin

(57) ABSTRACT

Methods and systems are described for a media guidance application that enhances the viewing experiences of users consuming media having important content. If a user is prevented from viewing media having important content that will be displayed eminently, the media having the important content may be displayed on a second device. For example, in this manner, a user will not inadvertently miss content from a movie or sports game right before an important scene in the movie or an important play in the sports game is displayed.

20 Claims, 16 Drawing Sheets

(56) References Cited

U.S. PATENT DOCUMENTS

2015/0095949 A1* 4/2015 Kim .................. H04N 21/4826
725/35
2015/0295967 A1* 10/2015 Glazer ................ G06F 3/04847
709/219

* cited by examiner

1700

```
1700 ...
1701 Initialization Subroutine
1702 ...
1703 //Routine to Begin subroutine to identify a content provider of first media from a first
     user equipment device for display on a second user equipment device
1704
1705 Receive a user profile from memory
1706
1107
1708   A = Stored array of user equipment devices associated with the user
1709   B = Stored identifier of the first media asset
1710   C = Stored array of content providers
1711   D = Selected content provider, initially NULL
1712   E = Maximum range of a user equipment device
1713   F = Selected second user equipment device, initially NULL
1714
1715 Execute subroutine to determine a distance of a preferred user equipment device to
     the first user equipment device
1716 If the preferred user equipment device is within a range less than maximum range E
1717       Set F to point to the preferred user equipment device
1718 Else:
1719       Execute subroutine to select a next user equipment device A[i] from array A
1720       Do:
1721             Execute subroutine to identify a distance between user equipment
     device A[i] to the first user equipment device
1722             If the range of user equipment device A[i] to the first user equipment
     device is less than maximum range E { Set F to point to user equipment device A[i]}
1723             Else execute subroutine to select the next user equipment device
     (A[i++])
1724       While (F is NULL)
1725
1726 For each respective content provider C[j] in the array of content providers C:
1727       Execute subroutine to determine whether the first media asset B is available
     from content provider C[j] via second user equipment device F
1728       If (content first media asset B is available from C[j])
1729             Execute subroutine to request, from content provider C[j], the portion of
     the first media asset B
1730             Generate for display the portion of the first media asset B received
     from content provider C[j] on the second user equipment device F
1731
1732       Else:
1733             execute subroutine to select next device A[i++], initialize F to NULL and
     jump to line 2220
1734 ...
1735 Termination Subroutine
1736 ...
```

```
2000 ...
2001 Initialization Subroutine
2002 ...
2003 //Routine to Begin subroutine to determine whether to change display of a first media
        asset in full-screen mode to a second media asset in full-screen mode based on a
        selection of the second media asset
2004
2005 Receive a user profile from memory, wherein the user profile identifies a media
        characteristic preferred by the user
2006
2007  A = Accessed stored value of the media characteristic of the first media asset
2008  B = Accessed stored value of the media characteristic preferred by the user
2009  C = Time of the selection of the second media asset
2010  D = Accessed frame of the first media asset corresponding to time C
2011
2012         If (A!=B)
2013             Execute subroutine to generate for display, using control circuitry, the
        second media asset in full-screen mode
2014         Else
2015             Execute subroutine to identify content in a frame D of the first media
        asset generated for display at time C
2016             If (content is important)
2017                 Execute subroutine to prompt the user to confirm the selection
        and to notify the user that an important content in the first media asset corresponds
        to the time of the selection
2018                 If (User selection is confirmed)
2019                     Execute subroutine to generate for display, using control
        circuitry, the second media asset in full-screen mode
2020                 Else
2021                     Execute subroutine to generate for display, using control
        circuitry, the second media asset in a partial screen window, wherein the partial
        screen window overlays the first media asset in the full-screen mode
2022             Else
2023                 Execute subroutine to generate for display, using control
        circuitry, the second media asset in full-screen mode
2024 ...
2025 Termination Subroutine
2026 ...
```

```
2200 ...
2201 Initialization Subroutine
2202 ...
2203 //Routine to determine whether to change display of a first media asset in full screen
       mode to display of a second media asset in full-screen mode based on a selection of
       the second media asset
2204
2205       Execute subroutine to identify a frame corresponding to the first media asset,
       wherein the frame is generated for display, by control circuitry, at a time
       corresponding to the selection
2206   Determine a position of the frame within the first media asset
2207   Retrieve, from a database, a database entry listing a portion of the first media asset
       having important content
2208
2209
2210   A = Determined value of the position of the frame within the first media asset
2211   B = Identified value of the beginning position within the first media asset
2212   C = Identified value of the ending position within the first media asset
2213
2214
2215       If (!(B<=A<=C))
2216           Execute subroutine to generate for display, using control circuitry, the
       second media asset in full-screen mode
2217       Else
2218           Execute subroutine to prompt the user to confirm selection of the
       second media asset for full-screen display
2219           If (User selection is confirmed)
2220               Execute subroutine to generate for display, using control
       circuitry, the second media asset in full-screen mode
2221           Else
2222               Execute subroutine to generate for display, using control
       circuitry, the second media asset in a partial screen window, wherein the partial
       screen window overlays the first media asset in the full-screen mode 2223 ...
2224 Termination Subroutine
2225 ...
```

FIG. 22

METHODS AND SYSTEMS FOR ENHANCING MEDIA VIEWING EXPERIENCES ON MULTIPLE DEVICES

BACKGROUND

In conventional systems, users have access to a wide variety of media, such as television programs. Oftentimes, a user will switch through, or prevent a view of media without realizing that an important portion is either currently being displayed or will be displayed in the near future. Conventional systems may notify a user when a commercial break has ended on a channel from which the user has switched away. However, these systems will blindly notify the user when commercials have ended, regardless of whether the content after the commercial break is important or not to the user. Additionally, conventional systems can send content to a second device when a user has exited a room. However, these systems will also blindly send content to the user, whenever the user has left an area, regardless of whether the content is important to the user. These conventional systems may annoy or disturb the user with frequent interruptions for content that they do not find important. As a result, the user may ignore notifications and miss content they deem important, or the user may have a difficult time parsing through notifications to identify content that is important to him or her.

SUMMARY

Accordingly, methods and systems are described herein for a media guidance application that enhances media viewing experiences for users viewing media with important content. In particular, the media guidance application may detect important content in media and may continue to display the media until the important content is no longer detected. For example, the media guidance application may receive a user selection of first media, such as a hockey game for display on a first device, such as a television. The media guidance application may detect a power play as important content in the media because there is a higher chance of scoring a goal during a power play than during regular play. If the media guidance application receives a request from a user to change to second media (e.g., a baseball game) while a power play is detected in the hockey game, the media guidance application may continue to display the hockey game until the power play is no longer detected. For example, the media guidance application may continue to display the hockey game by generating for display on a second device the hockey game. In another example, the media guidance application may, in response to the user request, display the hockey game in a full-screen mode on the first device and may display the baseball game in a smaller window, overlaid over the hockey game on the first device. The media guidance application may change to the baseball game once the power play is finished in the hockey game. Because the media guidance application displays both the media having important content (e.g., the hockey game) and the second media requested by the user (e.g., the baseball game) the user does not end up missing out on important content, thus improving the user's viewing experience.

In some aspects, the media guidance application may receive from a user input device, at a first time, a first selection of a first media asset for display on a first display device associated with the first user equipment device. For example, the media guidance application may detect a packet, transmitted over a network connection, identifying a selection of a media asset for display on a display device connected to the media guidance application. The media guidance application may process the packet to identify the selected media asset and may associate the selection of the first media asset with a first time. For example, the media guidance application may detect a packet sent from a remote device connected to the media guidance application, comprising data identifying a media asset from a library of media assets accessible to the media guidance application. The packet may be associated with a time, such as a timestamp associated with a transmission time of the packet.

In some embodiments, in response to receiving the first selection, the media guidance application may generate for display, at the first user equipment device, the first media asset on the first display device. For example, the media guidance application may receive the packet as described above. The media guidance application may match the data in the packet to a media asset in a library of media assets accessible to the media guidance application. The media guidance application may generate for display the media asset from the library matching the packet data.

In some embodiments, the media guidance application may detect, at a second time, a user action preventing a viewing of the first media asset. For example, the media guidance application may detect, at a second time, that the user cannot view the first media asset. For example, the media guidance application may receive, at the second time, a request from the user to change the view from a first media asset to a second media asset. The media guidance application may determine that selection and display of the second media asset will prevent viewing of the first media asset with respect to the user, because the second media asset may have been generated for display by the media guidance application, in place of the first media asset in response to the selection. The media guidance application may detect the selection at a second time (e.g., a system time when the user selects the second media asset) and may store the time of the selection of the second media asset in memory.

In another example, the media guidance application may detect a user action preventing the viewing of the first media asset when a user exits a room in which the first media asset is playing. For example, the media guidance application may approximate a location of the user with respect to the first display device. The media guidance application may detect the user action preventing the viewing in response to determining that the user is not within a range of the first display device because, if the user is not in the same room in which the first media asset is playing, the user cannot view the first media asset.

In some embodiments, the media guidance application may estimate a location of a user based on a location of a second user equipment device associated with the user. For example, the media guidance application may determine, at the first time, that a second user equipment device is within a first distance of the first user equipment device, wherein the first distance is less than a threshold maximum distance between the first user equipment device and the second user equipment device. For example, the media guidance application may detect, based on the strength of a wireless connection (e.g., a Wi-Fi connection, Bluetooth connection, ZigBee connection, RFID, etc.) between the first user equipment device and the second user equipment device, an approximate distance between the first and the second user equipment devices. The media guidance application may compare the value of the distance to a threshold maximum distance to determine whether, for example, the second user equipment device is likely in the same room as the first user equipment device.

In some embodiments, the media guidance application may determine, at the second time, that the second user equipment device is within a second distance of the first user equipment device, wherein the second distance is greater than the threshold maximum distance between the first user equipment device and the second user equipment device. For example, as described above, the media guidance application may estimate a distance between the first user equipment device and the second user equipment device based on a strength of a wireless connection between the first user equipment device and the second user equipment device. The media guidance application, at the second time, may determine a distance of the second user equipment device and may determine that the distance is greater than a threshold amount. For example, the media guidance application may estimate that the second user equipment device is outside of a room containing the first user equipment device if the estimated distance is greater than the threshold.

In some embodiments, the media guidance application may detect the user action preventing the viewing in response to determining that the second distance is greater than the threshold maximum distance. For example, the media guidance application may estimate that the first user equipment device and the second user equipment device are in a same room at the first time, based on a first strength of a wireless signal of the second user equipment device, as described above. The media guidance application may estimate that the second user equipment device moved to another room at the second time based on a second strength of the wireless signal of the second user equipment device, as described above. The media guidance application may determine that, because the second device has moved to another room, the view of the first display device is prevented.

In some embodiments, the media guidance application detects the user action preventing the viewing of the first media asset by receiving, at the first user equipment device, selection of a second media asset, wherein generating for display the second media asset at the first display device, prevents the viewing, by the user, of the first media asset. For example, as described above, the media guidance application may receive data from a remote control associated with the first user equipment device, indicating a selection of a second media asset. The media guidance application may determine that display of the second media asset will prevent a viewing of the first media asset.

In some embodiments, in response to detecting the user action preventing the viewing of the first media asset, the media guidance application may retrieve data associated with a portion of the first media asset within a time window following the second time. For example, the media guidance application may retrieve data associated with a portion of the first media asset to determine whether the portion of the first media asset is important. For example, the media guidance application may identify a time window from the second time by retrieving a threshold amount of time, from memory, identifying a size of a window used for the determining. The media guidance application may, for example, access metadata associated with the portion and may, based on the metadata, determine whether the portion is important to the user.

In some embodiments, the media guidance application may retrieve from memory a criterion characterizing important content in the media. For example, the media guidance application may pull the criterion from a profile associated with the user. For example, the media guidance application may access a listing of actors the user likes on social media. The media guidance application may set the criterion as any one of the actors from the listing of actors. The media guidance application may determine, based on comparing metadata associated with a media asset to the criterion, that a portion is important when the metadata of the portion matches the criterion (e.g., the portion comprises the actor). The media guidance application may determine that the portion is important because the user will likely want to see the portion of media if it is associated with an actor that the user likes on social media.

In some embodiments, the media guidance application may receive a frame of a plurality of frames associated with the first media asset and may perform an image-processing algorithm on the frame to determine whether the frame comprises content that may be important to the user.

In some embodiments, the media guidance application may determine that an image-processing rule corresponds to one of detecting fast action within a frame, identifying text matching a predefined string, and identifying an object having significance to the user.

The media guidance application may select the frame for the processing by identifying a point within a time window from the second selection. For example, the media guidance application may detect the selection at 3:00 PM (e.g., by correlating the system time with the second selection when the second selection is detected by the media guidance application). The media guidance application may retrieve, from a database, a time threshold defining a time window around the second selection. For example, the media guidance application may retrieve a time window of one minute from a database accessible to the media guidance application. In the example, the media guidance application may identify the time window as the time spanning 3:00 PM (e.g., the time of the selection) to 3:01 PM (e.g., one minute from the selection). The media guidance application may identify a frame of the first media asset that is generated for display within the time window. For example, the media guidance application may retrieve a frame of the first media asset that is generated for display within the window and may perform an image-processing algorithm on the frame to detect important content in the frame.

In some embodiments, the media guidance application may identify important content as a player in a user's fantasy sports roster, a scene corresponding to high social chatter, or gameplay in a sports event having a high probability of scoring.

In some embodiments, the media guidance application may determine whether the portion of the first media asset comprises important content by retrieving metadata corresponding to the first media asset, wherein the metadata identifies content corresponding to the portion. The media guidance application may retrieve, from a database, a set of data that identifies content types that are important. For example, the media guidance application may retrieve from the database a set listing an important content type, such as "bases loaded" for a baseball game, because, for example, points are more likely to be scored in baseball when the bases are loaded than when bases are not loaded. The media guidance application may compare the content types in the set to content corresponding to the portion to determine if there is a match. For example, the media guidance application may analyze content corresponding to a portion of a baseball game to determine if any "bases loaded" content corresponds to the portion. If the media guidance application determines that a content type from the set (e.g., a bases loaded content type) matches content corresponding to the portion, the media guidance application may determine that the portion is important (e.g., if the media guidance application determines that in the portion of the baseball game, the bases are loaded). If the media guidance application determines that content types of the set do not match content corresponding to the portion of the baseball game, the media guidance application may determine that the portion is not important (e.g., if the media guidance application determines that in the portion of the baseball game, the bases are not loaded).

In some embodiments, the media guidance application may determine if the portion of the first media asset includes content important to the user based on a user profile. The media guidance application may retrieve a user profile from memory. For example, the media guidance application may access a profile stored in memory listing a user's media preferences and may detect a user's media preference for sports. The media guidance application may retrieve a set of characteristics corresponding to a first media asset, such as a genre characteristic listing a genre for the first media asset.

The media guidance application may compare the user preference (e.g., preference for sports genre) to the characteristic of the first media asset (e.g., the genre of the first media asset) to determine if the portion of the first media asset is important. For example, if the media guidance application determines that the genre of the first media asset is sports and that the user preference is for sports, the media guidance application may determine that the portion of the first media asset is important; because, for example, the user is more likely to find content matching the user preference (e.g., sports) to be more important than content not matching the user preference (e.g., soap operas). Accordingly, if the media guidance application determines that the characteristic of the first media asset does not match the user preference, the media guidance application may determine that the first media asset is not important.

In some embodiments, the media guidance application may determine whether a portion of the first media asset is important based on tagged portions of the first media asset designated as important. For example, the media guidance application may receive metadata corresponding to the first media asset. The media guidance application may parse the metadata to identify an important portion of the first media asset (e.g., an important portion of a movie may be a scene with a famous quote or a scene with a death of an important character).

The media guidance application may determine if the portion of the first media asset matches a time of an important portion listed in the metadata. For example, the media guidance application may determine, based on the metadata, that an important movie scene occurs between 30 minutes and 35 minutes from the beginning of the movie. The media guidance application may determine that the portion of the first media asset begins 40 minutes from the beginning of the movie and ends 42 minutes from the beginning of the movie. Accordingly, since the media guidance application determines that the portion does not overlap with the important scene (e.g., the time period of 30 minutes to 35 minutes does not overlap the time period of 40 minutes to 42 minutes), the media guidance application may determine that the portion is not important. In contrast, if the media guidance application determines that the portion of the first media asset begins 34 minutes from the beginning of the movie and ends 36 minutes from the beginning of the movie, the media guidance application may determine that the portion is important (e.g., because the portion of the first media asset overlaps with the important scene).

In some embodiments, in response to determining that the portion of the first media asset generated for display on the first display device includes important content, the media guidance application may identify a second user equipment device capable of generating for display the portion of the first media asset on a second display device associated with the second user equipment device.

In some embodiments, the media guidance application may search a database comprising a plurality of user equipment devices for a second user equipment device of the plurality of user equipment devices that matches a unique identifier associated with the user. For example, the media guidance application may retrieve a unique identifier associated with the user from a user profile associated with the user (e.g., so that the media guidance application may display important content on a second user equipment device that is associated with the user).

In some embodiments, in response to identifying the second user equipment device matching the unique identifier, the media guidance application may query the second user equipment device for a listing of authorization data associated with the second user equipment device. For example, the media guidance application may query the second user equipment device to determine whether the user can access the portion of the first media asset on the second user equipment device. For example, the media guidance application may access credentials stored on the second user equipment device to determine whether the user is authorized to access the portion of the media via the second user equipment device.

In some embodiments, the media guidance application may determine whether the authorization data associated with the second user equipment device matches authorization requirements associated with the portion of the first media asset. For example, the media guidance application may compare user credentials stored on the device with credentials necessary for accessing the portion of the first media asset. For example, the media guidance application may determine that the portion of the media is only accessible to users having a subscription to a content provider. The media guidance application may compare credentials stored on the second user equipment device to the credentials necessary for accessing the portion of the media (e.g., the subscription) to determine whether the portion of the media is accessible to the user via the second user equipment device.

In some embodiments, the media guidance application may retrieve a user profile from memory to identify the second device associated with the user. For example, the media guidance application may identify a user of the media guidance application by, for example, prompting a user to login to an account associated with the user. The media guidance application may determine, based on the login information, an identity of the user and may, based on the identity, retrieve a user profile stored at a remote server corresponding to the user. The media guidance application may retrieve a portion of data from the user profile, such as a list of user equipment associated with the user.

In some embodiments, the media guidance application may, based on the user profile, identify a second user equipment device from the plurality of user equipment devices associated with the user. For example, the media guidance application may retrieve from the user profile a preference for a user equipment device. The media guidance application may select the user equipment device matching the preference.

In some embodiments, the media guidance application may retrieve, from the second device, data identifying a plurality of content providers accessible to the user via the second device. For example, the media guidance application may query the second user equipment device for a list of media applications stored on the second user equipment device.

In some embodiments, the media guidance application may identify a content provider of the plurality of content providers that is capable of providing access to the first media asset via the second user equipment device. For example, the media guidance application may query each content provider of the plurality of content providers for a listing of media assets accessible via the application. The media guidance application may determine that a respective content provider is capable of providing access to the first media asset if the first media asset is a part of a corresponding listing of media assets for the respective content provider.

In some embodiments, in response to determining that the authorization data associated with the second user equipment device matches authorization requirements associated with the portion of the first media asset, the media guidance application may generate for display, on a second display device associated with the second user equipment device, the portion of the first media asset. For example, the media guidance application may request, from the content provider, the portion of the first media asset. For example, the media guidance application may launch an application on the second device and may prompt the application on the second device to begin playback of the portion of the first media asset.

In some embodiments, the media guidance application may receive the portion of the first media asset from the content provider and may generate for display the portion of the first media asset received from the content provider on the second display device (e.g., by prompting the user whether the user wants to display the portion on the second display device or automatically, without user input). For example, the media guidance application may receive a video stream of the first media asset starting at a portion of the first media asset corresponding to the second time. The media guidance application may generate the stream for display on the second device so that the user does not miss a portion of the important portion of the first media asset.

In some aspects, the media guidance application may display the important content in a picture-in-picture window on the first display device associated with the first user equipment device. Methods and systems for generating for display important content in a picture-in-picture window are disclosed in co-pending U.S. patent application Ser. No. 14/998,113 filed Dec. 23, 2015, which is incorporated by reference in its entirety. For example, the media guidance application may receive, from a user input device at a first time, a first selection of a first media asset for display in a full-screen mode. For example, the media guidance application may receive user input from a remote control corresponding to the media guidance application by detecting a remote control signal at a remote control receiver accessible by the media guidance application. The media guidance application may associate receiving the remote control signal with a first time, substantially similar to a time when the remote control signal was received by the media guidance application. The media guidance application may process the remote control signal and may detect a command selecting a first media asset. For example, the media guidance application may detect, in the remote control signal, a command selecting a first television channel for viewing in a full-screen mode.

In some embodiments, in response to receiving the first selection, the media guidance application may generate for display, using control circuitry, the first media asset in the full-screen mode. For example, the media guidance application may detect a channel number in the remote control signal as described above. The media guidance application may access media corresponding to the channel and may generate for display the media in full-screen on a display device accessible to the media guidance application.

In some embodiments, the media guidance application may receive, from the user input device at a second time, a second selection of a second media asset for display in the full-screen mode, wherein the second time is later than the first time. For example, the media guidance application may receive a second remote control signal at a remote control receiver accessible to the media guidance application. The media guidance application may correlate the detection of the second remote control signal with a system time, substantially equal to a time the media guidance application detects the second remote control signal. The media guidance application may determine that the second time is later than the first time (i.e., the media guidance application receives the second selection after receiving the first selection). The media guidance application may determine, based on a command detected in remote control signal, that the second selection is a command to generate a second media asset for display in a full-screen mode. For example, the media guidance application may detect a second command to access a second media asset corresponding to a second channel, different from the first media asset.

In some embodiments, in response to receiving the second selection, the media guidance application may determine, using the control circuitry, whether a portion of the first media asset, generated for display in the full-screen mode at a point within a time window from the second time, includes important content using any of the methods described above. image-processingimage-processingimage-processing In some embodiments, in response to determining that the portion of the first media asset generated for display in the full-screen mode is not important, the media guidance application may generate for display, using the control circuitry, the second media asset in the full-screen mode. For example, the media guidance application may identify a channel number in the second selection as described above. In response to determining that the portion is not important the media guidance application may tune to the second channel and may generate for display the second channel in the full-screen mode (i.e., replacing the first media asset in the full-screen mode). The media guidance application may generate for display the second media asset in the full-screen mode because the user will not miss any important content in the first media asset by changing the channel (e.g., because the media guidance application determined that the portion does not have important content).

In some embodiments, in response to determining that the portion of the first media asset generated for display in the full-screen mode is important, the media guidance application may generate for display, using the control circuitry, the second media asset in a window, wherein the second media asset in the window overlays the first media asset in the full-screen mode. The media guidance application may determine that the portion of the first media asset is important by, for example, performing an image-processing algorithm on the first media asset and detecting content in a frame corresponding to the portion. For example, if the first media asset is a baseball game, the media guidance application may analyze the first media asset and determine that the bases are loaded. The media guidance application may identify that "bases loaded" is important content type because, for example, a team playing in the baseball game may have greater probability of scoring when the bases are loaded as opposed to when the bases are not loaded. In response to detecting that the first media asset has importance content, the media guidance application may generate the second media asset for display in a window overlaying the first media asset displayed in the full-screen mode. The media guidance application may generate the second media asset for display in the window so that the user does not miss out on the important content detected in the first media asset and so that the user may also consume the second media asset in accordance with the selection.

In some embodiments, the media guidance application may notify the user when content matching an important content type is detected in the first media asset and may request that the user confirms the second selection. For example, the media guidance application may generate for display a pop-up window notifying the user of the important content and may prompt the user to confirm the second selection. The media guidance application may prompt the user to confirm the selection because the media guidance application may incorrectly predict that the content is important to the user and the user may wish to skip the content deemed important by the media guidance application.

In some embodiments, the media guidance application may buffer at least one of the first and the second media asset in response to receiving the second selection. For example, upon receiving the second selection, the media guidance application may store frames corresponding to the first and the second media asset in a memory until the user confirms the second selection. The media guidance application may buffer at least one of the first and the second media assets to make sure that the user does not miss any important content while the user is responding to a prompt generated by the media guidance application. The media guidance application may generate for display the buffered frames after receiving confirmation of the second selection.

In some embodiments, the media guidance application may identify a position of important content in the full-screen mode and may generate for display, a window or a prompt in a position not having important content (i.e., not blocking the important content). For example, the media guidance application may identify a position of the screen having important content by performing an image-processing algorithm on a frame to identify a location of important content. For example, the media guidance application may identify an important content type in a movie as a death of a major character in the movie. The media guidance application performs the image-processing algorithm on the frame to identify a location of the character within the full-screen mode and may generate for display at least one of a prompt or a window in a position not overlapping with the location of the character. The media guidance application may generate for display the window or the prompt in an area not having important content so, for example, the user will not miss the important content because of a prompt or because of the window blocking the content.

In some embodiments, the media guidance application may receive a third selection to generate for display the first media asset in the partial screen window. The media guidance application may receive the third selection via a remote control, as described above. In response to the third selection, the media guidance application may generate for display the first media asset in the window mode and may generate for display the second media asset in the full-screen mode, because, for example, the user may want to view the second media asset without missing an important portion of the first media asset.

In some embodiments, the media guidance application may generate for display a description of the important content overlaying the full-screen mode. For example, the media guidance application may receive metadata corresponding to the first media asset containing a description of important content in the portion. The media guidance application may generate for display text describing the portion to the user, because, for example, the user may wish to hear audio of the second media asset instead of audio of the first media asset and does not want to miss the content of the first media asset or, the user may not be able to see all of the important content and may instead desire a verbal or textual presentation of the important content.

In some embodiments, the media guidance application may determine that a second portion of the first media asset is not important, and, in response to determining that the second portion of the first media asset is not important, the media guidance application may generate for display the second media asset in the full-screen mode (i.e., replacing the first media asset in the full-screen mode). For example, the media guidance application may determine that the first media asset is a hockey game. The media guidance application may determine that a second portion of the first media asset corresponds to a commercial break. The media guidance application may determine that the second portion is not important because the commercials do not correspond to the actual hockey game. The media guidance application may generate for display the second media asset in the full-screen mode to replace the first media asset in the full-screen mode. For example, the media guidance application may determine that, because the second portion of the first media asset is not important, the user would prefer the second media asset.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 17 is an illustrative example of code that may be used to identify a content provider of a first media asset for display on a second user equipment device;

FIG. 20 is an illustrative example of code that may be used to determine whether to generate for display a second media asset in full-screen mode based on content recognized in a first media asset in accordance with some embodiments of the disclosure;

FIG. 22 is an illustrative example of code that may be used to determine whether to generate for display a second media asset in full-screen mode based on metadata received about a first media asset in accordance with some embodiments of the disclosure;

DETAILED DESCRIPTION OF DRAWINGS

Figure 1:
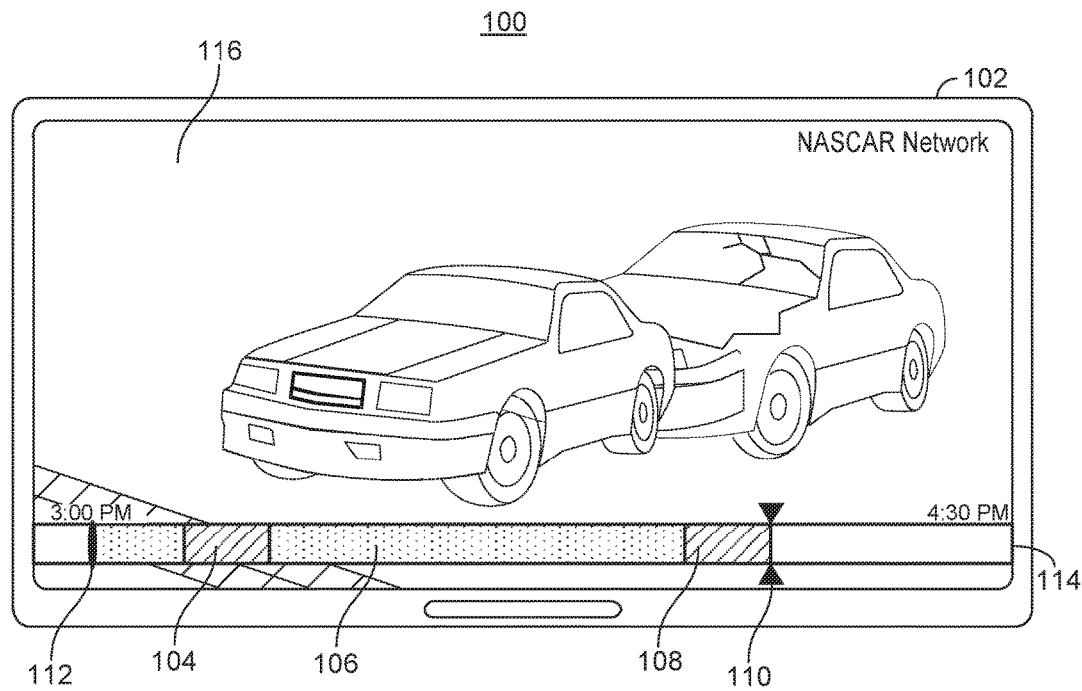
FIG. 1 shows an illustrative example of a first media asset generated for display in a full-screen mode in accordance with some embodiments of the disclosure.

Methods and systems are described herein for a media guidance application that enhances viewing experiences of a user when viewing media having important content. In particular, when content matching an important content type is detected by the media guidance application in a portion of a first media asset, the media guidance application may continue to generate for display the first media asset (e.g., in a full-screen mode or on a remote device) until the content is no longer detected. For example, the media guidance application may receive a first user selection of first media, such as the movie "Titanic." If the media guidance application receives a second user selection of second media (e.g., a baseball game) while the user is still viewing the first media, the media guidance application may determine whether an upcoming or currently displayed portion of the first media has important content; if so, the media guidance application may ensure that the important content is not unintentionally missed by the user.

For example, in response to receiving the second user selection, the media guidance application may analyze the first media asset to determine whether important content is currently being displayed or will be displayed in the near future. For example, the media guidance application may identify a position of important content in the first media, such as the scene when the Titanic hits the iceberg (e.g., because hitting the iceberg is an important event in the movie "Titanic"). The media guidance application may then determine if the user is either currently viewing the scene or if the scene is upcoming. If the media guidance application determines that the scene is less than a threshold time away, the media guidance application may continue to generate the first media (e.g., "Titanic") for display in a full-screen mode and may generate for display the second media (e.g., the baseball game) in a partial screen window, partially overlaid over content being displayed, in this example, "Titanic." Because the media guidance application displays both the media having important content (e.g., the scene of "Titanic") and the second media requested by the user (e.g., the baseball game) the user does not end up missing out on important content or the requested media, thus improving the user's viewing experience. Once the media guidance application determines that the important scene of "Titanic" is complete, the media guidance application may generate for display the baseball game (e.g., the second media) in the full-screen mode, replacing the display of the first media asset.

In another example, the media guidance application may determine that a viewing of the first media is prevented; and, in response to determining that a viewing of the first media is prevented, may generate for display the first media on a remote device. For example, the media guidance application may determine, at a first time, that a user is viewing the first media in a first room (e.g., viewing without a prevented view). The media guidance application may determine, at a second time, that the viewing of the first media is prevented because the user may have left the room (e.g., because the user may not be able to view the first media from a different room). The media guidance application may therefore generate for display the first media on a remote device (e.g., a device that is with the user in the other room) so that the user does not miss the important content of the first media.

As referred to herein, "important content" refers to anything in media that may be noteworthy or significant. For example, important content in a hockey game may be a power play, since there is a greater likelihood of scoring during a power play than not. In another example, important content may be a significant plot development in a television show, such as a death of a main character. In another example, important content may be a scene of a movie having high social chatter. In another example, important content in a movie may be an actor saying a famous quote.

Important content may be important relative to a user profile of a user. For example, a user may have a sports player in his or her fantasy sports roster. Important content relative to the user may be the fantasy sports player, when they are actively playing in a real-life sporting event; because, for example, the performance of the player may affect the user's fantasy sports score. In another example, important content may be based on a social media profile of the user. For example, the media guidance application may determine that the user "likes" a celebrity, such as Donald Trump, on a social media profile, such as a Facebook profile. The media guidance application may identify Donald Trump in a portion of a television as important content.

Important content may be crowd sourced. For example, the media guidance application may retrieve data from social media networks to identify important portions in media. For example, the media guidance application may retrieve hash tags related to media or data from a social network, such as Facebook, identifying content that is most shared or discussed on (e.g., Facebook's "most talked about" data). The media guidance application may identify a portion of a media asset corresponding to high social chatter by, for example, determining that many users have shared a clip from a media asset (e.g., based on Facebook's "most talked about" data. The media guidance application may create a fingerprint for the clip and may compare the fingerprint of the clip to a database of fingerprints for media to identify a position in media matching the fingerprint.

Important content may be manually tagged by a content provider or a third party. For example, a sports broadcasting network may tag important plays in a sporting event in real time or may tag important plays for a retransmission of an event. The media guidance application may retrieve metadata, with or separate from a video stream associated with the sporting event comprising the tags.

As referred to herein, a "portion" of a media asset may refer to any part of a media asset that is distinguishable from another part of the media asset. For example, a portion may correspond to a frame, set of frames, scene, chapter, segment of time, etc. The media guidance application may identify distinct portions based on time-marks (e.g., a portion begins at a first time mark and ends at a second time mark) in the play length of a media asset. Alternatively or additionally, the media guidance application may identify portions based on a range of frames (a portion begins at a first frame and ends at a second frame). Alternatively or additionally, the media guidance application may identify portions based on content in the media asset (a portion may begin at the appearance of particular content and end at the appearance of the same or different content). Alternatively or additionally, the media guidance application may identify portions based on metadata associated with the media asset (a portion may begin at a first metadata tag and end at a second metadata tag.

As referred to herein, a "frame" may be any image associated with media. For example, a frame of a movie may be an image captured at a specific point in the movie. A movie may comprise a sequence of frames for playback in a specified order. The media guidance application may perform image-processing on a frame of media to determine if there is important content in the media.

As referred to herein, a "full-screen mode" may be a way of generating for display media such that it takes up all space allocated for media display on a display device. For example, the media guidance application may receive an allocation of a set of pixels, less than all pixels, of a display device. In this example, a full-screen mode may comprise all pixels allocated in the set. In another example, a full-screen mode may comprise all pixels of a display device. In another example, the media guidance application may be connected to multiple display devices. In this example, a full-screen mode may comprise all pixels of a single display device or may comprise all pixels of each of the display devices.

As referred to herein, "preventing a viewing" may be anything that prevents a user from directly or indirectly viewing a media asset. For example, when a user changes from a first channel to a second channel displayed in a full-screen mode, a viewing of the first channel is prevented because the user can no longer view the first media. In another example, when a user is in a first room viewing first media and subsequently moves to a second room where the first media is not visible, a viewing of the first media is prevented because the user cannot view the first media from the second room.

As referred to herein, "criterion characterizing important content" is any feature of a video characterizing content of the video that may be important to a user. For example, a criterion characterizing important content may be whether media has a sports player that is also in a user's fantasy sports roster. As used herein, the criterion does not define a content restriction, such as a parental control or a content acceptability rating.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

As referred to herein, a "media guidance application" is any program that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, control circuitry 1004, discussed further in relation to FIG. 10 below, executes instructions for the media guidance application stored in memory (i.e., storage 1008 discussed further in relation to FIG. 10 below). Specifically, control circuitry 1004 may be instructed by the media guidance application to perform the functions discussed above and below. For example, the media guidance application may provide instructions to control circuitry 1004 to generate the media guidance displays as described above and below. In some implementations, any action performed by control circuitry 1004 may be based on instructions received from the media guidance application.

FIG. 1 shows an illustrative embodiment of a first media asset generated for display by control circuitry 1004 in a full-screen mode in accordance with some embodiments of the disclosure. User equipment 100 is depicted as a television 102 but may be any user equipment device comprising a display, such as user television equipment 1102, user computer equipment 1104, or wireless user communications interface 1106. Control circuitry 1004 may be coupled to the display (e.g., display 1012) of user equipment 100 as depicted in FIG. 10 described above. Control circuitry 1004 may generate for display full-screen first media asset 116 for display on television 102. The control circuitry 1004 may also generate for display progress bar 114 comprising first important portion 104, buffered portion 106 and second important portion 108. Control circuitry 1004 may designate a time when a user first requested a media asset using beginning marker 112. Control circuitry 1004 may generate for display progress indicator 110 indicating a position within the first media asset corresponding to full-screen first media asset 116.

In some aspects, the control circuitry 1004 may receive, from a user input device, such as user input interface 1010, at a first time, a first selection of a first media asset for display in a full-screen mode. For example, control circuitry 1004 may receive input via a user input interface 1010 such as an infrared detector, Radio Frequency RF receiver, Bluetooth receiver, Wi-Fi receiver, touch screen digitizer, etc. Control circuitry 1004 may detect a packet at a Bluetooth receiver comprising a first selection of a first media asset. For example, control circuitry 1004 may parse the Bluetooth packet to identify a data portion of the packet comprising a movie (e.g., a first media asset such as "The Godfather") selected by the user for viewing in the full-screen mode. Upon detection of the first selection (e.g., the Bluetooth packet) control circuitry 1004 may access a first time, such as a system time, a global time, a time relative to just control circuitry 1004, etc., and control circuitry 1004 may associate the selection with the time (e.g., by storing data in memory, such as storage 1008, correlating the selection with the first time) to record a relative ordering for the selection. Control circuitry 1004 may mark the first time in progress bar 114 by designing the first time with a marking, such as beginning marker 112.

In some embodiments, in response to receiving the first selection, control circuitry 1004 may generate for display (e.g., for display on display 1012), the first media asset in the full-screen mode. For example, control circuitry 1004 may detect a first media asset (e.g., a race on NASCAR Network) in a Wi-Fi packet received by control circuitry 1004 via communications network 1114 or via user input interface 1010. Control circuitry 1004 may retrieve the first media asset to generate the first media asset for display on television 102. For example, control circuitry 1004 may retrieve the program available from a channel NASCAR Network by, for example, querying media guidance data source 1118 via communications network 1114 for a frequency corresponding to NASCAR Network.

In another example, control circuitry 1004 may identify the channel by cross-referencing NASCAR Network with a channel map stored in memory of control circuitry 1004 such as storage 1008. Control circuitry 1004 may tune to the frequency using a television tuner accessible to control circuitry 1004. In another example, control circuitry 1004 may determine that the first media asset is available via a video-on-demand channel for NASCAR Network. Control circuitry 1004 may access a database having a plurality of video-on-demand media, such as media content source 1116, to retrieve the first media asset. In another example, control circuitry 1004 may stream the first media asset from a third-party provider, such as a streaming provider having content stored at media content source 1116. In another example, control circuitry 1004 may stream media in a packet switched network such as an IPTV network. The media guidance application may generate a plurality of packets to the third-party provider via communications network 1114 to establish a streaming session to retrieve the first media asset. In another example, control circuitry 1004 may retrieve the first media asset from a memory, such as storage 1008. Once control circuitry 1004 retrieves the first media asset, control circuitry 1004 may generate the first media asset for display in a full-screen mode, as depicted in full-screen first media asset 116.

In an example, control circuitry 1004 may communicate with a display 1012 to identify a screen size (e.g., a size measured in pixels) associated with a display device, such as television 102. Control circuitry 1004 may scale the first media asset so that the first media asset is generated for display using all of the pixels of the display device. In another example, control circuitry 1004 may receive a screen size (e.g., a size in pixels) associated with the display device having less than all of the pixels of the display device (e.g., because the rest of the pixels of the display device may be allocated for displaying a guide or other content). Control circuitry 1004 may scale the first media asset so that it comprises all of the pixels of the received screen size.

In some embodiments, control circuitry 1004 may receive, from the user input interface 1010 at a second time, a second selection of a second media asset for display (e.g., for display on display 1012) in the full-screen mode, wherein the second time is later than the first time. For example, control circuitry 1004 may receive a second selection via a touch screen (e.g., a digitizer at user input interface 1010 for receiving touch commands from a user). Control circuitry 1004 may detect touch commands at the digitizer and may interpret coordinates corresponding to the digitizer input. For example, control circuitry 1004 may correlate the interpreted coordinates with a program listing, such as program listing 808, in a program listing display, such as program listing display 800. Control circuitry 1004 may identify a second media asset associated with the program listing, requested for display in the full-screen mode. Upon detecting the touch command (e.g., via user input interface 1010), control circuitry 1004 may correlate the second selection with a time, as described above, and may store in a data structure in memory (e.g., storage 1008) data associating the selection with the time to keep track of an overall ordering of the selections.

Control circuitry 1004 may correlate the detection of the touch command with a system time (e.g., a time substantially equal to a time of the detection of the second selection). Control circuitry 1004 may determine that the second time is later than the first time by comparing the stored entry of the first time with the stored entry of the second time (i.e., control circuitry 1004 received the second selection after receiving the first selection). Control circuitry 1004 may determine, for example, based on a identified location corresponding to the touch command, that the second selection is a command to generate a second media asset for display (e.g., on display 1012) in a full-screen mode. For example, the media guidance application may detect a second command to change from a first media asset corresponding to NASCAR Network to a second media asset corresponding to SOAP Network.

In some embodiments, in response to receiving the second selection, control circuitry 1004 may determine whether a portion of the first media asset, generated for display in the full-screen mode at a point within a time window from the second time (e.g., full-screen first media asset 116), includes important content. For example, control circuitry 1004 may receive, (e.g., via communications network 1114 data from media guidance data source 1118) a frame of a plurality of frames associated with the first media asset (e.g., corresponding to the portion) and may perform an image-processing algorithm on the frame to determine whether the frame comprises content that is important.

As an example, control circuitry 1004 may select the frame by identifying a point within a time window from the second selection. For example, control circuitry 1004 may retrieve a stored threshold defining the time window from storage 1008 or from a remote database such as media guidance data source 1118 via communications network 1114. The threshold may either be predefined (e.g., set by a user and stored in a user profile, or set by a content provider to a default value) or may be computed by control circuitry 1004. For example, control circuitry 1004 may compute a threshold based on a characteristic of a media asset, such as a media asset length, because, for example, a user may have a greater propensity to wait longer for an important scene in a two-hour movie than for a 20 minute television show. Once the threshold is determined by control circuitry 1004, control circuitry 1004 may compute the time window. Control circuitry 1004 may compute the time window as the time spanning any of the exemplary intervals listed below:

S=second time
T=threshold $$\{x|S-t<x\leq S+t\} \qquad 1)$$

$$\{x|S\leq x\leq S+t\} \qquad 2)$$

$$\{x|S-t\leq x<S\} \qquad 3)$$

For example, control circuitry 1004 may detect the selection, using user input interface 1010 at 4:00 PM (e.g., by correlating the system time with the second selection when the second selection is detected by control circuitry 1004). In an example, the second time may be represented by progress indicator 110, because the second selection may be detected by control circuitry 1004 when a frame of the first media asset corresponding to full-screen first media asset 116 is generated for display (e.g., by control circuitry 1004). In an example, control circuitry 1004 may retrieve a threshold of one minute from a database, such as media guidance data source 1118, via communications network 1114. In the example, control circuitry 1004 may identify the time window as the time spanning 4:00 PM to 4:01 PM. Control circuitry 1004 may identify a frame of the first media asset that is generated for display (e.g., generated for display by control circuitry 1004 for display on display 1012) within the time window. For example, control circuitry 1004 may retrieve a sequence of frames of the first media asset (e.g., by retrieving frames via communications network 1114 from media content source 1116) corresponding to full-screen first media asset 116 and may perform an image-processing algorithm on the frame to detect important content in the frame.

In an example, the control circuitry 1004 may run an image-processing algorithm, such as an object detection algorithm on the frame, to determine if the frame comprises important content. For example, the media guidance application may perform edge detection within a particular frame and, based on the results, detect contours of various objects within the frame. For example, control circuitry 1004 may perform a search-based or a zero-crossing based edge detection method on a frame of the media. Control circuitry 1004 may approximate a first derivative of pixel data corresponding to the frame to derive a gradient for the image (e.g., by convolving the image with a kernel, such as a Sobel operator). Based on the gradient, control circuitry 1004 may identify local minima or maxima in the gradient. Control circuitry 1004 may suppress all pixels not identified as a local minima or maxima and may apply thresholding or hysteresis to filter the output.

When edge detection is complete, control circuitry 1004 may extract an object discovered during edge detection. For example, control circuitry 1004 may create a fingerprint for objects in the frame based on the edge detection algorithm as described above. Control circuitry 1004 may compare the fingerprint for the frame to an object database that stores object fingerprints that are known and have been categorized into known objects. The object database may also store descriptions of the objects contained within the object database. When control circuitry 1004 detects a particular object in a frame, the control circuitry 1004 may retrieve keywords describing the object from the object database.

In some embodiments, control circuitry 1004 may perform an image-processing algorithm to detect characters in a media asset. For example, control circuitry 1004 may perform an optical character recognition ("OCR") algorithm to detect characters in the media asset and may generate a set of string coordinate pairs corresponding to the text in the media asset. For example, control circuitry 1004 may retrieve a frame of a media asset, such as a financial news broadcast. Control circuitry 1004 may detect text in a news ticker at a bottom of the frame of the media asset (e.g., by performing the object detection procedures as described above). Control circuitry 1004 may generate a string matching the string in the news ticker by performing the OCR algorithm on the frame. Control circuitry 1004 may associate the string with a position of the original string in the frame (e.g., the bottom of the frame).

In some embodiments, control circuitry 1004 may analyze a frame to determine whether a characteristic of the frame matches an image-processing rule. For example, control circuitry 1004 may determine that the frame corresponds to a live sporting event, such as a football game (e.g., by retrieving metadata corresponding to the first media asset from media guidance data source 1118, by detecting an object, such as a football in the frame, or by detecting football team names in a scoreboard). In an example, control circuitry 1004 may analyze the frame by performing an image-processing algorithm, as described above, to identify objects in the frame, such as a football, and to identify text corresponding to yard markers on the field (e.g., markers noting a location on a football field). Control circuitry 1004 may correlate a position of the football within the frame with a position of the text corresponding to the yard markers on the frame to determine a location of the football on the football field.

Control circuitry 1004 may retrieve an image-processing rule stored locally, such as storage 1008, or remotely, such as media guidance data source 1118. The image-processing rule may define a characteristic having importance. For example, control circuitry 1004 may retrieve an image-processing rule defining a portion of a football game as important when it is detected that an object, such as a football is less than 20 yard from an end zone, because there is a higher probability of scoring when the football is close to an end zone.

In some embodiments, control circuitry 1004 may generate an image-processing rule identifying an object having significance to the user, based on a user profile. For example, control circuitry 1004 may determine, based on the user profile, that a user participates in a fantasy sports contest. Control circuitry 1004 may retrieve, from the user profile, data identifying a user's fantasy sports roster. Control circuitry 1004 may generate image-processing rules based on the roster. For example, control circuitry 1004 may create an image-processing rule defining a characteristic of a frame (e.g., a jersey number of a player in the frame, facial recognition of a player in the frame) matching a player in the roster as objects having significance to the user. In another example, control circuitry 1004 may create an image-processing rule based on recognized text within a frame (e.g., via an ORC image-processing algorithm). For example, control circuitry 1004 may identify an overlay having text describing a player (e.g., when a player goes up to bat in a baseball game). In another example, control circuitry 1004 may determine that the image-processing rule identifies a player in a sports event as important because, based on the user profile, control circuitry 1004 determines that it is a user's favorite player.

In some embodiments, the image-processing rule may correspond to one of detecting fast action within a frame. For example, control circuitry 1004 may retrieve a set of frames corresponding to a portion of a media asset. Control circuitry 1004 may detect an object in a frame of the set of frames, as described above and may track motion of the object using an accelerated motion vector processing by detecting a position of the object in each frame of the set of frames. If the motion of the object is determined by control circuitry 1004 to be greater than a threshold value, control circuitry 1004 may associate the portion with a fast motion characteristic.

Control circuitry 1004 may compare the characteristic of the frame (e.g., identified objects, recognized text, etc.) to an image-processing rule to determine whether the object is important. Control circuitry 1004 may determine that the portion of the first media asset includes important content when the characteristic of the frame matches the image-processing rule. For example, if control circuitry 1004 determines that the portion comprises a player in a user's fantasy sports roster, it is likely that the portion is important to the user. In contrast, control circuitry 1004 may determine that the portion of the first media asset does not include important content when the characteristic of the frame does not match the image-processing rule because, for example, if the image-processing rule is not met, the user may not find the content to be important.

In some embodiments, control circuitry 1004 may determine that a portion of a first media asset is important by performing sound processing algorithm on audio corresponding to a portion. For example, control circuitry 1004 may retrieve audio corresponding to a portion of a media asset. Control circuitry 1004 may compute a fingerprint for the audio and may compare the fingerprint to a database listing fingerprints of important audio segments. In another example, control circuitry 1004 may convert audio to text (e.g., via a speech to text algorithm). Control circuitry 1004 may compare text of the audio to a database listing important text (e.g., the database may list "Amber Alert" as important text). Control circuitry 1004 may determine that the portion of the first media asset is important if it matches text in the database.

In some embodiments, control circuitry 1004 may determine whether the portion of the first media asset comprises important content by retrieving metadata corresponding to the first media asset wherein the metadata identifies content corresponding to the portion (e.g., retrieving metadata stored locally on storage 1008 or remotely via communications network 1114 on media guidance data source 1118). Control circuitry 1004 may retrieve, from a database (e.g., locally database on storage 1008 or remote database on media guidance data source 1118 via communications network 1114), a set listing content that is important.

For example, control circuitry 1004 may retrieve from the database data listing a "crash" for a NASCAR race as an important content type, because, for example, a user may be worried about the well-being of a driver. Control circuitry 1004 may compare content in the set to content corresponding to the portion to determine if there is a match. For example, control circuitry 1004 may parse the metadata and may identify a plurality of content corresponding to the portion. For example, in relation to full-screen first media asset 116, control circuitry 1004 may identify content such as NASCAR, finish line, car, car crash, etc. in the portion of the first media asset. Control circuitry 1004 may compare the plurality of content corresponding to the portion (e.g., as described above) to the set to determine if there is a match. In this example, control circuitry 1004 may determine that the content in the portion "car crash" matches an important content type listed in the set, "crash." In response to determining that the content corresponding to the first media asset matches important content type from the set, control circuitry 1004 may determine that the portion of the first media asset is important. Alternatively, if control circuitry 1004 determines that the content corresponding the first media asset does not match an important content type of the set (e.g., if "crash" was not listed as important content type), control circuitry 1004 may determine that the portion of the first media asset is not important.

In some embodiments, control circuitry 1004 may determine whether the portion of the first media asset includes content important to the user based on a user profile. Control circuitry 1004 may retrieve a user profile from memory. For example control circuitry 1004 may determine whether a user profile exists by first identifying the user (e.g., login information, a picture of the user (e.g., gained through a webcam), a hash value uniquely identifying the user or any other known identifying information of the user), and then by cross-referencing the user's identity against entries of a user profile database. As a result of the cross-referencing, control circuitry 1004 may receive a pointer to a profile if one is located or may receive a NULL value if the profile does not exist. The user profile database may be located remote or local to control circuitry 1004 (e.g., on storage 1008 or on media guidance data source 1118 accessed via communications network 1114). If a user profile is located, control circuitry 1004 may access database entries corresponding to media characteristics of interest to the user. In some embodiments, control circuitry 1004 may store, in the user profile, data automatically generated through use of a media guidance application running on control circuitry 1004, such as data indicating media assets previously viewed by the user or may store data explicitly provided by a user such as an age, gender, etc. For example, control circuitry 1004 may store a value uniquely identifying a media asset consumed by a user in the profile of the user.

In some embodiments, control circuitry 1004 may analyze the user profile data to identify a user preference from the user profile, wherein the user preference identifies a media characteristic of interest to the user. For example, control circuitry 1004 may analyze the listing of media previously viewed by the user based on genre. Control circuitry 1004 may enumerate the genres corresponding to each entry in the list to identify a genre most viewed by the user. Alternatively, control circuitry 1004 may access user profile data provided by a user which explicitly details the user's preferences. For example, control circuitry 1004 may determine that the user has already provided a listing of preferred media. In an example, control circuitry 1004 determine that a user has a preference for sports by determining that a listing of favorite channels manually entered by the user comprises only sports channels.

In some embodiments, control circuitry 1004 may filter a set of important content types received by control circuitry 1004 based on a user profile. For example, control circuitry 1004 may retrieve, from the user profile, a preference corresponding to a user's favorite singer in a song contest, such as "Eurovision." Control circuitry 1004 may retrieve a set of important content types identifying each of the singers in the content as important. Control circuitry 1004 may compare each of the singers to the singer identified in the user profile to determine if the content type is important to the user (e.g., the content type matches user profile data). If the content type is not important to the user, control circuitry 1004 may ignore the content type.

In some embodiments, control circuitry 1004 may retrieve metadata corresponding to the first media asset, wherein the metadata comprises a set of media characteristics corresponding to a first media asset. For example, control circuitry 1004 may retrieve metadata stored locally or remotely to control circuitry 1004 (e.g., storage 1008 or media guidance data source 1118 accessed via communications network 1114). Control circuitry 1004 may parse the metadata to identify characteristics corresponding to the first media asset. Control circuitry 1004 may compare the metadata to user preferences to determine if the user would generally find the media to be important. For example, control circuitry may detect that a user has a strong dislike for cooking shows. Control circuitry 1004 may therefore determine that the user may not find any portion of any cooking show important. In another example, control circuitry 1004 may determine that the user has a very strong preference for football (e.g., all football games are important to the user). Control circuitry 1004 may therefore determine that a portion of a football game that simply shows the user's favorite team on the offensive is important to the user, even if at that moment there is activity that would otherwise be regarded as not important.

In some embodiments, the metadata describing the genre of the media content (e.g., football versus cooking) may be compared to the user's profile and additionally the content of the relevant portion of the media may be utilized in making the determination as to whether a portion of the media content is important to the user. For example, for a user with a very strong preference for football, control circuitry 1004 may determine that a play at the fifty yard line is important to the user, even if there is a low probability for a touchdown at that moment (for example, the play may be determined to be important if the user's favorite team is on the offensive during that play). Conversely, for a user with only a medium preference for football, control circuitry 1004 may determine that the play at the fifty yard line is not important to the user, but a play within a couple yards of the end zone, which would have a higher probability for a touchdown as compared to the play at the fifty yard line, is important to the user with a medium preference for football.

For example, control circuitry 1004 may weight an importance of a preference on a 1-5 scale. Control circuitry 1004 may, for example, analyze media previously viewed by a user and may enumerate a number of media assets matching each genre associated with a media asset. Control circuitry 1004 may rank the genres based on the number of media assets matching the genre (e.g., to determine which genre a user had previously viewed the most). Control circuitry 1004 may associated a 1-5 weight to each of the top five most viewed genres. For example, if the first user's third most viewed genre is sports, control circuitry 1004 may assign a weight of two to the sports category for the user. In another example, if a second user's most viewed genre is sports, control circuitry 1004 may assign a weight of five to the sports category for the user.

In some embodiments, control circuitry 1004 may use a weight of a user preference to determine whether a portion of the first media asset is important. For example, control circuitry 1004 may determine that a portion of a first media asset corresponds to a passing play 50 yards away from an end zone (e.g., a play having low probability of scoring). Control circuitry 1004 may retrieve an importance or weight corresponding to the play. For example, control circuitry 1004 may determine that a passing play 50 yards away from an end zone (e.g., a content type) has a weight of two by cross referencing "50 yard passing play" with a database listing content type weight pairs. In another example, the media guidance application may determine a weight for the content type based on a user profile. For example, control circuitry 1004 may determine that a user is only interested in rushing plays in a football game. Accordingly, control circuitry 1004 may compute a low weight for the content type if the play is a passing play but may compute a high weight for the content type if the play is a rushing play.

Control circuitry may, for example compute an importance of the portion as the weight of the portion multiplied by the weight of the user preference. For example, control circuitry 1004 may determine that the weight of the sports preference for a first user is two. Control circuitry 1004 may determine that the weight of the portion for the first user is four (e.g., the weight of the preference multiplied by the weight of the content type). Control circuitry 1004 may retrieve a threshold value (e.g., from memory) for determining whether the portion is important. For example, control circuitry 1004 may retrieve a threshold of five from a memory (e.g., a database remote from control circuitry 1004). Control circuitry 1004 may compare the threshold to the weight of the portion for the first user and may determine since the weight of the portion is less than the threshold that the portion is not important to the user.

In another example, control circuitry 1004 may retrieve a weight of a preference for sports of 5 for a second user. Control circuitry 1004 may multiply the weight of the preference (e.g., five) by the weight of the content type (e.g., two) and may determine that the result is above the threshold (e.g., five). In response to the determination, control circuitry 1004 may determine that the portion is important to the second user (e.g., but not the first user).

For example, the media guidance application may analyze header fields of the metadata to identify a header field identifying a set of media characteristics corresponding to the first media asset. Alternatively, control circuitry 1004 may build a set of media characteristics corresponding to the first media asset based on the metadata. For example, control circuitry 1004 may detect media characteristics in the metadata, such as a genre, runtime, leading actor/actress, etc. Control circuitry 1004 may store each of the media characteristics in a data structure in memory (e.g., storage 1008) for later comparison.

In some embodiments, control circuitry 1004 may determine whether the portion of the first media asset is important based on metadata identifying important portions of the first media asset. For example, control circuitry 1004 may detect, in the metadata identifying an important portion with a beginning delimited by a first position in the first media asset and an ending delimited by a second position in the first media asset. Details of the structure of the metadata are discussed further in relation to FIG. 14.

Control circuitry 1004 may parse the metadata to identify important portions of the first media asset (e.g., by identifying the first position and the second position corresponding to the first media asset). Control circuitry 1004 may compare the portion of the first media asset with the portions identified in the metadata to determine if there is any overlap. For example, control circuitry 1004 may determine, based on the metadata, that an important movie scene occurs between 30 minutes from a beginning of the movie and 35 minutes from a beginning of the movie. Control circuitry 1004 may determine that the portion spans 40 minutes from the beginning of the movie to 42 minutes from the beginning of the movie (e.g., based on the time window as described above). Accordingly, because control circuitry 1004 determines that the portion does not overlap with the important scene, control circuitry 1004 may determine that the portion is not important. In contrast, if control circuitry 1004 determines that the portion spans the times of 34 minutes to 36 minutes, control circuitry 1004 may determine that the portion is important (e.g., because the portion includes an important scene of the first media asset).

In some embodiments, control circuitry 1004 may generate for display a visual indication of an important portion to the user. For example, control circuitry 1004 may generate for display a visual indication of an important portion of a media asset in a timeline corresponding to the media (e.g., so that a user can quickly jump to important portions or know when an important portion is upcoming). For example, control circuitry 1004 may retrieve metadata corresponding to a media asset listing important portions of the media as described above. Control circuitry 1004 may correlate the important portions with portions of a timeline corresponding to the media to identify frames of the media corresponding to the important portion. Based on the correlation, control circuitry 1004 may generate a progress indicator, such as progress bar 114. Control circuitry 1004 may visually distinguish important portions of the media in the progress bar (e.g., progress bar 114) from portions of the media that are not by, for example, shading and/or coloring the regions of the timeline corresponding to important portions differently than regions of the timeline corresponding to all other portions. For example, control circuitry may display important portions such as first important portion 104 and second important portion 108 in shading different than buffered portion 106, since control circuitry 1004 may have determined that buffered portion 106 is not important.

In some embodiments, in response to determining that the portion of the first media asset generated for display in the full-screen mode is not important, control circuitry 1004 may generate for display (e.g., on display 1012) the second media asset in the full-screen mode. For example, control circuitry 1004 may identify that the portion of the first media asset is not important as described above. In response to determining that the portion is not important, the media guidance application may identify a location of the second media asset (e.g., locate a channel corresponding to the second media asset as described above) and may generate for display the second media asset in the full-screen mode (i.e., replacing the first media asset in the full-screen mode). The media guidance application may generate for display the second media asset in the full-screen mode because the user will not miss any important content in the first media asset by changing to the second media asset (e.g., because the media guidance application determined that the portion does not have important content).

Figure 2:
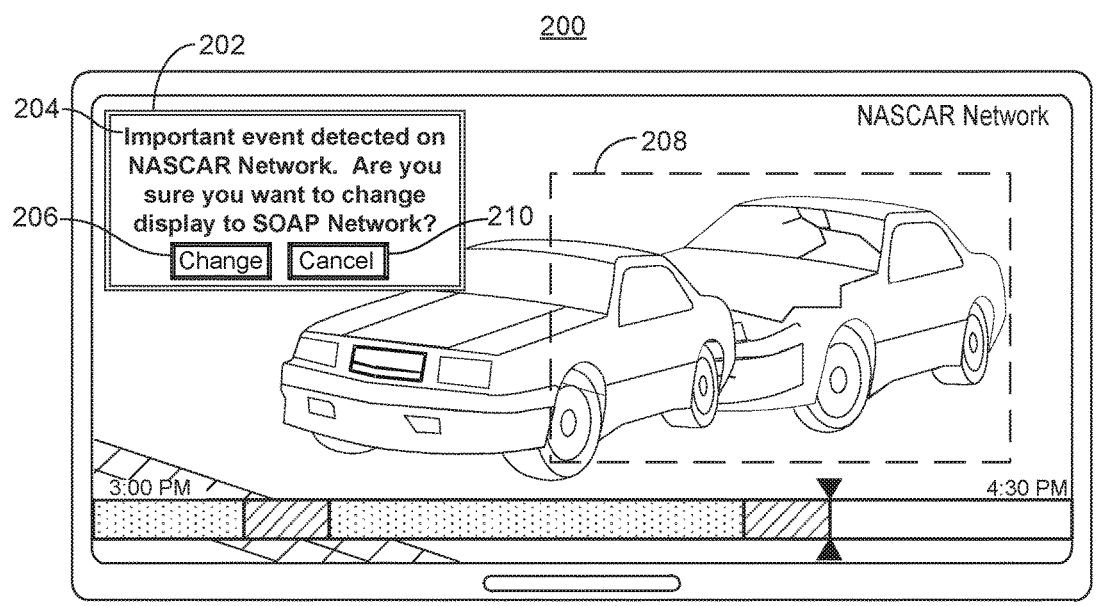
FIG. 2 shows an illustrative example of a prompt to confirm selection of a second media asset, not blocking important content in a first media asset in accordance with some embodiments of the disclosure.

FIG. 2 shows an illustrative example of a prompt to confirm selection of a second media asset, generated by control circuitry 1004 away from important content in accordance with some embodiments of the disclosure. User equipment 200 is depicted having prompt 202 (e.g., generated for display by control circuitry 1004) prompting a user to confirm selection of the second media asset. Control circuitry 1004 may generate for display a prompt message 204 describing a reason for not automatically proceeding with the selection (e.g., because the user will miss important content if display is changed to a second media asset). Control circuitry 1004 may generate for display change button 206, and cancel button 210 to allow the user to confirm their selection. Important content area 208 may depict a region of a display as having content, as determined by control circuitry 1004, that is important.

In some embodiments, control circuitry 1004 may generate for display a prompt 202 in response to determining that the portion of the first media asset has important content. For example, control circuitry 1004 may generate for display a message in the prompt (e.g., prompt 202) to inform the user about the important content in the first media asset (e.g., via prompt message 204). For example, control circuitry 1004 may generate for display a description of the important content (e.g., by identifying the important content via image-processing or by receiving metadata describing the important content as described above). Control circuitry 1004 may also generate for display a time when the important content will be generated for display. For example, the media guidance application may determine that important content begins at a time 30 minutes from the beginning of the first media asset. Control circuitry 1004 may determine that a current position in the first media asset (e.g., position corresponding to progress indicator 110) is 25 minutes from the beginning of the first media asset and may subtract the time when the important content begins from the current position to provide a time estimate (e.g., a prompt informing the user that the important content begins in five minutes).

In some embodiments, control circuitry 1004 may analyze portions of the first media asset a threshold time away from a current position in the first media asset. For example, control circuitry 1004 may retrieve a threshold corresponding to an amount of time, frames, etc. to look ahead in a media asset. For example, control circuitry 1004 may retrieve a threshold identifying a look ahead time of five minutes (e.g., control circuitry 1004 is to look at portions of the media asset five minutes ahead of a current position in a media asset to determine if there is important content at the position). For example, control circuitry 1004 may analyze frames of a program stored on a DVR with storage hosted locally or remotely to control circuitry 1004. For example, control circuitry 1004 may request frames of the media asset from the DVR storage device corresponding to a portion 5 minutes ahead of a current position in the media.

In another example, control circuitry 1004 may buffer frames corresponding to a video on demand (VOD) media to enable smooth playback of the VOD media. Control circuitry 1004 may analyze frames in the buffer to determine whether upcoming frames in the media asset have important content, as described above. In some embodiments, control circuitry 1004 may look ahead a variable amount of time in the media. For example, control circuitry may analyze frames of a buffer corresponding to the media to determine whether frames in the buffer have important content, as described above. As control circuitry 1004 detects changes in network load, the buffer of frames available to control circuitry 1004 may vary, resultantly, the amount of time that control circuitry 1004 looks ahead may vary.

In another example, control circuitry 1004 may compute a threshold amount of time to look ahead based on a length of the media asset (e.g., control circuitry 1004 may look ahead for five minutes for a two hour long media asset but may look ahead for two minutes for a 30 minute long media asset.

In another example, control circuitry 1004 may utilize a broadcast delay to determine whether important content corresponds to an upcoming segment. For example, control circuitry 1004 may determine that a live media asset has a broadcast delay of seven seconds. Control circuitry 1004 may utilize the broadcast delay to retrieve metadata corresponding to content seven seconds ahead of a current position in the media asset; or may retrieve frames corresponding to the broadcast delay and may perform an image-processing algorithm on the frames to determine whether they contain important content, as described above.

In some embodiments, control circuitry 1004 may receive a third input (e.g., via user input interface 1010) of a third selection of at least one of the first and the second media asset. For example, following the illustrative example prompt 202, in response to detecting selection of change button 206 (e.g., by detecting the input via user input interface 1010), control circuitry 1004 may generate for display the second media asset in full-screen mode (i.e., replacing the first media asset in full-screen mode) because the user wants to proceed with viewing the second media asset despite the notification that important content on the first media asset will be missed. In response to detecting selection of cancel button 210, control circuitry 1004 may generate for display the second media asset in a window mode overlaying the first media asset so that the user does not miss the important content or content of the second media asset.

In some embodiments, control circuitry 1004 may identify a location of a prompt based on a location of the important content. For example, control circuitry 1004 may perform image analysis on a frame corresponding to the important portion (as described above) to identify important content in the frame. Control circuitry 1004 may identify pixel data corresponding to the important content to identify a location of the important content relative to the pixels of the full-screen mode (e.g., by performing the image-processing techniques as described above or by receiving metadata listing coordinates of important content). Based on identifying the pixels, control circuitry 1004 may identify an area of the display screen having important content, such as important content area 208.

Control circuitry 1004 may use the important content area (e.g., important content area 208) as a boundary for where a message or a window should never block (e.g., because then the user may miss the important content). Control circuitry 1004 may use an image-tracking algorithm to trace a path taken by content deemed to be important by control circuitry 1004 and may update the important content area accordingly. For example, control circuitry 1004 may identify a football in a football game as an important content type (e.g., because the football may be near an end zone and there may be a higher chance of a team scoring a touchdown) using methods described above. Control circuitry 1004 may identify a location of the football on the screen and may subsequently trace the path of the football using an image-tracking algorithm or using metadata identifying a location of the football on the screen (e.g., display 1012). In an example, if the football traverses the screen from left to right in a sequence of 10 frames, control circuitry 1004 may update the important content area (e.g., important content area 208) for each frame of the 10 frames such that the important content area tracks the football from the left side to the screen to the right side of the screen.

In some embodiments, in response to updating the important content area, control circuitry 1004 may update a location of a window or a prompt to avoid the important content area. For example, control circuitry 1004 may store a location of a window or a prompt, such as prompt 202, in memory. Control circuitry may compare the location of the prompt with the location of the important content area (e.g., important content area 208) to determine whether there is overlap. In response to detecting overlap (e.g., by comparing the locations of the pixels of the message or prompt with the location of the pixels of the important content area), control circuitry 1004 may generate for display the prompt or the window in a different area of the display screen (e.g., on display 1012) such that the windows no longer overlap.

For example, control circuitry 1004 may store four coordinates (e.g., pixel locations) corresponding to a rectangle about the window or prompt and four coordinates corresponding to the important content area. Control circuitry 1004 may linearly interpolate lines between each of the four coordinates to identify the rectangle about the message or prompt and the rectangle about the important area. Control circuitry 1004 may compare the points of the interpolations to determine if lines of a first rectangle bisect lines of a second rectangle. If control circuitry 1004 determines that the lines bisect, control circuitry 1004 determines that the window or prompt covers important content.

Figure 3:
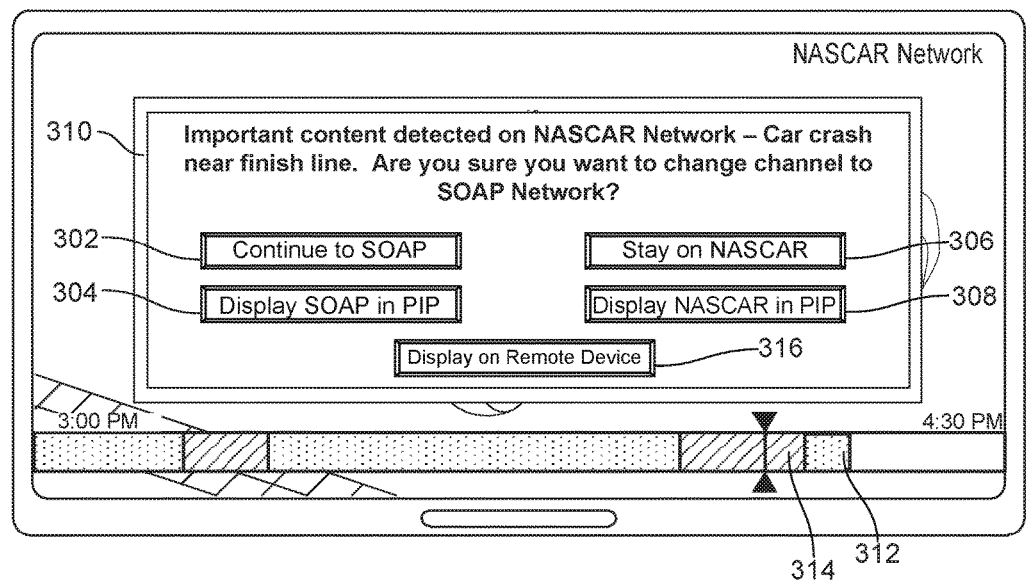
FIG. 3 shows an illustrative example of a prompt to request a user action in response to detecting important content in accordance with some embodiments of the disclosure.

FIG. 3 shows an illustrative example of a prompt generated by control circuitry 1004 to request a user action in response to detecting important content in accordance with some embodiments of the disclosure. User equipment 300 is depicted having a detailed confirmation prompt, such as detailed prompt 310. Detailed prompt 310 may comprise buttons such as continue button 302, stay button 306, PIP button 304, swap PIP button 308, and display on remote device button 316. Additionally, user equipment 300 is depicted having a progress bar with indications such as buffered important portion 314 and unviewed buffered portion 312. In some embodiments, control circuitry 1004 may generate for display some or all elements of FIG. 3 for display on a display device, such as display 1012.

In some embodiments, in response to determining that the portion comprises important content, control circuitry 1004 may generate for display detailed prompt 310. Control circuitry 1004 may generate for display detailed prompt 310, like prompt 202, to inform the user about important content in the first media asset and to confirm selection of the second media asset having knowledge of the important content. Control circuitry 1004 may generate for display detailed prompt 310 to enable to present to the user further options to optimize viewing experience of the media having important content.

For example, control circuitry 1004 may generate for display a button such as continue button 302. Control circuitry 1004 may detect selection of a button, such as continue button 302, stay button 306, PIP button 304, swap PIP button 308, or display on remote device button 316 (e.g., by detecting a infrared pulse at an infrared detector at user input interface 1010 or by detecting touch-screen input selecting one of the buttons). Control circuitry 1004 may correlate the infrared pulse or touch-screen selection (e.g., received via user input interface 1010) with a location on the screen (e.g., display 1012). Control circuitry 1004 may compare the location on the screen with the location of the buttons to identify a button of the buttons corresponding to the input. This is just an exemplary method for preventing blocking of important content, other methods for preventing blocking of important content may be used.

In some embodiments, control circuitry 1004 may buffer at least one of the first and the second media asset in response to the prompt. For example, control circuitry 1004 may determine that a prompt, such as detailed prompt 310, cannot be generated for display by control circuitry 1004 without blocking the important content of the first media asset (e.g., based on interpolating points corresponding to the important content and points corresponding to the prompt as described above). Control circuitry 1004 may 'pause' the first media asset at the second time and may store frames of at least one of the first and the second media asset. For example, control circuitry 1004 may store frames of a media asset at a point when the prompt is generated for display by control circuitry 1004, or control circuitry 1004 may store frames of a media asset at a point when control circuitry 1004 receives the second selection. For example, control circuitry 1004 may store the frames, so that control circuitry 1004 can generate for display the frames at a time later than the second selection (e.g., so that important content is not missed by the user while control circuitry 1004 is awaiting input from the user, the frames may be missed). For example, control circuitry 1004 may generate for display the prompt at 4:00 PM. Control circuitry 1004 may buffer frames of the first and of the second media asset after 4:00 PM until the prompt is cleared. In response to detecting selection of the first media asset (e.g., via user input interface 1010) using control circuitry 1004, control circuitry 1004 may generate for display (e.g., on display 1012) the buffered frames corresponding to the first media asset (e.g., the frames of the first media asset corresponding to a position in the first media asset at 4:00 PM, when the prompt was generated for display). In response to detecting selection of the second media asset (e.g., via user input interface 1010) using control circuitry 1004, control circuitry 1004 may generate for display the buffered frames corresponding to the second media asset (e.g., the frames of the second media asset corresponding to a position in the second media asset at 4:00 PM, when the prompt was generated for display).

In some embodiments, control circuitry may buffer portions of important content and of non-important content of the first media asset. Control circuitry 1004 may depict a visual representation of the portion of buffered important frames in a progress bar (e.g., buffered important portion 314) having a different visual representation than non-important buffered frames, such as unviewed buffered portion 312.

In some embodiments, control circuitry 1004 may detect a user input request to generate for display the second media asset in response to generating for display the detailed prompt (e.g., via user input interface 1010). For example, control circuitry 1004 may detect selection of a button to confirm selection of the second media asset, such as a selection of continue button 302. In response to detecting selection of continue button 302, control circuitry 1004 may generate for display the second media asset in the full-screen mode (e.g., a media asset on SOAP Network because, for example, the user may not care about the important content detected by control circuitry 1004).

In some embodiments, control circuitry 1004 may generate for display the second asset a time corresponding to the second selection. For example, control circuitry 1004 may buffer packets of the second media asset after control circuitry 1004 detects the second selection (e.g., the selection which causes the prompt to be generated for display). Control circuitry 1004 may generate for display the second media asset at the point beginning with the frames in the buffer.

In some embodiments, control circuitry 1004 may detect a user input request to generate for display the first media asset in response to generating for display the detailed prompt (e.g., via user input interface 1010). For example, control circuitry 1004 may detect selection of a button to cancel or delay selection of the second media asset, such as a selection of stay button 306. In response to detecting selection stay button 306, control circuitry 1004 may generate for display the first media asset in the full-screen mode.

In some embodiments, control circuitry 1004 may generate for display the first media asset in the full-screen mode until the important portion is detected by control circuitry 1004 as completed. For example, control circuitry 1004 may determine that the first media asset has an important portion spanning the times of 4:20 PM to 4:25 PM. If control circuitry 1004 detects user selection of the second media asset at 4:22 PM control circuitry 1004 may generate for display, in the full-screen mode, the first media asset without generating for display the second media asset (e.g., to block display of the second media asset). Control circuitry 1004 may generate for display the second media asset when control circuitry 1004 determines that there is no longer important content in the first media asset (e.g., after 4:25 PM).

In some embodiments, control circuitry 1004 may generate for display a prompt confirming display of the second media asset once the first media asset no longer has important content. For example, control circuitry 1004 may prompt the user to confirm whether control circuitry 1004 should generate for display the second media asset after the first media asset no longer is detected by control circuitry 1004 to have important content.

In some embodiments, control circuitry 1004 may buffer portions of the second media asset when display of the second media asset is blocked by control circuitry 1004. For example, control circuitry 1004 may store in a buffer a set of frames corresponding to the second media asset from a time when a selection of the second media asset takes place (e.g., 4:22 PM) control circuitry 1004 may generate for display the second media asset at a point corresponding to the frames in the buffer (e.g., so that the user does not miss out on content of the second media asset).

In some embodiments, control circuitry 1004 may detect a user input request (e.g., via user input interface 1010) to generate for display the second media asset in a partial screen window overlaid over content being displayed, such as the first media asset e.g. For example, control circuitry 1004 may detect selection of a button such as PIP button 304. Control circuitry 1004 may generate for display the second media asset in a partial screen window overlying content being displayed, such as the first media asset, in response to the selection. Display of the partial screen window of the second media asset is discussed further in detail in relation to FIG. 12.

In some embodiments, control circuitry 1004 may detect a user input request to generate for display the first media asset in a partial screen window overlying content being displayed, such as the second media asset (e.g., via user input interface 1010). For example, control circuitry 1004 may detect selection of a button such as PIP button 304. Control circuitry 1004 may generate for display the first media asset in a partial screen window overlaying the second media asset in response to the selection. Display of the partial screen window of the first media asset is discussed further in detail in relation to FIG. 13.

Figure 4:
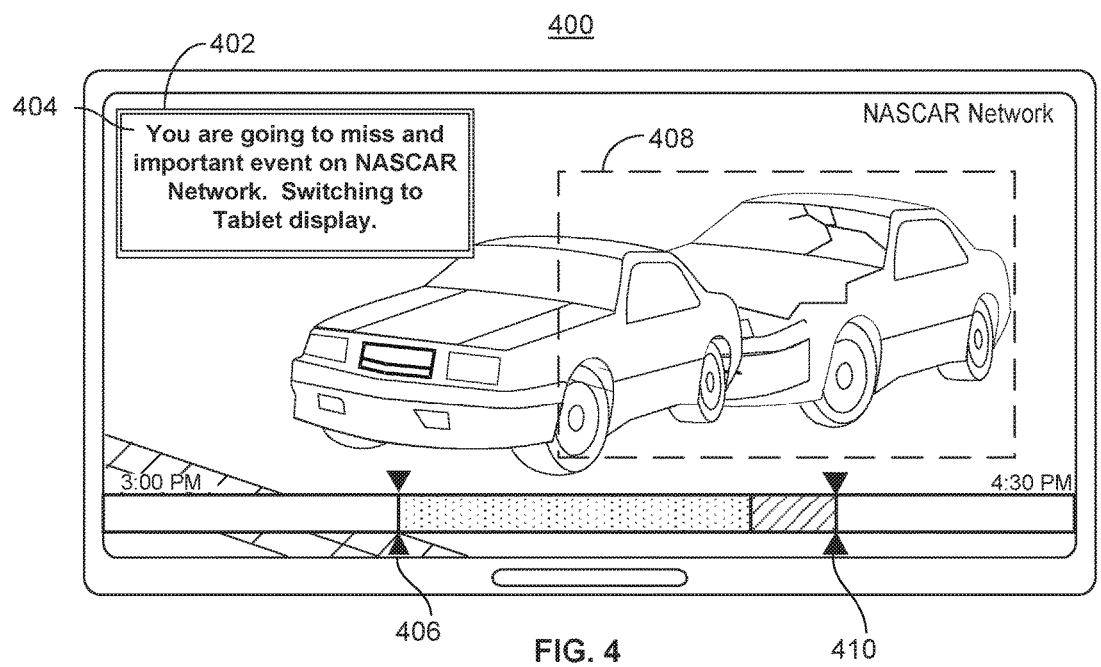
FIG. 4 shows an illustrative example of a prompt in response to determining that the user is going to miss important content.

FIG. 4 shows an illustrative example of a first media asset having important content generated for display in a full-screen mode on a first user equipment device (e.g., user equipment device 1000, user television equipment 1102, user computer equipment 1104 or wireless user communications device 1106). First user equipment 1300 is depicted having a display, such as display 1012 having an important content prompt 402, having an important content prompt message 404, having first time 406, having important content region 408, and having second time 410.

In some embodiments, control circuitry 1004 may receive, from a first user input device (e.g., user input interface 1010), at a first time (e.g., first time 406), a first selection of a first media asset for display on a first display device (e.g., display 1012). The first display may be associated with a first user equipment device, such as first user equipment 400. For example, as described above, control circuitry 1004 may receive, at a first time, over a network connection such as communications network 1114, a packet comprising data uniquely identifying a first media asset for display on the first user equipment device. Control circuitry 1004 may detect the packet in response to a user action, such as a user action selecting the first media asset from a list of media assets in a remote library, such as a library stored at media content source 1116.

In some embodiments, in response to receiving the first selection, the media guidance application may generate for display, at the first user equipment device (e.g., first user equipment 400), the first media asset on the first display device (e.g., display 1012). For example, control circuitry 1004 may generate a request, for transmission over communications network 1114, to a content provider, such as media content source 1116. In response to the request, control circuitry 1004 may receive a video stream comprising frames corresponding to the first media asset. Control circuitry 1004 may generate for display the video stream on the display device (e.g., display 1012) associated with the first user equipment device (e.g., first user equipment 400).

In some embodiments, control circuitry 1004 may detect, at a second time, a user action preventing a viewing of the first media asset. For example, control circuitry 1004 may determine, at a second time after the user had already selected the first media asset, that the user wishes to change from viewing the first media asset in a full-screen mode to viewing a second media asset in a full-screen mode. Control circuitry 1004 may determine that changing from the first media asset to the second media asset will prevent a viewing of the first media asset because the first media asset will no longer be displayed on display 1012.

For example, control circuitry 1004 may determine that a user's viewing of the first media asset is prevented when a number of pixels corresponding to the first media asset will not be generated for display, or is no longer generated for display on the first display device. For example, control circuitry 1004 may determine a number of pixels corresponding to the first media asset generated for display on the first display device (e.g., display 1012). In some embodiments, control circuitry may make a determination on the number of pixels based on a resolution of the first media asset. Control circuitry 1004 may retrieve the metadata corresponding to the first media asset identifying a resolution of the first media asset (e.g., via communications network 1114) or control circuitry may determine a number of pixels based on a display a size (e.g., in pixels) of a display window in which the first media asset is displayed (e.g., picture-in-picture window 1202). For example, control circuitry may determine that a pop-up window is preventing all but 800 pixels corresponding to the first media asset. In another example, control circuitry 1004 may determine that zero pixels corresponding to the first media asset are generated for display on the first display device, because, for example, a user changed channel from a first channel displaying the first media asset to a second channel displaying a second media asset.

In another example, control circuitry 1004 may determine that a user's viewing of the first media asset is prevented when a region of the first media asset having important content, such as important content region 408, will not be fully or partially visible to the user. For example, control circuitry 1004 may identify vertices (e.g., locations of pixels) of a region surrounding important content (e.g., by receiving an indication of a location of the important content via media content data source 1118 or by determining a location of the important content within a display accessible to control circuitry 1004 as described above). Control circuitry 1004 may determine whether an image or video, such as a pop-up notification, a menu overlay, or a picture-in-picture window will be generated for display, by control circuitry 1004, within a region of points (e.g., pixels) interpolated as within important content region 408. For example, control circuitry 1004 may determine the vertices of important content region 408 and the vertices of an overlay, such as a picture-in-picture window. Control circuitry 1004 may linearly interpolate points between vertices to form a first perimeter surrounding important content region 408 and a second perimeter surrounding the picture-in-picture window. Control circuitry 1004 may determine whether the first perimeter bisects the second perimeter. If control circuitry 1004 determines that the first perimeter bisects the second perimeter, control circuitry 1004 may determine that the important content is prevented.

Control circuitry 1004 may determine whether a threshold percentage of the first media asset is prevented. For example, control circuitry 1004 may determine that the first media asset takes up 1900 pixels on the first display device (e.g., display 1012). Control circuitry 1004 may retrieve a threshold minimum number of pixels from memory (e.g., storage 1008) such as 20%. Control circuitry 1004 may determine that 20% of 1900 is 200. Control circuitry 1004 may compare the threshold minimum number of pixels, in this example 200, to the number of pixels corresponding to the first media asset generated for display on the first display device (e.g., 0 or 100). Based on the comparison, control circuitry 1004 may determine that, because a number of pixels corresponding to the first media asset generated for display on the first display device is less than the threshold minimum number of pixels, that viewing of the first media asset is prevented.

In some embodiments, control circuitry 1004 may determine that a user's viewing of the first media asset is prevented when the user is no longer within a threshold distance from the first user equipment device. For example, if control circuitry 1004 determines that a user has exited a room in which the first media asset is being generated for display, control circuitry 1004 may determine that a viewing of the first media asset is prevented.

In some embodiments, control circuitry 1004 may approximate a position of a user based on a location of a device associated with the user. For example, control circuitry 1004 may determine, at the first time, that a second user equipment device is within a first distance of the first user equipment device. For example, control circuitry 1004 may communicate wireless (e.g., via communications path 1112) to a plurality of user equipment devices. Control circuitry 1004 may identify each user equipment device based on a unique identifier associated with each user equipment device. Control circuitry 1004 may retrieve a unique identifier for each device that is within a wireless range of control circuitry 1004 (e.g., by querying each device within a wireless range, or by querying a centralized network device having a listing of all devices within a wireless range). Control circuitry 1004 may compare each unique identifier to a profile associated with a user to determine whether a unique identifier appears in the profile of the user. If control circuitry 1004 determines that the unique identifier appears in the profile of the user, control circuitry 1004 may determine that the user equipment device belongs to the user.

In some embodiments, control circuitry 1004 may identify a plurality of user equipment devices within the wireless range that belong to the user. For example, control circuitry 1004 may transmit a network discovery packet over a network connection shared with a plurality of user equipment devices. Control circuitry 1004 may aggregate a list of user equipment devices that respond to the discovery packet. Control circuitry 1004 may determine whether a device of the aggregated list of devices is within a number of hops to control circuitry 1004 to approximate whether a device is within a range of the first user equipment device. For example, control circuitry 1004 may determine, that if a device is greater than a threshold number of hops away from the control circuitry 1004, that the device is not in close proximity to the first user equipment device. In some examples, control circuitry 1004 may determine that a plurality of user equipment devices are within a range of the first user equipment device. For example, control circuitry 1004 may determine that the user has a tablet, a smartphone, a smart watch, and augmented reality glasses within a range of control circuitry 1004.

In some embodiments, control circuitry 1004 may identify a user equipment device most likely to approximate a location of the user. For example, control circuitry may retrieve user profile data (e.g., from media guidance data source) identifying a user equipment device of the plurality of user equipment devices as a user's primary device. For example, control circuitry 1004 may detect data identifying the smartphone as the user's primary device and may therefore assume that a location of the smartphone corresponds to a location of the user. In another example, control circuitry 1004 may approximate a location of the user based on usage parameter of a user equipment device. For example, control circuitry 1004 may query the augmented reality glasses to determine whether a display (e.g., display 1012) of the augmented reality glasses is turned on (e.g., usage parameter). Control circuitry 1004 may determine that a location of the augmented reality glasses likely approximates a location of the user if the screen of the augmented reality glasses is turned on (e.g., because presumably the user is using the augmented reality glasses).

In some embodiments, control circuitry 1004 may request verification of an identity of a user to approximate a location of the user. For example, control circuitry 1004 may verify a user of the augmented reality glasses by collecting biometric data about the user (e.g., such as a retina scan) and may compare data from the retina scan to a database of user biometric data to verify that the user of the augmented reality glasses is the user. If control circuitry 1004 determines that the collected biometric data matches biometric data of the user, control circuitry 1004 may proceed to identify a location of the augmented reality glasses. Control circuitry 1004 may use any other technique to verify an identity of a user at the second user equipment device including requiring a password login and/or using an image-processing technique to verify whether a face of a user of the second user equipment device is the user.

In some embodiments, control circuitry 1004 may identify a position of the user based on a camera associated with the first user equipment device. For example, control circuitry 1004 may identify a position of the user using an object recognition algorithm. Control circuitry 1004 may identify a face within a visual field of the camera using the object recognition algorithm. Control circuitry 1004 may compare the face within the visual field to data representing the face of the user (e.g., stored in the user profile in storage 1008) to determine whether the faces match (e.g., by identifying features of the faces and solving a Bayesian decision problem to determine whether the face is a close enough match to the data representing the face of the user).

In some embodiments, control circuitry 1004 may approximate a distance of the user to the first user equipment device. For example, control circuitry 1004 may determine that the user is at a location of a user equipment device, such as a smartphone, using the steps described above. Control circuitry 1004 may determine a first relative received signal strength (RSSI) of a wireless signal at the first user equipment device and may determine a second RSSI of the wireless signal at the second user equipment device. Control circuitry 1004 may determine, based on a difference between the first RSSI and the second RSSI an estimated distance between the first user equipment device and the second user equipment device. In another example, control circuitry 1004 may measure received RF power over a shared wireless signal as opposed to the RSSI to estimate a location of the user.

In some embodiments, control circuitry 1004 may store (e.g., in storage 1008) data identifying the location of the user at a first time. For example, control circuitry 1004 may store, at the time when a user requests a first media asset, a location of the user (e.g., first time 406). For example, control circuitry 1004 may store in memory (e.g., storage 1008) data associating a RSSI corresponding to the second user equipment device with a first time, such as a system time when control circuitry 1004 detected a selection (e.g., via user input interface 1010) of the first media asset (e.g., first time 406). In some embodiments, control circuitry 1004 may periodically update a location of the second user equipment device. For example, control circuitry 1004 may identify an interval for polling the second user equipment device (e.g., based on a polling interval stored in storage 1008). Control circuitry 1004 may, at the polling interval, measure the RSSI corresponding to the second user equipment device and may store the measured RSSI in the memory (e.g., storage 1008).

In some embodiments, control circuitry 1004 may determine, at a second time (e.g., second time 410), that the second user equipment device is within a second distance of the first user equipment device, wherein the second distance is greater than the threshold maximum distance between the first user equipment device and the second user equipment device. For example, control circuitry 1004 may determine at a second time (e.g., second time 410) that the second user equipment device is at a second distance, different from the first distance. For example, control circuitry 1004 may determine a second location of the second user equipment device using any of the methods described above and may compare the second location to the first location stored in the memory (e.g., storage 1008). Control circuitry 1004 may retrieve a threshold maximum distance from memory (e.g., storage 1008) and may compare the second distance to the threshold distance to determine whether the second distance is greater than the threshold distance. If control circuitry 1004 determines that the second distance is greater than the threshold distance, control circuitry 1004 may determine that the user of the second user equipment device cannot view a display of the first user equipment device (e.g., display 1012), and a viewing by the user is therefore prevented.

In some embodiments, control circuitry 1004 may configure the threshold maximum distance based on a user input. For example, control circuitry 1004 may prompt the user for a distance from a display (e.g., display 1012) of the first user equipment device where the user can no longer see the display (e.g., display 1012). Control circuitry 1004 may store the distance in memory (e.g., storage 1008) as the threshold maximum distance.

In some embodiments, control circuitry 1004 may estimate the threshold maximum distance. For example, control circuitry 1004 may use sonar, lasers, depth cameras, or any other technique to approximate a size of a room in which a display of the first user equipment device is located. Control circuitry 1004 may compute the threshold maximum distance such that the threshold maximum distance is slightly greater than the size of the room (e.g., so that the maximum distance is outside of an area where the user can see the first display device). In another example, control circuitry 1004 may retrieve from a database an average size of a room and may compute the threshold maximum distance to be greater than or equal to the average size of the room.

In some embodiments, control circuitry 1004 may detect the user action preventing the viewing responsive to determining that the second distance is greater than the threshold maximum distance. For example, control circuitry 1004 may determine that if the user is greater than the threshold maximum distance away from a display (e.g., display 1012) accessible to the first user equipment device, that the user cannot view the display and therefore the user's view is prevented. Control circuitry 1004 may approximate a second distance of the user as described above and may retrieve a threshold maximum distance from a remote data source, such as media guidance data source 1118. Control circuitry 1004 may compare the second distance to the threshold maximum distance and may detect the user action preventing the viewing in response to determining that the second distance is greater than the threshold maximum distance.

In some embodiments, in response to detecting the user action, control circuitry 1004 may determine whether a portion of the first media asset, at a point within a time window from the second time, includes important content. For example, as described above, control circuitry 1004 may identify a portion of the first media asset corresponding to a time window from the second time. For example, control circuitry 1004 may determine a first boundary of the time window as the second time (e.g., second time 410). Control circuitry 1004 may retrieve a threshold time from memory, such as storage 1008, delimiting a window size, and may add the threshold time to the second time (e.g., second time 410) to create an upper boundary on the time window. Control circuitry 1004 may retrieve metadata corresponding to the portion of the first media asset within the time window and, based on the metadata, control circuitry 1004 may determine whether the portion has important content using any of the methods described above. In another example, control circuitry 1004 may determine if the portion has important content by performing an image-processing algorithm on the frames of the first media asset corresponding to the time window to detect whether there is important content in the portion using any of the methods described above.

In response to determining that the portion of the first media asset generated for display on the first display device is important, control circuitry 1004 may identify a second user equipment device capable of generating for display the portion of the first media asset on a second display device associated with the second user equipment device. For example, control circuitry 1004 may poll the second user equipment device for a list of capabilities associated with the second user equipment device. For example, control circuitry 1004 may transmit a packet over a network connection, such as communications network 1114, requesting capabilities of the second user equipment device (e.g., directly to the second user equipment device or to a database comprising capabilities of the second user equipment device). For example, control circuitry 1004 may receive specifications of the second user equipment device (e.g., a display size, video processing capabilities, etc.), a status of the second user equipment device (e.g., whether something is currently being displayed on the second user equipment device, a strength of a network connection of the second user equipment device), or a configuration of the second user equipment device (e.g., a version of software installed on the second user equipment device, a listing of applications installed on the second user equipment device).

Control circuitry 1004 may, based on the retrieved capabilities, determine whether the second user equipment device is able to generate for display the portion of the first media asset. For example, control circuitry 1004 may retrieve threshold minimum capabilities from memory (e.g., storage 1008) such as a minimum video processing capability, minimum network strength or bandwidth, display resolution, etc. Control circuitry 1004 may compare the retrieved minimum capabilities to the capabilities of the second user equipment device to determine whether the second user equipment device is capable of generating for display the portion of the first media asset.

In some embodiments, control circuitry 1004 may retrieve, (e.g., from a user profile associated with the user) a listing of user accounts accessible to the user via the second user equipment device. For example, control circuitry 1004 may retrieve from memory a user profile comprising a listing of media content providers for which the user has access. Based on the user profile, control circuitry 1004 may correlate the list of content providers for which the user has access with a listing of applications stored on the second user equipment device. Control circuitry 1004 may determine that if the user has an account with a media content provider, and if the second user equipment device has an application installed corresponding to the media content provider, that the second user equipment device is capable of retrieving media from the media content provider (i.e., the content provider is accessible to the user).

In some embodiments, control circuitry 1004 may identify a content provider of the plurality of content providers accessible to the user via the second user equipment device that is capable of providing access to the first media asset via the second user equipment device. For example, control circuitry 1004 may query each content provider of the plurality of content providers accessible to the user whether the respective content provider is capable of providing access to the portion of the first media asset. For example, control circuitry 1004 may identify the portion of the first media asset comprising important content as described above. Control circuitry 1004 may query each of the content providers of the plurality of content providers with data identifying the first media asset and data identifying a location of the important portion. Control circuitry 1004 may, based on a response to the query, determine whether a content provider of the plurality of content providers is capable of providing access to the first media asset at the portion. For example, control circuitry 1004 may query a content provider to determine whether the content provider is capable of starting a stream of the first media asset at the second portion. Control circuitry 1004 may select a content provider that is capable of providing access to the first media asset starting at the portion (e.g., portion of the first media asset corresponding to the second time).

In some embodiments, control circuitry 1004 may determine whether a viewing of the portion of the first media asset on the second display device (e.g., display 1012) would not be prevented. For example, control circuitry 1004, may based on the status of the second user equipment device, described above, determine whether a viewing of the portion of the first media asset will be prevented. For example, control circuitry 1004 may, based on the status, determine whether the user is using the display of the second user equipment device. For example, control circuitry 1004 may determine, based on the status, that a user is texting on the second user equipment device (e.g., a cell phone). Control circuitry 1004 may determine that a viewing of the first media asset is prevented because the user is texting (e.g., because control circuitry 1004 would need to interrupt the texting to generate for display the portion of the first media asset). In another example, control circuitry 1004 may determine that a viewing of the portion on the second display device would not be prevented if control circuitry 1004 determines that the second display device is in a standby mode (e.g., because waking the display from a standby mode would not interrupt another user activity).

Figure 5:
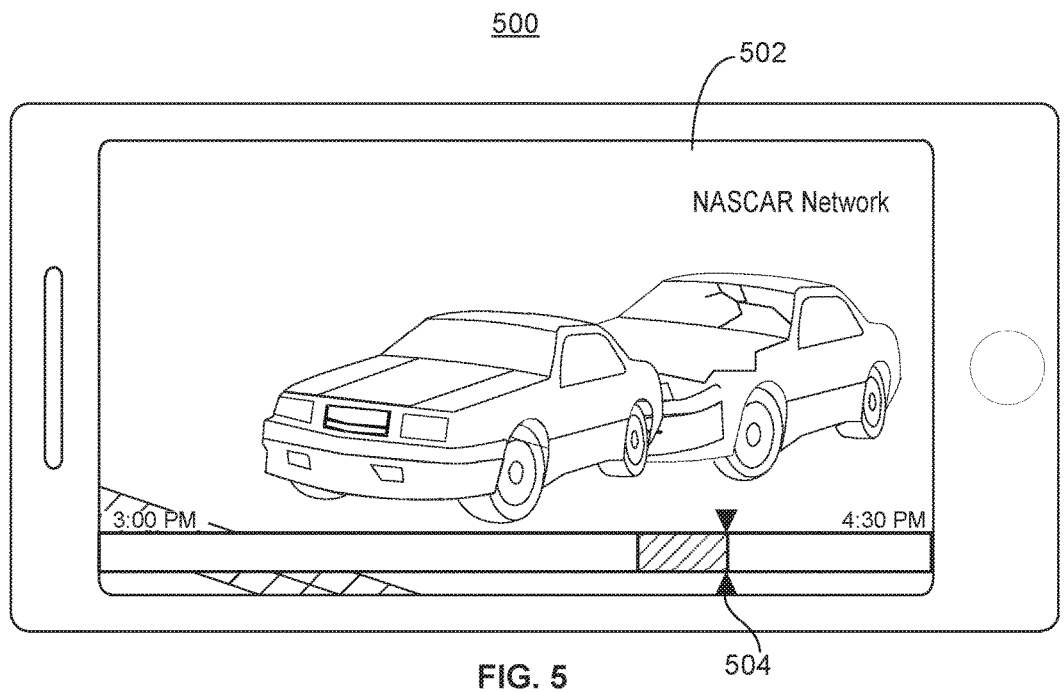
FIG. 5 shows an illustrative example of the important portion of the first media asset generated for display on the second user equipment device.

FIG. 5 shows an illustrative example of a first media asset having important content generated for display on a second display (e.g., display 1012) of a second user equipment device (e.g., user equipment device 1000, user television equipment 1102, user computer equipment 1104 or wireless user communications device 1106). Second user equipment 500 is depicted having a display, such as display 1012 having important content 502 beginning at important content time 504. In some embodiments, important content time 504 may be similar or equal to second time 410 with respect to the first media asset.

In some embodiments, control circuitry 1004 may generate for display, at the second user equipment device, the portion of the first media asset on the second display device (e.g., display 1012). For example, control circuitry 1004 may identify a content provider of the plurality of content providers accessible to the user capable of providing access to the portion of the first media asset at the second user equipment device. Control circuitry 1004 may identify an application program interface (API) that is capable of interfacing with an application corresponding to the identified content provider. For example, control circuitry 1004 may identify the content provider, such as Hulu. Control circuitry 1004 may identify an operating system of the second user equipment device (e.g., Android OS). Control circuitry 1004 may generate a request (e.g., a packet), based on an API matching the content provider (e.g., Hulu) and the operating system of the second user equipment device (e.g., Android OS), comprising an instruction to generate for display the portion of the first media asset on the second device (e.g., on display 1012). For example, control circuitry 1004 may generate a packet comprising data uniquely identifying the first media asset and may comprise data identifying a position in the first media asset of a beginning of the portion.

In some embodiments, control circuitry 1004 may need to transmit a series of requests to successfully generate for display the portion of the first media asset at the second user equipment device. For example, in response to determining that the second display (e.g., display 1012) is in a standby mode, control circuitry 1004 may transmit a request, based on the API, to wake the second display (e.g., display 1012) from the standby mode.

In some embodiments, control circuitry 1004 may generate for display a message window, such as important content prompt 402 comprising important content prompt message 404, indicating to the user that he or she is going to miss important content in the first media asset. For example, in response to determining that a viewing by the user of important content in the first media asset is prevented, control circuitry 1004 may display important content prompt 402.

In some embodiments, control circuitry 1004 may generate for display an indication of the second user equipment device. For example, control circuitry 1004 may generate for display information identifying to the user the device on which the important content will be displayed.

Figure 6:
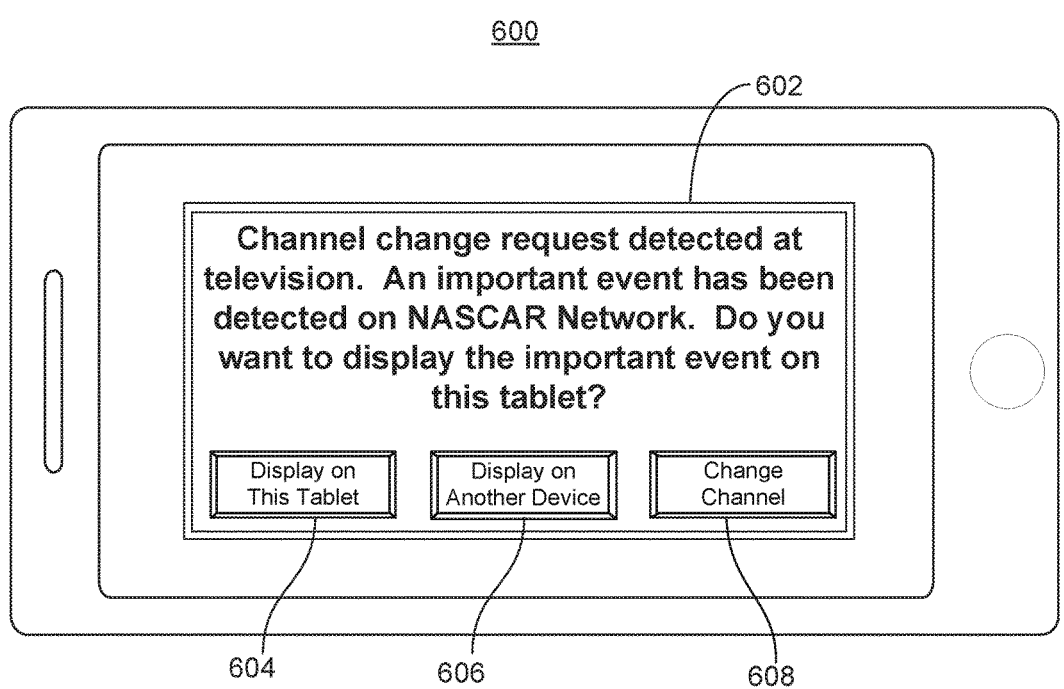
FIG. 6 shows an illustrative example of a prompt on whether to generate for display an important portion of the first media asset on the second user equipment device in response to detecting that a view of the first media asset is prevented.

FIG. 6 shows an illustrative example of a prompt on whether to generate for display (e.g., on display 1012) an important portion of the first media asset on the second user equipment device (e.g., user equipment device 1000, user television equipment 1102, user computer equipment 1104 or wireless user communications device 1106) in response to detecting that a view of the first media asset is prevented. Second user equipment 600 is depicted having a display, such as display 1012 having display event prompt 602 prompting the user whether he or she wants to display the important content on a user equipment device. Display event prompt 602 is depicted having a display on tablet option 604, a display on another device option 606, and a change channel option 608.

In some embodiments, control circuitry may generate for display, on the second display device (e.g., display 1012), the important content, as described above, in response to selection of display on tablet option 604. In some embodiments, control circuitry 1004 may generate for display a listing of user equipment devices accessible to control circuitry 1004 in response to selection of display on another device option 606. Control circuitry 1004 may receive a selection of a user equipment device of the listing of user equipment devices accessible to the user and may generate for display the portion of the first media asset on the selected user equipment device. For example, control circuitry 1004 may identify an API compatible with an application on the selected user equipment device and may, using the API, transmit a request to display the portion of the first media asset on the selected user equipment device.

In some embodiments, control circuitry 1004 may generate for display change channel option 608 in response to determining that the viewing of the important content is prevented because the user has requested a channel change. In response to selection of change channel option 608, control circuitry 1004 may proceed with changing a channel on the first user equipment device (i.e., preventing a view of the important content of the first media asset).

Figure 7:
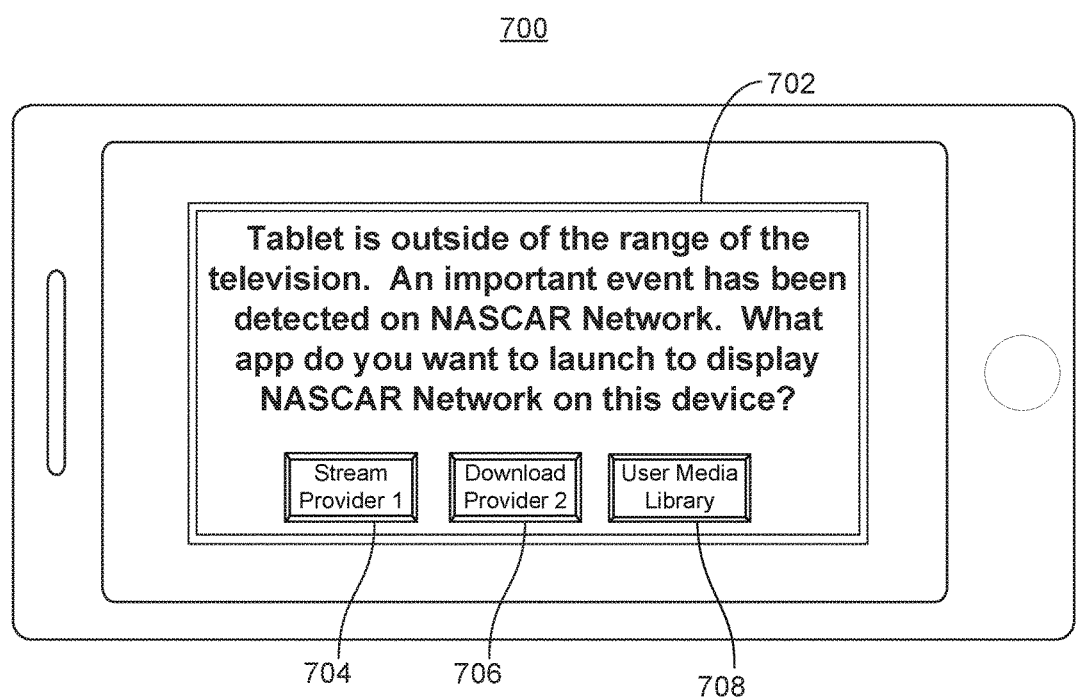
FIG. 7 shows an illustrative example of a prompt on where to source an important portion of the first media asset for display on the second user equipment device in response to detecting that a view of the first media asset is prevented.

FIG. 7 shows an illustrative example of a prompt on where to source an important portion of the first media asset on the second user equipment device (e.g., user equipment device 1000, user television equipment 1102, user computer equipment 1104 or wireless user communications device 1106) in response to detecting that a view of the first media asset is prevented. Second user equipment 700 is depicted having a display, such as display 1012 having source prompt 602 prompting the user to where he or she wants to source the important content of the first media asset. Source prompt 702 is depicted having stream option 704, download option 706 and media library option 708.

In some embodiments, control circuitry 1004 may determine that the first media asset is available from a plurality of content providers. For example, control circuitry 1004 may determine, as described above, that the user has access to a plurality of content providers and a subset of those content providers have access to the first media asset. In some embodiments, control circuitry 1004 may determine a mode for which the content provider is capable of providing access to the portion of the first media asset. For example, control circuitry 1004 may determine that a first content provider of the plurality of content providers can provide access to the portion via a digital stream. In response to determining that the first content provider can provide access to the portion via a digital stream, control circuitry 1004 may generate for display stream option 704.

In some embodiments, control circuitry 1004 may determine that a content provider is capable of providing access to the portion via a download. For example, control circuitry 1004 may query the content provider to determine a mode for which the content provider can deliver content. In response to determining that a second content provider of the plurality of content providers is capable of providing access to the content via a download, control circuitry 1004 may generate for display download option 706.

In some embodiments, control circuitry 1004 may determine that the user has a copy of the important portion of the first media asset in a media library of the user. For example, control circuitry 1004 may determine that the user has recorded the important portion of the first media asset (e.g., by querying a DVR on a network accessible to control circuitry 1004 as to whether it has the important portion). Control circuitry 1004 may determine that control circuitry 1004 can generate for display on the second user equipment device the important portion via the user media library. In response, control circuitry 1004 may generate for display media library option 708.

Figure 8:
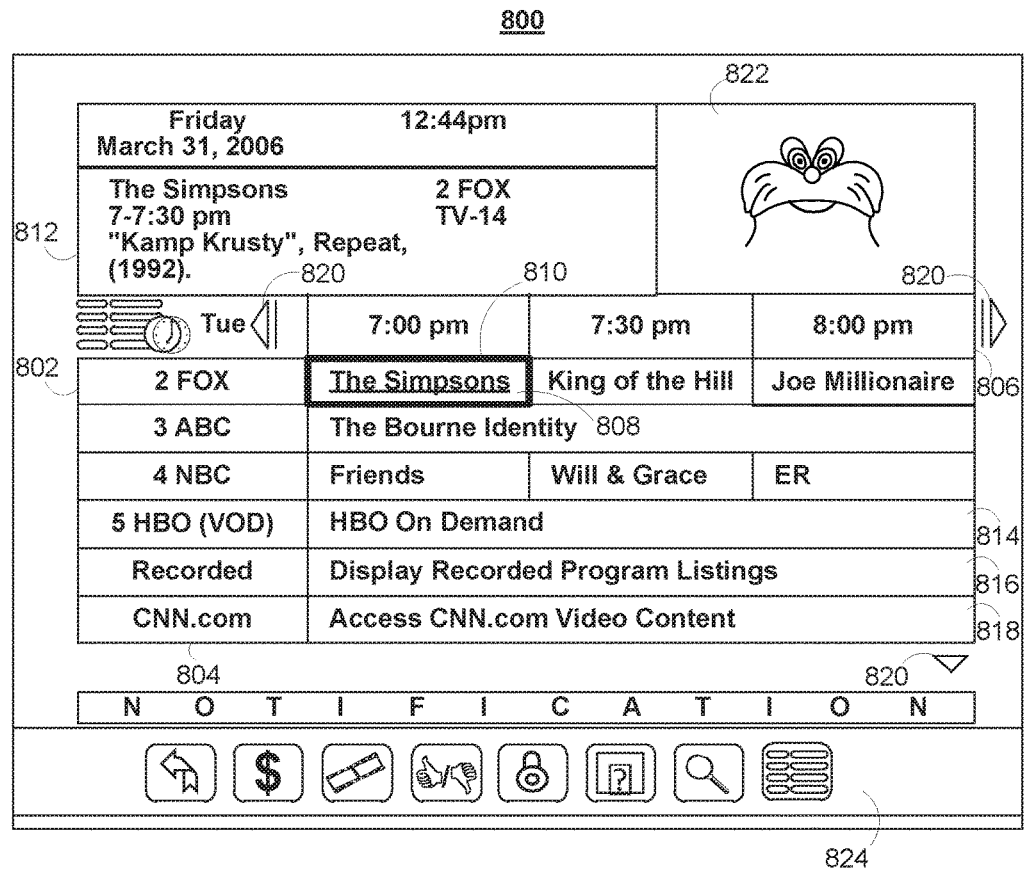
FIG. 8 shows an illustrative example of a media guidance display that may be presented in accordance with some embodiments of the disclosure.
Figure 9:
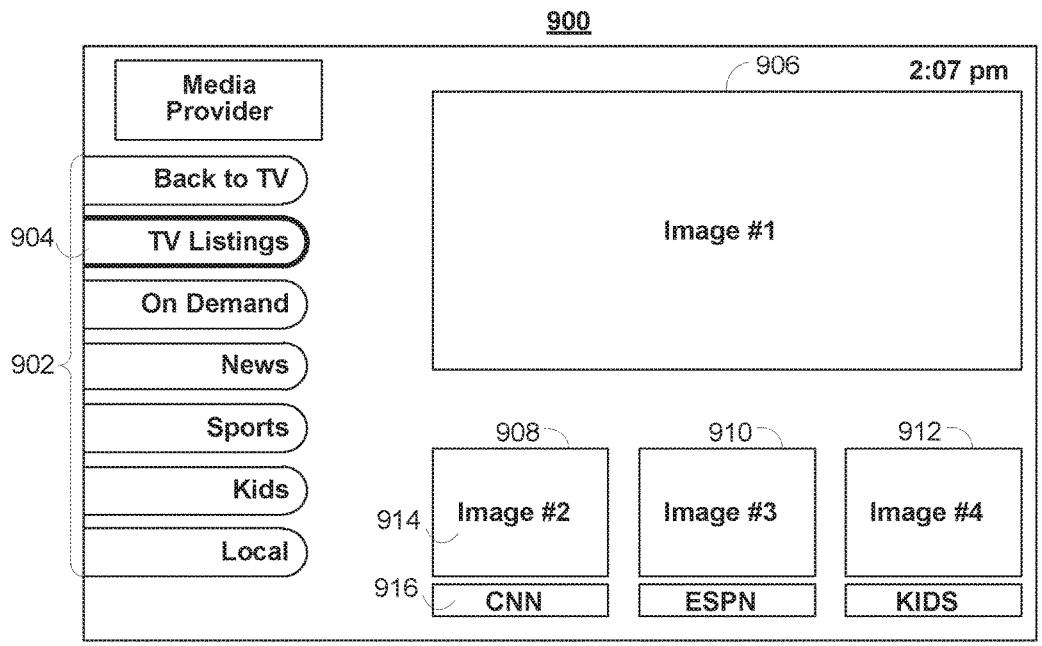
FIG. 9 shows another illustrative example of a media guidance display that may be presented in accordance with some embodiments of the disclosure.

In some embodiments, the media guidance application may detect user selection of a media asset though user interaction with an element of the illustrative display screens depicted in FIGS. 8-9. FIGS. 8-9 show illustrative display screens that may be used to provide media guidance data. The display screens shown in FIGS. 8-9 may be implemented on any suitable user equipment device or platform. While the displays of FIGS. 8-9 are illustrated as full-screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 8 shows illustrative grid of a program listings display 800 arranged by time and channel that also enables access to different types of content in a single display. Display 800 may include grid 802 with: (1) a column of channel/content type identifiers 804, where each channel/content type identifier (which is a cell in the column) identifies a different channel or content type available; and (2) a row of time identifiers 806, where each time identifier (which is a cell in the row) identifies a time block of programming. Grid 802 also includes cells of program listings, such as program listing 808, where each listing provides the title of the program provided on the listings associated channel and time. With a user input device, a user can select program listings by moving highlight region 810. Information relating to the program listing selected by highlight region 810 may be provided in program information region 812. Region 812 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 802 may provide media guidance data for non-linear programming including on-demand listing 814, recorded content listing 816, and Internet content listing 818. A display combining media guidance data for content from different types of content sources is sometimes referred to as a "mixed-media" display. Various permutations of the types of media guidance data that may be displayed that are different than display 800 may be based on user selection or guidance application definition (e.g., a display of only recorded and broadcast listings, only on-demand and broadcast listings, etc.). As illustrated, listings 814, 816, and 818 are shown as spanning the entire time block displayed in grid 802 to indicate that selection of these listings may provide access to a display dedicated to on-demand listings, recorded listings, or Internet listings, respectively. In some embodiments, listings for these content types may be included directly in grid 802. Additional media guidance data may be displayed in response to the user selecting one of the navigational icons 820. (Pressing an arrow key on a user input device may affect the display in a similar manner as selecting navigational icons 820.)

Display 800 may also include video region 822, and options region 824. Video region 822 may allow the user to view and/or preview programs that are currently available, will be available, or were available to the user. The content of video region 822 may correspond to, or be independent from, one of the listings displayed in grid 802. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 824 may allow the user to access different types of content, media guidance application displays, and/or media guidance application features. Options region 824 may be part of display 800 (and other display screens described herein), or may be invoked by a user by selecting an on-screen option or pressing a dedicated or assignable button on a user input device. The selectable options within options region 824 may concern features related to program listings in grid 802 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 11. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 1502/0174430, filed Feb. 21, 1502, which are hereby incorporated by reference herein in their entireties.

Another display arrangement for providing media guidance is shown in FIG. 9. Video mosaic display 900 includes selectable options 902 for content information organized based on content type, genre, and/or other organization criteria. In display 200, television listings option 904 is selected, thus providing listings 906, 908, 910, and 912 as broadcast program listings. In display 900 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 908 may include more than one portion, including media portion 914 and text portion 916. Media portion 914 and/or text portion 916 may be selectable to view content in full-screen or to view information related to the content displayed in media portion 914 (e.g., to view listings for the channel that the video is displayed on).

The listings in display 900 are of different sizes (i.e., listing 906 is larger than listings 908, 910, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 1510/0153885, filed Nov. 12, 2009, which is hereby incorporated by reference herein in its entirety.

Users may access content and the media guidance application (and its display screens described above and below) from one or more of their user equipment devices. FIG. 10 shows a generalized embodiment of illustrative user equipment device 1000. More specific implementations of user equipment devices are discussed below in connection with FIG. 11. User equipment device 1000 may receive content and data via input/output (hereinafter "I/O") path 1002. I/O path 1002 may provide content (e.g., broadcast programming, on-demand programming, Internet content, content available over a local area network (LAN) or wide area network (WAN), and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for a media guidance application stored in memory (i.e., storage 1008). Specifically, control circuitry 1004 may be instructed by the media guidance application to perform the functions discussed above and below. For example, the media guidance application may provide instructions to control circuitry 1004 to generate the media guidance displays. In some implementations, any action performed by control circuitry 1004 may be based on instructions received from the media guidance application.

In client-server based embodiments, control circuitry 1004 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as media guidance data described above. Nonvolatile memory may also be used (e.g., to launch a boot-up routine and other instructions). Cloud-based storage, described in relation to FIG. 4, may be used to supplement storage 1008 or instead of storage 1008.

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting content into the preferred output format of the user equipment 1000. Control circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, trackball, keypad, keyboard, touch screen, touchpad, stylus input, joystick, voice recognition interface, or other user input interfaces. Display 1012 may be provided as a stand-alone device or integrated with other elements of user equipment device 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive media guidance application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of user equipment device 1000 or may be stand-alone units. The audio component of videos and other content displayed on display 1012 may be played through speakers 1014. In some embodiments, the audio may be distributed to a receiver (not shown), which processes and outputs the audio via speakers 1014.

The guidance application may be implemented using any suitable architecture. For example, it may be a stand-alone application wholly-implemented on user equipment device 1000. In such an approach, instructions of the application are stored locally (e.g., in storage 1008), and data for use by the application is downloaded on a periodic basis (e.g., from an out-of-band feed, from an Internet resource, or using another suitable approach). Control circuitry 1004 may retrieve instructions of the application from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the media guidance application is a client-server based application. Data for use by a thick or thin client implemented on user equipment device 1000 is retrieved on-demand by issuing requests to a server remote to the user equipment device 1000. In one example of a client-server based guidance application, control circuitry 1004 runs a web browser that interprets web pages provided by a remote server. For example, the remote server may store the instructions for the application in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the application corresponding to the input (e.g., a display that moves a cursor up/down). The generated display is then transmitted to equipment device 1000 for presentation to the user.

In some embodiments, the media guidance application is downloaded and interpreted or otherwise run by an interpreter or virtual machine (run by control circuitry 1004). In some embodiments, the guidance application may be encoded in the ETV Binary Interchange Format (EBIF), received by control circuitry 1004 as part of a suitable feed, and interpreted by a user agent running on control circuitry 1004. For example, the guidance application may be an EBIF application. In some embodiments, the guidance application may be defined by a series of JAVA-based files that are received and run by a local virtual machine or other suitable middleware executed by control circuitry 1004. In some of such embodiments (e.g., those employing MPEG-2 or other digital media encoding schemes), the guidance application may be, for example, encoded and transmitted in an MPEG-2 object carousel with the MPEG audio and video packets of a program.

Figure 10:
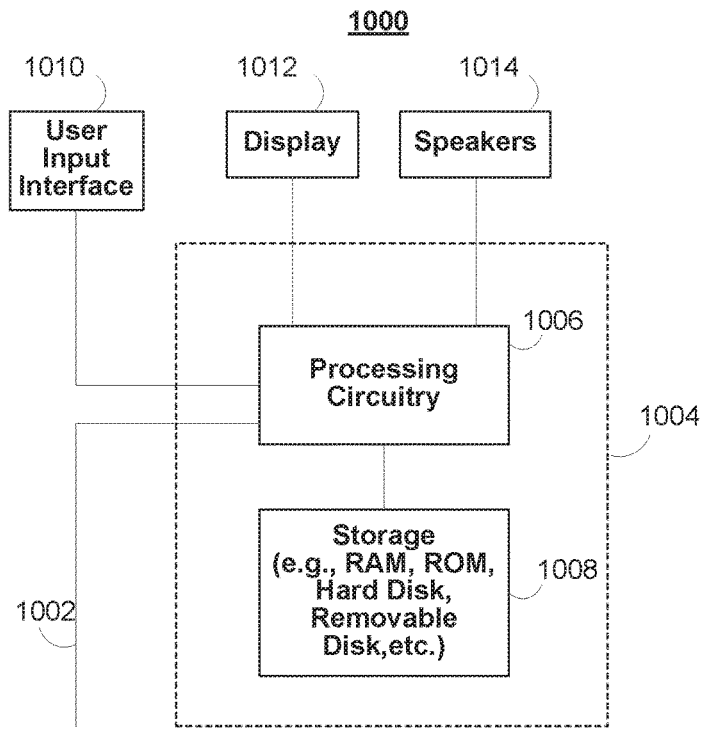
FIG. 10 is a block diagram of an illustrative user equipment device in accordance with some embodiments of the disclosure.
Figure 11:
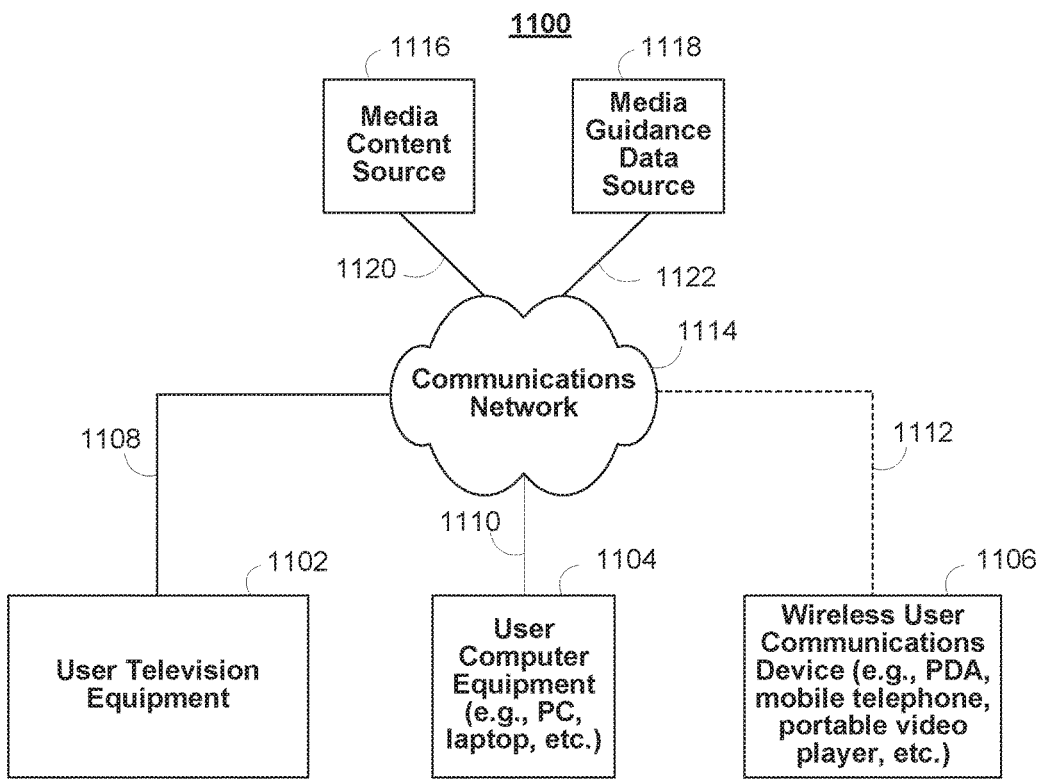
FIG. 11 is a block diagram of an illustrative media system in accordance with some embodiments of the disclosure.

User equipment device 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The media guidance application may have the same layout on various different types of user equipment or may be tailored to the display capabilities of the user equipment. For example, on user computer equipment 1104, the guidance application may be provided as a web site accessed by a web browser. In another example, the guidance application may be scaled down for wireless user communications devices 1106.

In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. For example, the second screen device may provide an interface for switching the content presented on the first device to being presented on the second screen device. For example, in some embodiments, the second screen device may display the content that is presented on the first user equipment device in response to determining that a viewing of the content presented on the first user equipment device is prevented. The second screen device can be located in the same room as the first device, a different room from the first device but in the same house or building, or in a different building from the first device. In some embodiments, the first user equipment device may estimate a location of the second screen device relative to the first user equipment device. For example, the first user equipment may communicate wirelessly with the second screen device (e.g., using wireless communications device 1106 over communications network 1114). The first user equipment device may estimate a strength of the wireless connection to determine a position of the second user equipment device relative to the first user equipment device. In some embodiments, a user equipment device may determine that a viewing of content on the first user equipment device is prevented in response to determining that a strength of the wireless connection is low.

In some embodiments, the second screen device is configured for interacting with other second screen devices or for interacting with a social network. For example, in some embodiments, a first, second screen device may be configured to instruct a second, second screen device to generate for display content presented on the first user equipment device in response to determining that a viewing of content on the first user equipment device is prevented. For example, the first, second user equipment device may transmit a packet comprising an intent to launch an application on the second, second screen device to present the content.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

A user profile may store a listing of devices registered to the user in order to maintain updated settings across each of the devices. For example, the user may perform a registration process to add a user equipment device to his or her profile. The media guidance application may perform the registration process by creating a unique device identifier for the user equipment device, prompting a user to log into an account associated with the user and storing the unique device identifier in a user profile associated with the account.

Settings may be pushed out to each user equipment device associated with the user (e.g., via media guidance data source 1118 over communications network 1114) or each user equipment device may request, synchronously or asynchronously, the user settings from media guidance data source 1118.

In some embodiments, the settings may include a preference for a first user equipment device over a second user equipment device. For example, the user may select a preference for a tablet pc over a phone when viewing media (e.g., because a larger screen of a tablet provides a better viewing experience than a smaller screen of a telephone) but may select a preference for a phone over a tablet when listening to media (e.g., because the compact size of the phone is preferable to the large size of the tablet when simply listening to media). The media guidance application may retrieve this setting to identify an appropriate device when, for example, selecting a device for media playback.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G or LTE, network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short-range point-to-point communication paths, such as USB cables, IEEE 1394 cables, wireless paths (e.g., Bluetooth, infrared, IEEE 802-11x, RFID, ZIGBEE, etc.), or other short-range communication via wired or wireless paths. BLUETOOTH is a certification mark owned by Bluetooth SIG, INC. The user equipment devices may also communicate with each other directly through an indirect path via communications network 1114.

System 1100 includes content source 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and media guidance data source 1118 may be exchanged over one or more communications paths, but are shown as a single path in FIG. 11 to avoid overcomplicating the drawing. In addition, there may be more than one of each of content source 1116 and media guidance data source 1118, but only one of each is shown in FIG. 11 to avoid overcomplicating the drawing. (The different types of each of these sources are discussed below.) If desired, content source 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or may not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 1510, which is hereby incorporated by reference herein in its entirety.

Media guidance data source 1118 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 1118 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 1118 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 1118 may provide user equipment devices 1102, 1104, and 1106 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate notifications related to the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 1008, and executed by control circuitry 1004 of a user equipment device 1000. In some embodiments, media guidance applications may be client-server applications where only a client application resides on the user equipment device, and server application resides on a remote server. For example, media guidance applications may be implemented partially as a client application on control circuitry 1004 of user equipment device 1000 and partially on a remote server as a server application (e.g., media guidance data source 1118) running on control circuitry of the remote server. When executed by control circuitry of the remote server (such as media guidance data source 1118), the media guidance application may instruct the control circuitry to generate the guidance application displays and transmit the generated displays to the user equipment devices. The server application may instruct the control circuitry of the media guidance data source 1118 to transmit data for storage on the user equipment. The client application may instruct control circuitry of the receiving user equipment to generate the guidance application displays.

Content and/or media guidance data delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 1100 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 11.

In one approach, user equipment devices may communicate with each other within a home network. User equipment devices can communicate with each other directly via short-range point-to-point communication schemes described above, via indirect paths through a hub or other similar device provided on a home network, or via communications network 1114. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player. In another example, a first user equipment device may transmit to a second user equipment device data identifying a media asset to be generated for display on the second user equipment device.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a laptop, tablet, PDA, or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 1116 to access content. Specifically, within a home, users of user television equipment 1102 and user computer equipment 1104 may access the media guidance application to navigate among and locate desirable content. Users may also access the media guidance application outside of the home using wireless user communications devices 1106 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more media guidance data sources 1118. In addition or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

In some embodiments, control circuitry (e.g., control circuitry 1004) may receive, from a user input device (e.g., user input interface 1010) a selection of a first media asset for display in a full-screen mode (e.g., for display on display 1012) at a first time. In response to receiving the first selection, control circuitry 1004 may generate for display, using control circuitry 1004, the first media asset in the full-screen mode (e.g., on display 1012. Control circuitry 1004 may receive from the user input device (e.g., user input interface 1010) a second selection of a second media asset for displaying (e.g., on display 1012) in the full-screen mode at a second time. In response to receiving the second selection (e.g., via user input interface 1010), control circuitry 1004 may determine whether a portion of the first media asset, generated for display in the full-screen mode (e.g., for display on display 1012) includes important content. Control circuitry 1004 may identify the portion at a point within a time window for the second time (e.g., at most a threshold of time away from the second time). In response to determining that the portion of the first media asset is not important, control circuitry 1004 may generate for display (e.g., for display on display 1012) the second media asset in the full-screen mode. In response to determining that the portion of the first media asset generated for display in the full-screen mode is important, control circuitry 1004 may generate for display (e.g., for display on display 1012) the second media asset in a window, wherein the second media asset in the window overlays the first media asset in the full-screen mode.

In some embodiments, control circuitry 1004 may receiving at a first time, a first selection (e.g., via user input device 1010) of a first media asset (e.g., a first media asset stored at media content source 1116) for display on a first device (e.g., display 1012) associated with a first user equipment device. In response to receiving the first selection (e.g., via user input interface 1010), control circuitry 1004 may generate for display, at the first user equipment device, the first media asset of the first display device (e.g., on display 1012). Control circuitry 1012 may detect, at a second time, a user action (e.g., action to change channels received via user input interface 1010) preventing a viewing of the first media asset (e.g., media asset stored at media content source 1116). In response to detecting the user action, control circuitry 1004 may determine whether a portion of the first media asset (e.g., media asset stored at media content source 1116), at a point with a time window from the second time, includes important content. In response to determining that the portion of the first media asset generated for display on the first user equipment device is important, control circuitry 1004 may identify a second user equipment device (e.g., user equipment device 1000) capable of generating for display the portion of the first media asset on a second display device (e.g., on display 1012) associated with the second user equipment device (e.g., user equipment device 1000), wherein a viewing of the portion of the first media asset on the second display device would not be prevented. Control circuitry 1004 may generate for display, at the second user equipment device (e.g., user equipment device 1000) the portion of the first media asset on the second display device (e.g., display 1012).

Figure 12:
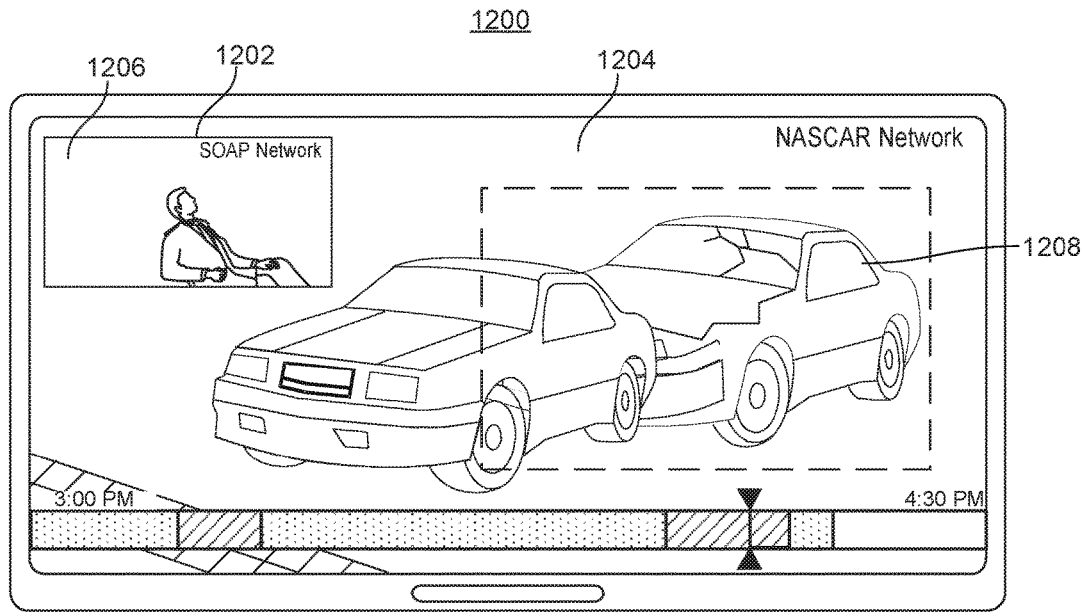
FIG. 12 shows an illustrative example of a first media asset generated for display in a full-screen mode and a second media asset generated for display in a window mode in accordance with some embodiments of the disclosure.

FIG. 12 shows an illustrative example of a first media asset generated for display in a full-screen mode and a second media asset generated for display in a partial screen window in accordance with some embodiments of the disclosure. User equipment 1200 is depicted having first media asset 1204 generated for display (e.g., by control circuitry 1004) in a full-screen mode of the display (e.g., display 1012) and second media asset 1206 is depicted in a partial screen window 1202 overlaid over first media asset 1204. Important content 1208 is depicted in an important content window (e.g., important content area 208) of the display.

In some embodiments, in response to determining that the portion of the first media asset generated for display in the full-screen mode is important, control circuitry 1004 may generate for display (e.g., for display on display 1012) the second media asset in a partial screen window, wherein the second media asset in the partial screen window overlays the first media asset in the full-screen mode. Control circuitry 1004 may determine that the portion of the first media asset is important by, for example, performing image-processing on the first media asset and detecting content in a frame corresponding to the portion. For example, if the first media asset is a NASCAR race, the media guidance application may analyze the first media asset and determine that there has been a car crash (e.g., based on comparing a fingerprint generated for a frame corresponding to the portion to a database of image fingerprints stored locally or remote from control circuitry 1004, such as storage 1008 or media guidance data source 1118 and determining that the fingerprint of the frame matches a fingerprint of a car crash).

Control circuitry 1004 may identify that the car crash is important content because, for example, control circuitry 1004 may retrieve data indicating that users are concerned about drivers during a crash and find it important to see if the driver is okay. In response to detecting that the first media asset has important content, control circuitry may generate the second media asset for display in a partial screen window, partially overlaid over content being displayed, such as the first media asset displayed in the full-screen mode. Control circuitry 1004 may generate the second media asset for display in the partial screen window so that the user does not miss out on the important content detected in the first media asset and so that the user may also consume the second media asset in accordance with the selection.

In some embodiments, control circuitry 1004 may prevent generating for display the second media asset in the partial screen window until the user confirms the second selection. For example, control circuitry may generate a prompt, such as prompt 202 and detailed prompt 310. In response to receiving user selection confirming selection of the second media asset (e.g., via user input interface 1010), control circuitry 1004 may generate for display the second media asset in the partial screen window overlaying content being displayed, such as the first media asset.

Figure 13:
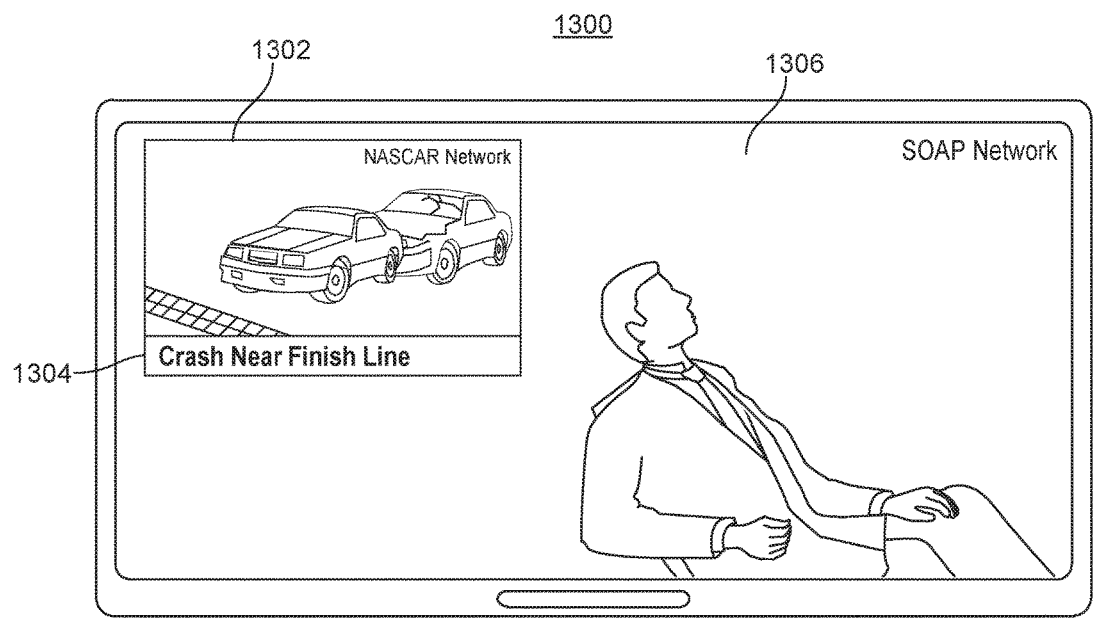
FIG. 13 shows an illustrative example of a first media asset generated for display in a window mode having a description of important content in accordance with some embodiments of the disclosure.

FIG. 13 shows an illustrative example of a first media asset generated for display in a window mode having a description of important content in accordance with some embodiments of the disclosure. User equipment 1300 is depicted having a display, such as display 1012 having a second media asset in full-screen mode 1306, having a first media asset in a window 1302 and having an important content description 1304.

In some embodiments, control circuitry 1004 may receive from a user input device, such as user input device 1010, a third selection of the second media asset for display in the full-screen mode. For example, the media guidance application may detect a user selection to render the first media asset in a partial screen window. For example, control circuitry 1004 may detect selection of a button, such as swap PIP button 308, requesting swapping the first media asset from full-screen mode to a partial screen window.

In some embodiments, control circuitry 1004 may generate sound (e.g., for output on speakers 1014) corresponding to the first media asset, while the first media asset is generated for display in the partial screen window overlying the second media asset generated for display in the full-screen window. When control circuitry 1004 determines that the first media asset no longer has important content, as described above, control circuitry 1004 may generate for sound for output on speakers 1014 corresponding to the second media asset (e.g., replacing the sound corresponding to the first media asset).

In some embodiments, in response to determining that a second portion of the first media asset does not include important content (e.g., a portion following a portion having important content), control circuitry 1004 may generate for display the second media asset in the full-screen mode as described above. In some embodiments, control circuitry 1004 may generate for display the first media asset in the window (e.g., first media asset in a window 1302). For example, control circuitry 1004 may replace a media asset generated for display in the window, such as the second media asset, with the first media asset and may instead generate for display the second media asset full-screen (e.g., second media asset in full-screen mode 1306). In some embodiments, control circuitry 1004 generates for display the second media asset in the full-screen mode, replacing the first media asset in the full-screen mode, in response to determining that the second portion of the first media asset does not have important content.

In some embodiments, control circuitry 1004 may access data describing important content corresponding to the frame, wherein the data provides a textual description of the important content in the frame. For example, control circuitry 1004 may receive metadata corresponding to the first media asset which describes the important content. In an example, the control circuitry 1004 may identify a sports score as the important content. Control circuitry may receive metadata comprising the sports score. In another example, control circuitry 1004 may perform image-processing on a frame of the first media asset to identify a description of the important content. Following the example where the important content is a sports score, the media guidance application may process a frame of the first media asset to identify a scoreboard within the frame. Control circuitry 1004 may process the image to generate a string based on text recognized in the scoreboard (e.g., a string having the score on the scoreboard generated using an OCR algorithm).

In some embodiments, control circuitry 1004 may generate for display the textual description of the important content wherein the textual description overlays the second media asset in the full-screen mode. For example, control circuitry 1004 may generate for display on a display screen, such as display 1012, a string of characters representing the description of the important content, such as important content description 1304.

In some embodiments, control circuitry 1004 may generate for display a graphical indicator of the important content. For example, control circuitry 1004 may determine that there are bases loaded within the first media asset (e.g., the important content). Control circuitry 1004 may generate for display a graphic overlaid on the second media asset in full-screen mode 1306 showing that all the bases are occupied.

In some embodiments, control circuitry 1004 may determine, at a third time later than the second time, that first media asset no longer includes important content. For example, control circuitry 1004 may determine that a position corresponding to the first media asset at the third time no longer corresponds to a position of the first media asset identified as having important content. In another example, at the third time, control circuitry 1004 may perform image-processing on a frame of the first media asset corresponding to the third time and may determine that the frame does not comprise important content.

In response to determining that the frame does not contain important content, control circuitry 1004 may generate for display the second media asset in the full-screen mode, without an overlay of the second media asset in the window mode. For example, once control circuitry 1004 determines that a portion of the first media asset does not have important content, control circuitry may remove the window and instead display the second media asset. In some embodiments, control circuitry 1004 may prompt the user to confirm whether the user wants control circuitry 1004 to generate for display the second media asset in the full-screen mode. In some embodiments, control circuitry 1004 may buffer frames of the second media asset while the first media asset is generated for display in the full-screen mode. When control circuitry 1004 that the first media asset no longer has important content, control circuitry 1004 may generate for display the second media asset from a point beginning with the frames in the buffer.

In some embodiments, control circuitry 1004 may store user preferences in a user profile for handling switching to, and detection of important content. For example, control circuitry 1004 may store priorities for important content and control circuitry 1004 may perform different functions in response to the priorities. For example, control circuitry 1004 may determine that a user finds all sports shows having content with either Derek Jeter or Alex Rodriguez as important. Control circuitry 1004 may determine that a user prefers Derek Jeter over Alex Rodriguez. If control circuitry 1004 determines that a user is going to switch from a first media asset having just Derek Jeter to a second media asset just having Alex Rodriguez, control circuitry 1004 may block display of the second media asset. In contrast, if the first media asset had Alex Rodriguez and the second media asset had Derek Jeter, control circuitry 1004 may generate for display the second media asset in the full-screen window and may generate for display the first media asset in a partial screen window. In another example, control circuitry 1004 may detect user preferences to automatically always display either the first or the second media in the partial screen window when important content is detected in the first media asset. In another example, control circuitry 1004 may detect a user preference to automatically disregard a selection of a media asset not having important content when a first media asset is detected to have important content.

Figure 14:
FIG. 14 shows an illustrative example of a metadata exchange format having listings of important events in accordance with some embodiments of the disclosure.

FIG. 14 shows an illustrative example of a metadata exchange format in accordance with some embodiments of the disclosure. Data packet 1400 comprises formatted data 1402. Control circuitry 1004 may parse formatted data 1402 to identify, for example, a media characteristic of a media asset (e.g., genre) or important portions of the media asset (e.g., stored in the array "importantEvents"). Control circuitry 1004 may parse the "importantEvents" array to determine a start position, designated by "start" and an end position, designated by "end" of the important portion. Additionally, control circuitry 1004 may identify a description of the important content corresponding to a "description" field. Upon detecting metadata corresponding to the metadata exchange format (e.g., via communications network 1114), control circuitry 1004 may parse the metadata as described above and may store the parsed metadata in memory, such as storage 1008, for use by control circuitry 1004 in accordance with any of the methods described above.

Figure 15:
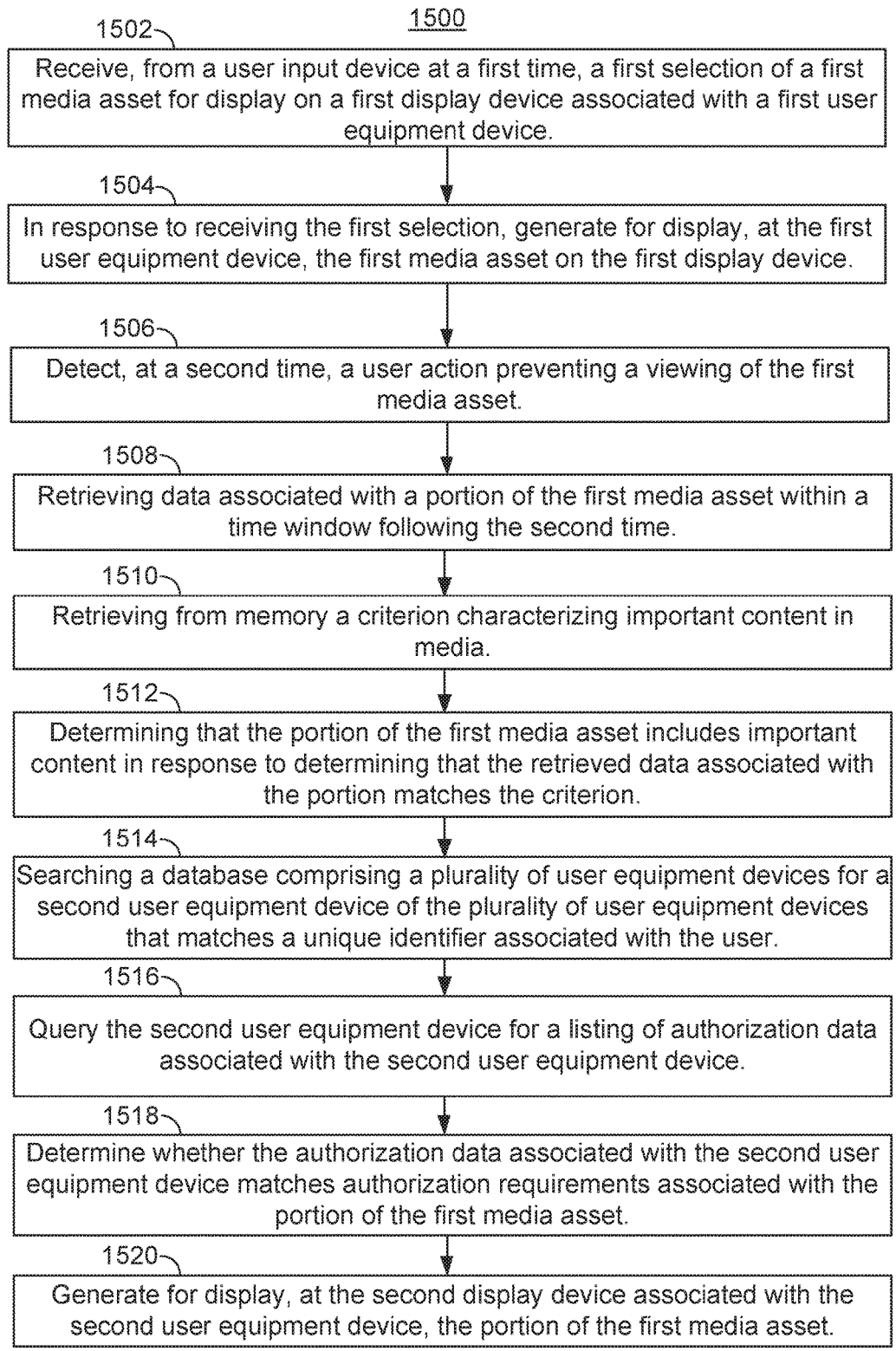
FIG. 15 is a flow chart of illustrative steps for enhancing viewing of a media asset having important content on multiple devices in accordance with some embodiments of the disclosure.

FIG. 15 depicts a flowchart of illustrative steps for enhancing the viewing of a media asset having important content on multiple devices. It should be noted that process 1500, or any step thereof, could be performed on, or provided by, any of the devices shown in FIGS. 10-11. For example, process 1500 may be executed by control circuitry 1004 as instructed by a media guidance application implemented on user equipment 1102, 1104, 1106 in order to enhance viewing the first media asset. In addition, one or more steps of process 1500 may be incorporated into or combined with one or more steps of any other process or embodiment (e.g., process 1800, 1900, 2100, and 1600).

At step 1502, control circuitry 1004 receives, from a user input device at a first time, a first selection of a first media asset for display on a first display device associated with a first user equipment device. For example, control circuitry 1004 may receive, via user input interface 1010, remote control input corresponding to selection of a first media asset, such as a NASCAR race. Control circuitry 1004 may correlate the input with a first time, such as a time within the first media asset corresponding to receiving the input.

At step 1504, in response to receiving the first selection, control circuitry 1004 generates for display, at the first user equipment device, the first media asset on the first display device. For example, control circuitry 1004 may identify the first media asset and may request the first media asset for display on a display device accessible to control circuitry 1004, such as display 1012. Control circuitry 1004 may receive the first media asset and may generate for display the first media asset on the display device.

At step 1506, control circuitry 1004 may detect, at a second time, a user action preventing a viewing of the first media asset. For example, control circuitry 1004 may receive, via user input interface 1010, a request to change a channel from the first media asset to a second media asset. Control circuitry 1004 may determine, based on the change channel request, that because display of the second media asset will replace display of the first media asset, viewing of the first media asset is prevented. Control circuitry 1004 may correlate the second action with a second time, such as a time in the first media asset corresponding to the selection.

At step 1508, in response to detecting the user action, control circuitry 1004 may retrieving data associated with a portion of the first media asset within a time window following the second time. For example, control circuitry 104 may retrieve data associated with a portion of the first media asset to determine whether the portion of the first media asset is important. For example, control circuitry 1004 may retrieve metadata associated with the portion of the first media asset, as described above. Control circuitry 1004 may determine, based on the metadata, whether a portion within the time window is denoted in the metadata as being associated with important content.

At step 1510, control circuitry 1004 retrieving from memory, such as storage 1008 a criterion characterizing important content in media. Control circuitry 1004 may use the metadata associated with the first media asset to determine whether the second time corresponds to important content. For example, control circuitry 1004 may retrieve a criterion identifying a sports team that is of interest to the user as the criterion. Control circuitry 1004 may determine that the first media asset has important content if the metadata matches the criterion at step 1512.

At step 1514, in response to determining that the portion of the first media asset generated for display on the first display device includes important content at step 1512, control circuitry 1004 searches a database comprising a plurality of user equipment devices for a second user equipment device of the plurality of user equipment devices that matches a unique identifier associated with the user. For example, the media guidance application may retrieve a unique identifier associated with the user from a user profile associated with the user (e.g., so that the media guidance application may display important content on a second user equipment device that is associated with the user). Control circuitry 1004 may compare the unique identifier to a database of user equipment devices to identify a user equipment device associated with the user.

At step 1516, in response to identifying a second user equipment device of the plurality of user equipment devices matching the unique identifier associated with the user, control circuitry 1004 queries the second user equipment device for a listing of authorization data associated with the second user equipment device. For example, the media guidance application may retrieve a unique identifier associated with the user (e.g., to identify a user's content subscriptions). Control circuitry 1004 may identify an app that is installed on the second user equipment device which can provide access to the portion of the first media asset (e.g., by comparing the user's unique identifier to data identifying users authorized to access the portion from an application on the second user equipment device).

At step 1518, control circuitry 1004 determines whether the authorization data associated with the second user equipment device matches authorization requirements associated with the portion of the first media asset. For example, the media guidance application may compare user credentials stored on the device with credentials necessary for accessing the portion of the first media asset. For example, the media guidance application may determine that the portion of the media is only accessible to users having a subscription to a content provider (e.g., via an application installed on the second user equipment device). The media guidance application may compare credentials stored on the second user equipment device (e.g., a cell phone) to the credentials necessary for accessing the portion of the media (e.g., the subscription) to determine whether the portion of the media is accessible to the user via the second user equipment device.

At step 1520, in response to determining that the authorization data associated with the second user equipment device matches the authorization requirements associated with the portion of the first media asset, control circuitry 1004 generates for display on the second display device (e.g., display 1012) associated with the second user equipment device, the portion of the first media asset. For example, control circuitry 1004 may use an API to transmit a request to the second user equipment device to generate for display the portion of the first media asset.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 10-11 could be used to perform one or more of the steps in FIG. 15.

Figure 16:
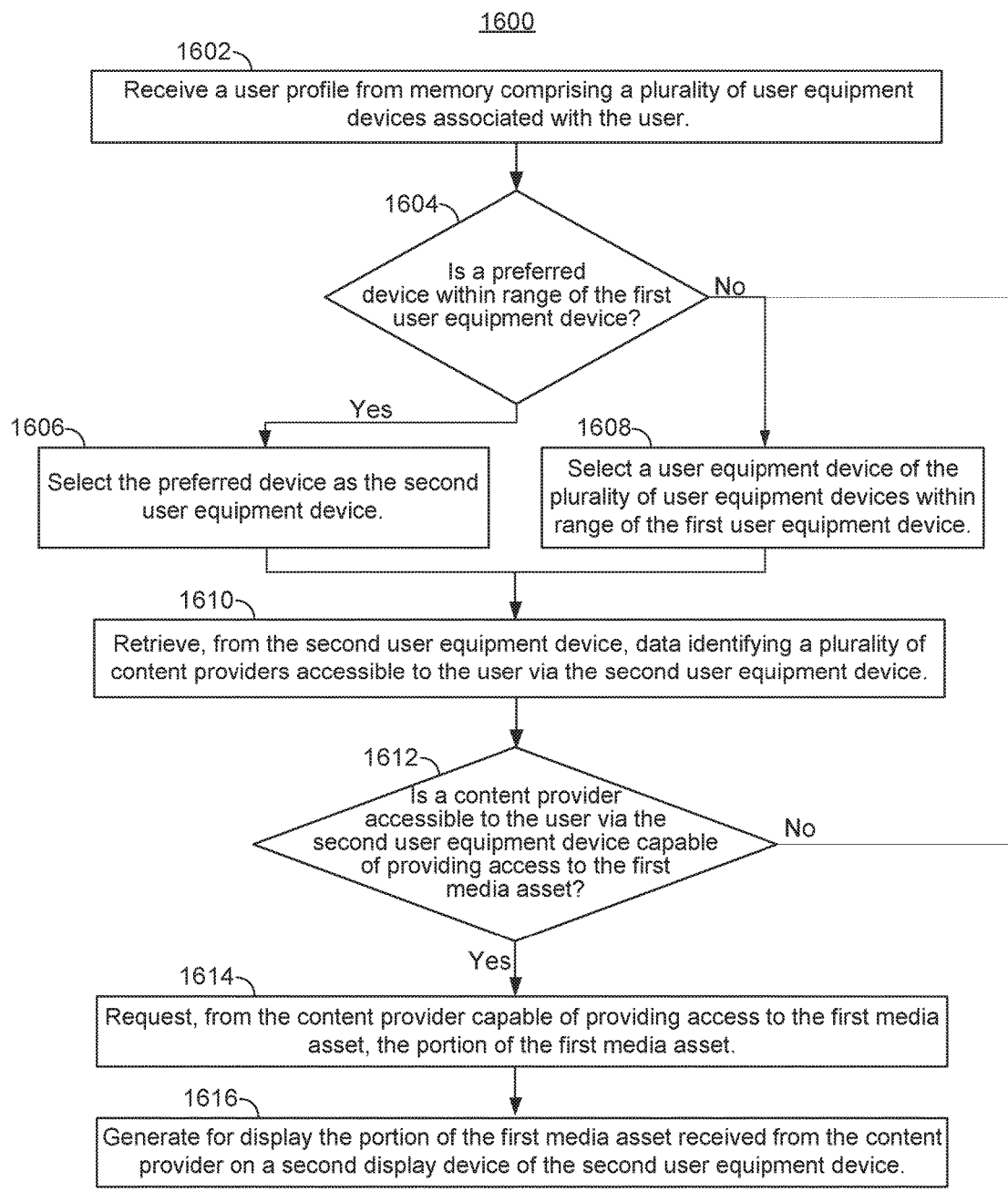
FIG. 16 is a flow chart of illustrative steps for identifying a content provider of the first media asset for display on a second device in accordance with some embodiments of the disclosure.

FIG. 16 depicts a flowchart of illustrative steps for identifying a content provider of the first media asset for display on a second device. It should be noted that process 1600, or any step thereof, could be performed on, or provided by, any of the devices shown in FIGS. 10-11. For example, process 1600 may be executed by control circuitry 1004 as instructed by a media guidance application implemented on user equipment 1102, 1104, 1106 in order to enhance viewing the first media asset. In particular, the process in FIG. 16 may be performed in conjunction with step 1512 of FIG. 15 for identifying a content provider of the first media asset for display on the second device. In addition, one or more steps of process 1600 may be incorporated into or combined with one or more steps of any other process or embodiment (e.g., process 1800, 1900, 2100, and 1500).

At step 1602, control circuitry 1004 retrieves a user profile from memory (e.g., storage 1008) comprising a plurality of user equipment devices associated with the user. For example, control circuitry 1004 may query media guidance data source 1118 for a user profile. Control circuitry 1004 may extract data identifying user equipment devices accessible to the user from the user profile.

At step 1604, control circuitry 1004 may determine if a preferred device is within range of the first user equipment device. For example, control circuitry 1004 may retrieve, from the user profile, data identifying a device preferred by the user. Control circuitry 1004 may transmit a device discovery request, as described above, to discover devices on the network. If control circuitry 1004 determines that the device preferred by the user is within a range of the first user equipment device (e.g., based on a wireless signal strength), then the control circuitry 1004 proceeds to step 1606, otherwise control circuitry 1004 proceeds to step 1608.

At step 1606, control circuitry 1004 selected the preferred device as the second device. For example, control circuitry may set in memory (e.g., storage 1008) a pointer to the preferred device as the second device, because, for example, the user would likely prefer to use a preferred device if the preferred device is within range.

At step 1608, control circuitry 1004 selects a user equipment device of the plurality of user equipment devices that are within range of the first user equipment device. For example, control circuitry 1004 may select (e.g., in order of closest device) a device from the plurality of devices, because, for example, the user has not set a priority for the devices of the plurality of devices. Control circuitry 1004 may update a pointer to the second user equipment device as the selected user equipment device.

At step 1610, control circuitry 1004 retrieves, from the second user equipment device, data identifying a plurality of content providers accessible to the user via the second user equipment device. For example, control circuitry 1004 may query the user equipment device for a listing of applications that are installed on the second user equipment device and, based on the listing of applications, may identify content providers associated with the applications for which the user has an account (e.g., using the user profile).

At step 1612, control circuitry 1004 determines whether a content provider of the plurality of content providers accessible to the user via the second user equipment device is capable of providing access to the first media asset. For example, control circuitry 1004 may query each provider of the plurality of providers to determine whether the respective content provider is capable of providing access to the portion of the first media asset. If no content providers of the plurality of content providers are capable of providing access, control circuitry 1004 proceeds to step 1608 to select another user equipment device form the plurality of user equipment devices. Otherwise, control circuitry 1004 proceeds to step 1614.

At step 1614, control circuitry 1004 requests from the content provider capable of providing access to the first media asset, the portion of the first media asset. For example, control circuitry 1004 may determine that the first media asset is being broadcasted (e.g., at a position corresponding to the second time) on a channel accessible to the second user equipment device. Control circuitry 1004 may tune, using a tuner of the second user equipment device, to the channel.

At step 1616 control circuitry 1004 generates for display the portion of the first media asset received from the content provider on a second display device of the second user equipment device. For example, control circuitry 1004 may generate for display the channel on a display device, such as display 318, accessible to the second user equipment device.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 10-11 could be used to perform one or more of the steps in FIG. 21.

FIG. 17 describes pseudocode to identify a content provider of a first media asset for display on a second user equipment device. It will be evident to one skilled in the art that the process described by the pseudocode in FIG. 17 may be implemented in any number of programming languages and a variety of different hardware, and that the style and format should not be construed as limiting, but rather a general template of the steps and procedures that would be consistent with code used to implement some embodiments of this disclosure.

At line 1701, control circuitry 1004 runs a subroutine to initialize variables and prepare to receive a user profile from memory, which begins on line 2205. For example, in some embodiments, control circuitry 1004 may copy instructions from non-transitory storage medium (e.g., storage 1008) into RAM or into a cache for processing circuitry 1006 during the initialization stage.

At line 1705, control circuitry 1004 receives a user profile from memory. For example, control circuitry 1004 may access the user profile from local memory, such as storage 1008, by retrieving a pointer to an array or a user profile class identifying a location of the stored user profile in the memory. In another example, control circuitry may receive the user profile from remote storage, such as media guidance data source 1118. Control circuitry may download the user profile from the media guidance data source 1118 via communications network 1114 and may store the user profile in local memory (e.g., storage 1008) to enhance the performance of the algorithm.

At line 1708, control circuitry 1004 stores an array of user equipment devices associated with the user temporary variable A. In some embodiments, the value of variable A may be retrieved through an accessor method for retrieving user equipment devices associated with the user or may be retrieved via the user profile.

At line 1709, control circuitry 1004 stores data identifying the first media asset in temporary variable B. For example, control circuitry 1004 may compute a value uniquely identifying the first media asset and may store the value in variable B or control circuitry 1004 may store a plurality of data uniquely identifying the first media asset in an array.

At line 1710, control circuitry 1004 stores an array of content providers in temporary variable C. In some embodiments, the value of variable C may be retrieved through an accessor method for retrieving content providers accessible to the user (e.g., based on the user profile) or accessible via a user equipment device.

At line 1711, control circuitry 1004 initializes space in memory for temporary variable C comprising a selected content provider. In some embodiments, the value of variable C may be NULL when first initialized.

At line 1712, control circuitry 1004 stores a maximum range of a user equipment device in temporary variable E. In some embodiments, the value of variable E may be retrieved through an accessor method for retrieving a threshold maximum distance that a user equipment device may be from the first user equipment device.

At line 1713, control circuitry 1004 initializes space in memory for temporary variable F comprising a selected second user equipment device. In some embodiments, the value of variable C may be NULL when first initialized.

At line 1715, control circuitry 1004 executes a subroutine to determine a distance of a preferred user equipment device to the first user equipment device. For example, as described above, control circuitry 1004 may compute a distance to a preferred user equipment device based on a strength of a wireless signal between the first user equipment device and the preferred user equipment device.

At line 1716, control circuitry 1004 determines whether the preferred user equipment device is with a range E. For example, control circuitry 1004 may compare a distance to the preferred device to range E to determine whether E is greater than the distance. If E is not greater than the distance, control circuitry sets F to point to the preferred user equipment device at line 1717. Otherwise, control circuitry 1004 proceeds to line 1719.

At line 1719, control circuitry 1004 executes subroutine to select a next user equipment device A[i] from array A. For example, control circuitry 1004 sequentially selects user equipment devices from array A to identify a user equipment device that is within range.

At line 1721, control circuitry 1004 executes subroutine to identify a distance between user equipment device A[i] and the first user equipment device. For example, as described above, control circuitry 1004 may query device A[i] for an approximate location. Control circuitry 1004 may determine whether the approximate location of device A[i] is less than maximum range E. If, at line 1722, control circuitry 1004 determines that the range of user equipment device A[i] is less than maximum range E. Control circuitry sets F to point to user equipment device A[i]. Otherwise, control circuitry 1004 proceeds to line 1723.

At line 1723, control circuitry 1004 executes subroutine to select a next user equipment device A[i] from array A. For example, control circuitry 1004 may increment i by 1 select the next user equipment device indexed in array A at i+1.

At line 1724, control circuitry 1004 determines whether F is still NULL. If F is still null, control circuitry 1004 returns to line 1720 (e.g., because a user equipment device has not yet been selected).

At line 1726, control circuitry 1004 iterates through the list of content providers C to identify a content provider that is accessible to the user via the selected user equipment stored in C. For example, control circuitry 1004 may first select a content provider indexed at C[j].

At line 1727, control circuitry 1004 executes subroutine to determine whether the first media asset B is available from content provider C[j] via the second user equipment device stored in F. For example, control circuitry 1004 may query the user equipment device stored in F to determine whether the user equipment device has access to the content provider stored in C[j]. If control circuitry determines that the first media asset B is available from C[j] via the user equipment device stored in F, at line 1728, control circuitry 1004 proceeds to line 1729. Otherwise, control circuitry 1004 proceeds to line 1733.

At line 1729, control circuitry 1004 executes a subroutine to request, from the content provider in C[j] the portion of the first media asset identified in B. For example, control circuitry 1004 may access an API for communicating with an application corresponding to content provider C[j]. Control circuitry 1004 may generate a packet, using the API, to request the first media asset from the content provider via the second user equipment device.

At line 1730, control circuitry 1004 generates for display the portion of the first media asset B received from the content provider in C[j] on the second user equipment device. For example, control circuitry 1004 may identify a display device (e.g., display 1012) accessible to the second user equipment device. Control circuitry 1004 may generate a packet, using an API, requesting display of the first media asset on the second user equipment device. In some embodiments, control circuitry 1004 may transmit a position, corresponding to the important content, using the API, and may request that playback of the first media asset on the second user equipment device beginning at the position.

At line 1733, control circuitry 1004 executes a subroutine to select the next device, initialized F to NULL and returns to line 1720. For example, at line 1733, control circuitry 1004 determined that the first media asset is not accessible via a currently selected user equipment device and therefore selects a subsequent user equipment device (e.g., A[i++]). Control circuitry 1004 then proceeds to execute the code, as described above, for user equipment device A[i++].

At line 1735, control circuitry 1004 will execute a termination subroutine. For example, in some embodiments, control circuitry 1004 may destruct variables, perform garbage collection, free memory or clear the cache of processing circuitry 1006.

It will be evident to one skilled in the art that process 1700 described by the pseudocode in FIG. 17 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 18:
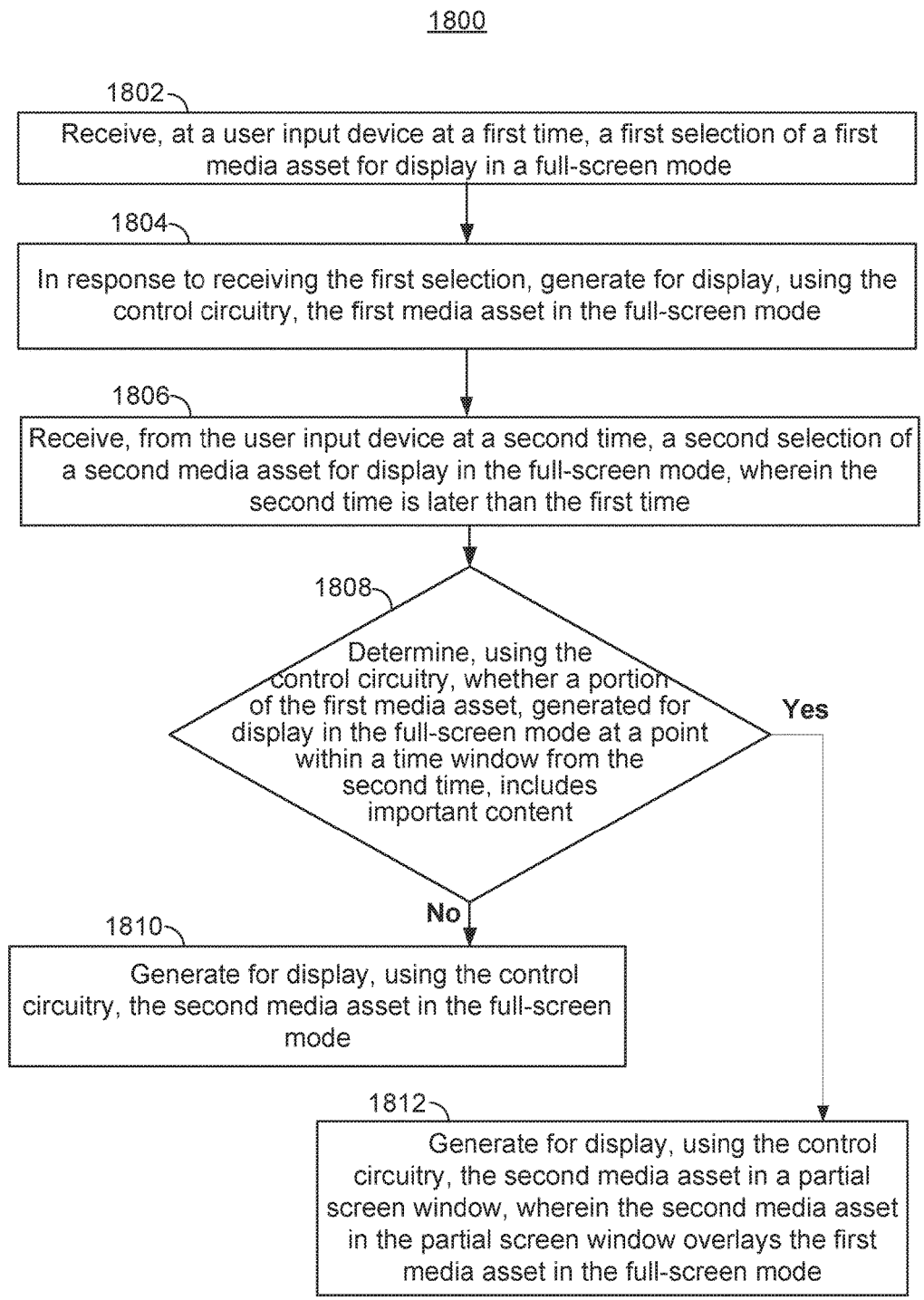
FIG. 18 is a flow-chart of illustrative steps for enhancing viewing of a media asset having important content in accordance with some embodiments of the disclosure.

FIG. 18 depicts a flow-chart of illustrative steps for enhancing viewing a first media asset having important content such as first media asset 1204. It should be noted that process 1800, or any step thereof, could be performed on, or provided by, any of the devices shown in FIGS. 10-11. For example, process 1800 may be executed by control circuitry 1004 as instructed by a media guidance application implemented on user equipment 1102, 1104, 1106 in order to enhance viewing the first media asset. In addition, one or more steps of process 1800 may be incorporated into or combined with one or more steps of any other process or embodiment (e.g., process 1900, 2100, 1500, and 1600).

At step 1802, control circuitry 1004 receives, at a user input device at a first time, a first selection of a first media asset for display in a full-screen mode. For example, control circuitry 1004 may receive, via user input interface 1010, touch-screen input corresponding to selection of a first media asset, such as a NASCAR race. Control circuitry 1004 may correlate the input with a first time, such as a system time corresponding to receiving the input.

At step 1804, in response to receiving the first selection, control circuitry 1004 generates for display the first media asset in the full-screen mode. For example control circuitry 1004 may retrieve a display size (e.g., a size in pixels) from a display device accessible to control circuitry 1004, such as display 1012. Control circuitry 1004 may generate for display the first media asset such that it comprises all pixels of the display device, based on the size.

At step 1806, control circuitry 1004 receives, from the user input device at a second time, a second selection of a second media asset for display in the full-screen mode, wherein the second time is later than the first time. For example, control circuitry 1004 may receive, at user input interface 1010, user input from a Radio Frequency ("RF") remote controller. Control circuitry 1004 may identify a command sent via the RF remote controller selecting a second media asset. Control circuitry 1004 may correlate the second selection with a second time (e.g., a system time when the user input was received by the second media asset).

At step 1808, control circuitry 1004 determines whether a portion of the first media asset generated for display in the full-screen mode at a point within a time window from the second time includes important content. For example, control circuitry 1004 may identify a portion of the first media asset corresponding to a time window from the second time. For example, control circuitry 1004 may retrieve a threshold time from memory, such as storage 1008, and may add the threshold time to the second time to create an upper boundary on the time window. Control circuitry 1004 may subtract the threshold from the second time to create a lower boundary on the window. Control circuitry 1004 may identify the portion as the frames of the first media asset matching the times in the time window. Control circuitry 1004 may retrieve metadata corresponding to the first media asset and, based on the metadata, control circuitry 1004 may determine if the portion has important content using any of the methods described above. Alternatively, control circuitry 1004 may determine if the portion has important content by performing an image-processing algorithm on the frames to detect whether there is important content in the portion using any of the methods described above.

At step 1810, in response to determining that the portion of the first media asset generated for display in the full-screen mode does not include important content, control circuitry 1004 generates for display the second media asset in the full-screen mode. For example, control circuitry 1004 may generate for display (e.g., for display on display 1012) the second media asset such that it takes up the full size of the display (e.g., so that the first media asset is no longer generated or displayed).

At step 1812, in response to determining that the portion of the first media asset generated for display in the full-screen mode includes important content, control circuitry 1004 generates for display the second media asset in a partial screen window, wherein the partial screen window overlays the first media asset in the full-screen mode. For example, control circuitry 1004 may generate for display (e.g., for display on display 1012) a partial screen window overlaying content being displayed, such as the first media asset, such that the partial screen window is smaller than the size of the display. Furthermore, control circuitry 1004 may generate for display the second media asset in a position in the display (e.g., display 1012) such that the partial screen window does not block the important content of the first media asset as described above.

It is contemplated that the steps or descriptions of FIG. 18 may be used with any other embodiment of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 10-11 could be used to perform one or more of the steps in FIG. 18.

Figure 19:
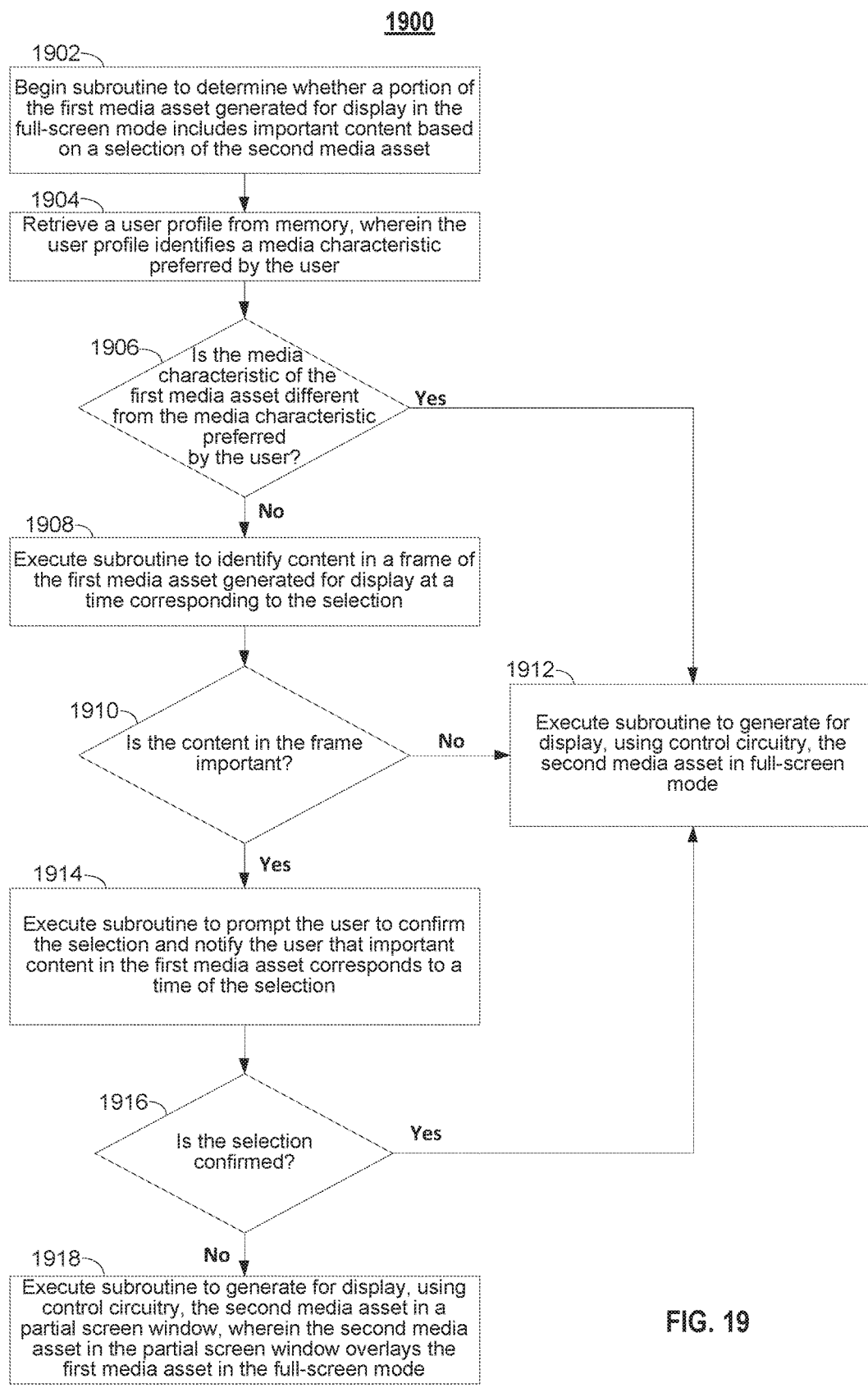
FIG. 19 is a flow-chart of illustrative steps for determining whether to generate for display a second media asset in full-screen mode based on content recognized in a first media asset in accordance with some embodiments of the disclosure.

FIG. 19 depicts a flow-chart of illustrative steps for determining whether to change display of a first media asset in full-screen mode to a second media asset. It should be noted that process 1900, or any step thereof, could be performed on, or provided by, any of the devices shown in FIGS. 10-11. For example, process 1900 may be executed by control circuitry 1004 as instructed by a media guidance application implemented on user equipment 1102, 1104, 1106 in order to enhance viewing the first media asset. In particular, the process in FIG. 19 may be performed in conjunction with step 1808 of FIG. 18 for determining whether a portion of the first media asset generated for display in the full-screen mode at a point within a time window from the second time includes important content. In addition, one or more steps of process 1900 may be incorporated into or combined with one or more steps of any other process or embodiment (e.g., process 1800, 2100, 1500, and 1600).

At step 1902, control circuitry 1004 begins a subroutine to determine whether a portion of the first media asset generated for display in full-screen mode includes important content based on a selection of the second media asset. In some embodiments, this may be done either directly or indirectly in response to a user action or input (e.g., from signals received by control circuitry 1004 or user input interface 1010). For example, the subroutine may begin directly in response to control circuitry 1004 receiving signals from user input interface 1010, or control circuitry 1004 may prompt the user to confirm their input using a display (e.g., by generating a prompt to be displayed on display 1012) prior to running the subroutine.

At step 1904, control circuitry retrieves a user profile from memory, wherein the user profile identifies a media characteristic preferred by the user. For example, control circuitry 1004 may retrieve a user profile corresponding to a user by accessing a user profile stored locally to control circuitry 1004 (e.g., on storage 1008) or remote to control circuitry 1004 on media guidance data source 1118 in accordance with the methods described above. Control circuitry 1004 may analyze the user profile to identify a media characteristic preferred by the user, such as data stored by the user indicating a preference for sporting events.

At step 1906, control circuitry 1004 determines whether a media characteristic of the first media asset is different from the media characteristic preferred by the user. For example, control circuitry 1004 may identify a media characteristic of the first media asset based on metadata received by control circuitry 1004. For example, control circuitry 1004 may detect that the first media asset is a sporting event based on the metadata. Control circuitry 1004 may compare the media characteristic of the first media asset (e.g., sporting event) to the media characteristic of interest to the user (e.g., sports). If control circuitry 1004 determines that there is a match, control circuitry 1004 proceeds to step 1912 (e.g., to determine if the portion has important sports content); if control circuitry 1004 determines that there is not a match, control circuitry 1004 proceeds to step 1908 (e.g., because the user may have a user profile setting to only notify the user of important content for sport media).

At step 1908, control circuitry 1004 executes a subroutine to identify content in a frame of the first media asset generated for display at a time corresponding to the selection. For example, control circuitry 1004 may identify a portion within a window as described above. Control circuitry 1004 may select a frame from the portion for the identifying by, for example, selecting a frame corresponding to the beginning of the portion, or by selecting a frame matching the time of the selection.

At step 1910, control circuitry 1004 determines whether content in the frame is important. For example, control circuitry 1004 may retrieve metadata corresponding to the first media asset and, based on the metadata, control circuitry 1004 may determine if the portion has important content using any of the methods described above. Alternatively, control circuitry 1004 may determine if the portion has important content by performing an image-processing algorithm on the frames to detect whether there is important content in the portion using any of the methods described above. If control circuitry 1004 determines that the frame comprises important content, control circuitry 1004 proceeds to step 1914. If control circuitry 1004 determines that the frame does not comprise important content, control circuitry 1004 proceeds to step 1912.

At step 1912, control circuitry 1004 executes a subroutine to generate for display the second media asset in full-screen mode. For example, control circuitry 1004 may identify a size of a display, such as a size of display 1012, and may generate for display the second media asset such a that the size of the second media asset generated for display matches the size of the display.

At step 1914, control circuitry 1004 executes a subroutine to prompt the user to confirm the selection and notify the user that the important content in the first media asset corresponds to a time of the selection. For example, control circuitry 1004 may generate for display a prompt, such as prompt 202 or detailed prompt 310. Control circuitry 1004 may await user confirmation of the second selection of the second media asset (e.g., by awaiting user input on user input interface 1010) at step 1916. In response to determining that the user confirms the second selection of the second media asset (e.g., the user wants to display the second media asset in full-screen instead of the first media asset), control circuitry 1004 proceeds to step 1912. In response to determining that the user does not confirm selection of the second media asset (e.g., the user wants to display the first media asset in full-screen), control circuitry 1004 proceeds to step 1918.

At step 1918, control circuitry 1004 executes a subroutine to generate for display the second media asset in a partial screen window, wherein the partial screen window overlays the first media asset in the full-screen mode. For example, control circuitry 1004 may generate for display (e.g., for display on display 1012) a partial screen window overlaying the first media asset such that the partial screen window is smaller than the size of the display. Furthermore, control circuitry 1004 may generate for display the second media asset in a position in the display (e.g., display 1012) such that the partial screen window does not block the important content of the first media asset as described above.

It is contemplated that the steps or descriptions of FIG. 19 may be used with any other embodiment of this disclosure. In addition, the steps and descriptions described in relation to FIG. 19 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 10-11 could be used to perform one or more of the steps in FIG. 20.

FIG. 20 described pseudocode to determine whether a portion of the first media asset generated for display in the full-screen mode includes important content based on a selection of the second media asset in accordance with some embodiments of the disclosure. It will be evident to one skilled in the art that the process described by the pseudocode in FIG. 20 may be implemented in any number of programming languages and a variety of different hardware, and that the style and format should not be construed as limiting, but rather a general template of the steps and procedures that would be consistent with code used to implement some embodiments of this disclosure.

At line 2001, control circuitry 1004 runs a subroutine to initialize variables and prepare to receive a user profile from memory, which begins on line 2005. For example, in some embodiments, control circuitry 1004 may copy instructions from non-transitory storage medium (e.g., storage 1008) into RAM or into a cache for processing circuitry 1006 during the initialization stage.

At line 2005, control circuitry 1004 receives a user profile from memory, wherein the user profile identifies a media characteristic preferred by the user. For example, control circuitry 1004 may access the user profile from local memory, such as storage 1008, by retrieving a pointer to an array or a user profile class identifying a location of the stored user profile in the memory. In another example, control circuitry may receive the user profile from remote storage, such as media guidance data source 1118. Control circuitry may download the user profile from the media guidance data source 1118 via communications network 1114 and may store the user profile in local memory (e.g., storage 1008) to enhance the performance of the algorithm.

At line 2007, control circuitry 1004 stores a value of a media characteristic of the first media asset in temporary variable A. In some embodiments, the value of variable A may be retrieved through an accessor method for retrieving the media characteristic of the first media asset.

At line 2008, control circuitry 1004 stores a value of a media characteristic preferred by the user in temporary variable B. In some embodiments, the value of variable B may be retrieved through an accessor method for retrieving the media characteristic of interest to the user stored in memory. In some embodiments, control circuitry 1004 may execute a subroutine for determining a media characteristic of interest to the user in accordance with some embodiments of the disclosure.

At line 2009, control circuitry 1004 stores a time of the selection of the second media asset in temporary variable C. In some embodiments, control circuitry 1004 may associate a time of the selection of the second media asset with a real time (e.g., 4:00 PM) generated by accessing a real time clock (RTC) of processing circuitry 1006. In some embodiments, control circuitry 1004 may associate the time of the selection with a local time, such as a time in ticks of a counter of processing circuitry 1006. Control circuitry 1004 may store the time in temporary variable C.

At line 2010 control circuitry 1004 stores a frame of the first media asset corresponding to time C. In some embodiments, control circuitry 1004 may execute a subroutine to capture a frame of the first media asset at time C (i.e., the time of the selection of the second media asset). In some embodiments, control circuitry 1004 may execute a subroutine to compare the time in variable C to a timeline of the first media asset. Control circuitry 1004 may select a frame in the first media asset matching time C.

At line 2012, control circuitry 1004 compares variable A to variable B to determine whether the stored values are not equal. For example, control circuitry 1004 may execute a subroutine to compare the two variables (i.e., because a direct comparison cannot be performed on non-primitive types). If the comparison is true, control circuitry proceeds to line 2013; if the comparison is false, control circuitry proceeds to line 2015.

At line 2013, control circuitry 1004 executes a subroutine to generate for display the second media asset in full-screen mode. For example, control circuitry 1004 may communicate with a display device accessible to control circuitry 1004 such as display 1012. Control circuitry 1004 may identify a size of the display (e.g., by querying the display for a size or by accessing in memory, such as storage 1008, a size of the display) and may scale the second media asset to comprise a size of the display.

At line 2015, control circuitry 1004 executes a subroutine to identify content in a frame of the first media asset, for example, control circuitry 1004 may execute an image-processing subroutine to identify content in the first media asset and may store an identification of the content in memory, such as storage 1008.

At line 2016, control circuitry 1004 determines whether the content is important. For example, control circuitry may compare the identified content to a set of data that identifies of important content types stored in a data structure in memory, such as storage 1008. If control circuitry 1004 determines that the identified content matches a content type of the set of important content types, then control circuitry 1004 may determine that the content is important. If control circuitry 1004 determines that the identified content does not matches a content type of the set of important content types, then control circuitry 1004 may determine that the content is not important. If control circuitry 1004 determines that the content is important, control circuitry 1004 proceeds to line 2017. If control circuitry 1004 determines that the content is not important, control circuitry 1004 proceeds to line 2023.

At line 2017, control circuitry 1004 executes a subroutine to prompt the user to confirm selection and to notify the user that an important content in the first media asset corresponds to the time of the selection. For example, control circuitry 1004 may generate for display a prompt such as prompt 202 or detailed prompt 310 prompting the user for a confirmation. Control circuitry 1004 may wait for user input confirming the selection via user input interface 1010. Control circuitry 1004 may buffer frames of at least one of the first and the second media asset while control circuitry 1004 is waiting for user input.

At line 2018, control circuitry determines whether the user confirmed the selection in the prompt. For example, control circuitry 1004 may receive input at input interface 1010. Control circuitry 1004 may correlate the input with a button on one of prompt 202 or detailed prompt 310. In response to determining that the input corresponds to a confirmation button, such as button change button 206, control circuitry will proceed to line 2019. In response to determining that the input corresponds to a button not confirming the selection, such as cancel button 210, control circuitry 1004 will proceed to line 2021.

At line 2019, control circuitry 1004 will execute a subroutine to generate for display the second media asset in the full-screen mode as discussed in relation to line 2013.

At line 2021, control circuitry 1004 executes a subroutine to generate for display the second media asset in a window, wherein the window overlays the first media asset in the full-screen mode. For example, control circuitry 1004 may generate for display (e.g., for display on display 1012) a partial screen window overlaying content being displayed, such as the first media asset such that the partial screen window is smaller than the size of the display. Furthermore, control circuitry 1004 may generate for display the second media asset in a position in the display (e.g., display 1012) such that the partial screen window does not block the important content of the first media asset as described above. Subsequently, control circuitry 1004 will proceed to line 2025.

At line 2023, control circuitry 1004 will execute a subroutine to generate for display the second media asset in the full-screen mode as discussed in relation to line 2013 and line 2019.

At line 2025, control circuitry 1004 will execute a termination subroutine. For example, in some embodiments control circuitry 1004 may destruct variables, perform garbage collection, free memory or clear the cache of processing circuitry 1006.

It will be evident to one skilled in the art that process 2000 described by the pseudocode in FIG. 20 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 21:
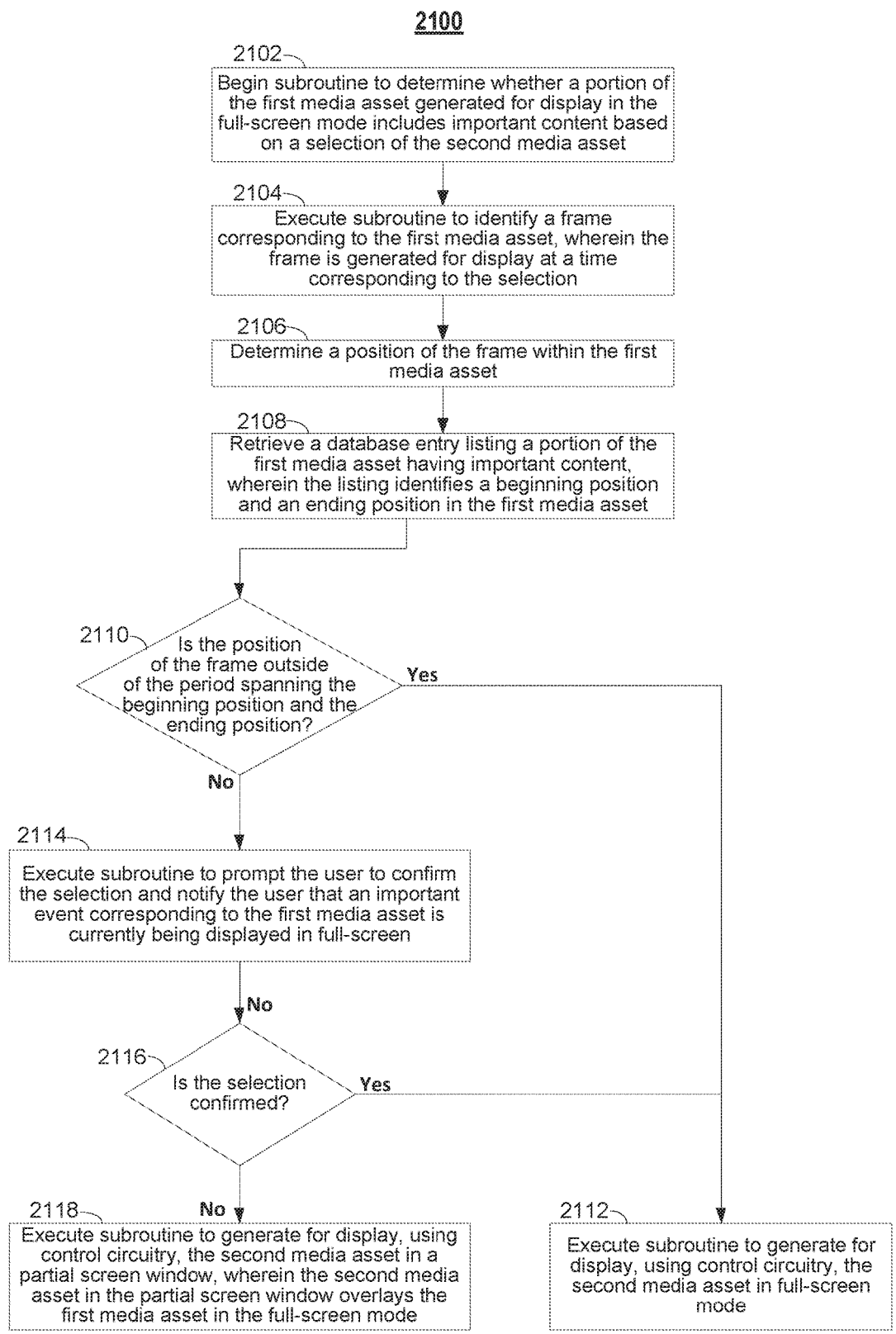
FIG. 21 is a flow-chart of illustrative steps for determining whether to generate for display a second media asset in full-screen mode based on a position of a frame of a first media asset in accordance with some embodiments of the disclosure.

FIG. 21 depicts a flow-chart of illustrative steps for determining whether to change display of a first media asset in full-screen mode to a second media asset. It should be noted that process 2100, or any step thereof, could be performed on, or provided by, any of the devices shown in FIGS. 10-11. For example, process 1900 may be executed by control circuitry 1004 as instructed by a media guidance application implemented on user equipment 1102, 1104, 1106 in order to enhance viewing the first media asset. In particular, the process in FIG. 19 may be performed in conjunction with step 1808 of FIG. 18 for determining whether a portion of the first media asset generated for display in the full-screen mode at a point within a time window from the second time includes important content. In addition, one or more steps of process 2100 may be incorporated into or combined with one or more steps of any other process or embodiment (e.g., process 1800, 1900, 1500, and 1600).

At step 2102, control circuitry 1004 begins a subroutine to determine whether a portion of the first media asset generated for display in the full-screen mode includes important content based on a selection of the second media asset. In some embodiments, this may be done either directly or indirectly in response to a user action or input (e.g., from signals received by control circuitry 1004 or user input interface 1010). For example, the subroutine may begin directly in response to control circuitry 1004 receiving signals from user input interface 1010, or control circuitry 1004 may prompt the user to confirm their input using a display (e.g., by generating a prompt to be displayed on display 1012) prior to running the subroutine.

At step 2104, control circuitry 1004 executes a subroutine to identify a frame corresponding to the first media asset, wherein the frame is generated for display at a time corresponding to the selection. For example, control circuitry 1004 may identify a time window, as described above, and may correlate the time window with the first media asset. Control circuitry 1004 may select a frame of a plurality of frames of the first media asset matching the window by, for example, selecting the first frame in the window, or by selecting the last frame in the window.

At step 2106, control circuitry 1004 determines a position of the frame within the media asset. For example, the media guidance application may determine a position of the frame in a sequence of frames corresponding to the first media asset by, for example, identifying a frame number associated with the frame, wherein the frame number corresponds to a position.

At step 2108, control circuitry 1004 retrieves a database entry listing a portion of the first media asset having important content, wherein the listing identifies a beginning position and an ending position in the first media asset. For example, control circuitry 1004 may retrieve metadata corresponding to the first media asset. For example, control circuitry 1004 may receive a JSON datagram and may detect an array of values representing a first position in the first media asset and a second position in the first media asset. Control circuitry 1004 may identify the first position as delimiting a beginning of an important portion and may identify the second position as delimiting an ending of an important portion.

At step 2110, control circuitry 1004 determines whether the position of the frame is outside of the period spanning the beginning position and the ending position. For example, control circuitry 1004 may compare the position of the frame to the first position and the second position to determine if the position is both greater than the first position and less than the second position. If false, control circuitry 1004 proceeds to step 2112; if true, control circuitry proceeds to step 2114.

At step 2112, control circuitry 1004 executes a subroutine to generate for display the second media asset in full-screen mode. For example, control circuitry 1004 may communicate with a display device accessible to control circuitry 1004 such as display 1012. Control circuitry 1004 may identify a size of the display (e.g., by querying the display for a size or by accessing in memory, such as storage 1008, a size of the display) and may scale the second media asset to comprise a size of the display.

At step 2114, control circuitry 1004 executes a subroutine to prompt the user to confirm the selection and notify the user that an important event corresponding to the first media asset is currently being displayed in full-screen. For example, control circuitry 1004 may generate for display a prompt, such as prompt 202 or detailed prompt 310. Control circuitry 1004 may await user confirmation of the selection of the second media asset (e.g., by awaiting user input on user input interface 1010).

At step 2116 control circuitry confirms whether the selection is confirmed. In response to determining that the user confirms selection of the second media asset (e.g., the user wants to display the second media asset in full-screen instead of the first media asset), control circuitry 1004 proceeds to step 2112. In response to determining that the user does not confirm selection of the second media asset (e.g., the user wants to display the first media asset in full-screen), control circuitry 1004 proceeds to step 2118.

At step 2118, control circuitry 1004 executes a subroutine to generate for display the second media asset in a partial screen window, wherein the partial screen window overlays content being displayed, such as the first media asset in the full-screen mode. For example, control circuitry 1004 may generate for display (e.g., for display on display 1012) a partial screen window overlaying the first media asset such that the partial screen window is smaller than the size of the display. Furthermore, control circuitry 1004 may generate for display the second media asset in a position in the display (e.g., display 1012) such that the window does not block the important content of the first media asset as described above.

It is contemplated that the steps or descriptions of FIG. 21 may be used with any other embodiment of this disclosure. In addition, the steps and descriptions described in relation to FIG. 21 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 10-11 could be used to perform one or more of the steps in FIG. 21.

FIG. 22 describes pseudocode to determine whether a portion of the first media asset generated for display in the full-screen mode includes important content based on a selection of the second media asset in accordance with some embodiments of the disclosure. It will be evident to one skilled in the art that the process described by the pseudocode in FIG. 22 may be implemented in any number of programming languages and a variety of different hardware, and that the style and format should not be construed as limiting, but rather a general template of the steps and procedures that would be consistent with code used to implement some embodiments of this disclosure.

At line 1701, control circuitry 1004 runs a subroutine to initialize variables and prepare to receive a user profile from memory, which begins on line 2205. For example, in some embodiments, control circuitry 1004 may copy instructions from non-transitory storage medium (e.g., storage 1008) into RAM or into a cache for processing circuitry 1006 during the initialization stage.

At line 2205, control circuitry 1004 executes a subroutine to identify a frame corresponding to the first media asset, wherein the frame is generated for display, by control circuitry, at a time corresponding to the selection. For example, control circuitry 1004 may identify a frame of the first media asset that is located within the time window as described above.

At line 2206, control circuitry 1004 determines a position of the frame within the first media asset. For example, control circuitry 1004 may identify a time relative to the first media asset for the frame. Control circuitry may use the time to identify a position within the first media asset by, for example, determining how far the time is in the first media asset (e.g., 30 minutes is a halfway point for a 1-hour movie).

At line 2207, control circuitry 1004 retrieves a database entry listing a portion of the first media asset having important content. For example, control circuitry 1004 may receive from media guidance data source 1118 via communications network 1114 the database entry. Control circuitry 1004 may identify the portion of the first media asset having the important content based on the database entry as described above.

At line 2210, control circuitry 1004 sets a temporary value A to a determined value of a position of the frame within the first media asset. Control circuitry 1004 may identify a position of the frame within the first media asset as described above.

At line 2211, control circuitry 1004 sets a temporary value B to a beginning position within the first media asset of the important content. Control circuitry 1004 may parse a database entry to identify a beginning position as the first frame of the portion of the first media asset identified by the database entry as having important content.

At line 2212, control circuitry 1004 sets a temporary value C to an ending position within the first media asset of the important content. Control circuitry 1004 may parse a database entry to identify an ending position as the last frame of the portion of the first media asset identified by the database entry as having important content.

At line 2215, control circuitry 1004 compares the value of A to the values of B and C to determine if the position of the frame is within the positions delimiting the important content. For example, control circuitry may retrieve the values of each of variable A, B, and C from memory (e.g., storage 1008) and may compare the values to determine if A is within the span of B and C. In response to determining that A is not within the span of B and C, control circuitry 1004 proceeds to line 2216. In response to determining that A is within the span of B and C, control circuitry 1004 proceeds to line 2219.

At line 2216, control circuitry 1004 executes a subroutine to generate for display the second media asset in full-screen mode. For example, control circuitry 1004 may communicate with a display device accessible to control circuitry 1004 such as display 1012. Control circuitry 1004 may identify a size of the display (e.g., by querying the display for a size or by accessing in memory, such as storage 1008, a size of the display) and may scale the second media asset to comprise a size of the display.

At line 2218, control circuitry 1004 executes a subroutine to prompt the user to confirm the selection. For example, control circuitry 1004 may generate for display a prompt such as prompt 202 or detailed prompt 310 prompting the user for a confirmation. Control circuitry 1004 may wait for user input confirming the selection via user input interface 1010.

At line 2219, control circuitry determines whether the user confirmed the selection in the prompt. For example, control circuitry 1004 may receive input at input interface 1010. Control circuitry 1004 may correlate the input with a button on one of prompt 202 or detailed prompt 310. In response to determining that the input corresponds to a confirmation button, such as button change button 206, control circuitry will proceed to line 2019. In response to determining that the input corresponds to a button not confirming the selection, such as cancel button 210, control circuitry 1004 will proceed to line 2021.

At line 2220, control circuitry 1004 will execute a subroutine to generate for display the second media asset in the full-screen mode as discussed in relation to line 2216.

At line 2222, control circuitry 1004 executes a subroutine to generate for display the second media asset in a partial screen window, wherein the partial screen window overlays content being displayed, such as the first media asset in the full-screen mode. For example, control circuitry 1004 may generate for display (e.g., for display on display 1012) a window overlaying the first media asset such that the partial screen window is smaller than the size of the display. Furthermore, control circuitry 1004 may generate for display the second media asset in a position in the display (e.g., display 1012) such that the window does not block the important content of the first media asset as described above. Subsequently, control circuitry 1004 will proceed to line 2224.

At line 2224, control circuitry 1004 will execute a termination subroutine. For example, in some embodiments control circuitry 1004 may destruct variables, perform garbage collection, free memory or clear the cache of processing circuitry 1006.

It will be evident to one skilled in the art that process 2200 described by the pseudocode in FIG. 22 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. Furthermore, it should be noted that while a first step may be based on and/or in response to a second step, such a relationship does not preclude additional steps occurring between the first and second steps. In addition, the systems and methods described herein may be performed in real time. It should also be noted, the systems and/or methods described above may be applied to, or used in accordance with, other systems and/or methods. The processing described above can be performed on user equipment and also performed at a server in whole or in conjunction with processing performed at the user equipment.

What is claimed is:

1. A method for enhancing a media viewing experience of a user, the method comprising:
   receiving, from a user input device, at a first time, a first selection of a first media asset for display on a first display device associated with a first user equipment device;
   in response to receiving the first selection, generating for display, at the first user equipment device, the first media asset on the first display device;
   detecting, at a second time, a user action preventing a viewing of the first media asset;
   in response to detecting the user action:
      retrieving data associated with a portion of the first media asset within a time window following the second time;
      retrieving from memory a criterion characterizing important content in media;
      determining that the portion of the first media asset includes important content in response to determining that the retrieved data associated with the portion matches the criterion;
   in response to determining that the portion of the first media asset generated for display on the first display device includes important content:
      searching a database comprising a plurality of user equipment devices for a second user equipment device of the plurality of user equipment devices that matches a unique identifier associated with the user;
      in response to identifying the second user equipment device matching the unique identifier, querying the second user equipment device for a listing of authorization data associated with the second user equipment device;
      determining whether the authorization data associated with the second user equipment device matches authorization requirements associated with the portion of the first media asset; and
      in response to determining that the authorization data associated with the second user equipment device matches authorization requirements associated with the portion of the first media asset, generating for display on a second display device associated with the second user equipment device, the portion of the first media asset.

2. The method of claim 1, wherein determining that the portion of the first media asset includes important content comprises:
   receiving metadata corresponding to the first media asset, wherein the metadata identifies content corresponding to the portion;
   retrieving, from a database, a set of criterion that identifies important content types;
   comparing the content corresponding to the portion to the set of important content types to determining whether the content corresponding to the portion matches an important content type from the set;
   determining that the portion of the first media asset includes important content when the content corresponding to the first media asset matches the important content from the set; and
   determining that the portion of the first media asset does not include important content when the content corresponding to the first media asset does not match the important content type from the set.

3. The method of claim 1, wherein determining that the portion of the first media asset includes important content comprises:
receiving metadata corresponding to the first media asset, wherein the metadata identifies an important portion of the first media asset, wherein a beginning of the important portion is delimited by a first position in the first media asset, and wherein an ending of the important portion is delimited by a second position in the first media asset, later than the first position;
identifying a third position in the first media asset corresponding to the second time;
comparing the third position to the first and the second position to determine whether the third position is within the important portion;
determining that the portion of the first media asset includes important content when third position is within the important portion; and
determining that the portion of the first media asset does not include important content when the third position is not within the important portion.

4. The method of claim 1, wherein determining that the portion of the first media asset includes important content comprises:
retrieving a frame of the first media asset generated for display on the first display device at the point within the time window from the second time;
analyzing the frame to determine whether a characteristic of the frame matches an image-processing rule;
determining that the portion of the first media asset includes important content when the characteristic of the frame matches the image-processing rule; and
determining that the portion of the first media asset does not include important content when the characteristic of the frame does not match the image-processing rule.

5. The method of claim 4, wherein the image-processing rules correspond to one of detecting fast action within the frame, identifying text matching a predefined string, and identifying an object having significance to the user.

6. The method of claim 1, wherein determining that the portion of the first media asset includes important content comprises:
retrieving a user profile from memory;
identifying a preference from the user profile, wherein the preference identifies a media characteristic of interest to the user;
retrieving metadata corresponding to the first media asset, wherein the metadata comprises a set of media characteristics corresponding to the first media asset;
determining whether the media characteristic of interest to the user matches a media characteristic of the set of media characteristics;
determining that the portion of the first media asset includes important content when the media characteristic of interest to the user matches the media characteristic of the set of media characteristics; and
determining that the portion of the first media asset does not include important content when the media characteristic of interest to the user does not match the media characteristic of the set of media characteristics.

7. The method of claim 1, wherein detecting the user action preventing the viewing of the first media asset comprises:
determining, at the first time, that the second user equipment device is within a first distance of the first user equipment device, wherein the first distance is less than a threshold maximum distance between the first user equipment device and the second user equipment device;
determining, at the second time, that the second user equipment device is within a second distance of the first user equipment device, wherein the second distance is greater than the threshold maximum distance between the first user equipment device and the second user equipment device;
detecting the user action preventing the viewing responsive to determining that the second distance is greater than the threshold maximum distance.

8. The method of claim 1, wherein detecting the user action preventing the viewing of the first media asset comprises receiving, at the first user equipment device, selection of a second media asset, wherein generating for display the second media asset, at the first display device, prevents the viewing, by the user, of the first media asset.

9. The method of claim 1, further comprising:
retrieving a user profile from memory;
based on the user profile, identifying the second user equipment device from a plurality of user equipment devices associated with the user;
retrieving, from the second user equipment device, data identifying a plurality of content providers accessible to the user via the second user equipment device; and
identifying a content provider of the plurality of content providers that is capable of providing access to the first media asset via the second user equipment device.

10. The method of claim 9, wherein generating for display on a second display device associated with the second user equipment device, the portion of the first media asset further comprises:
requesting, from the content provider, the portion of the first media asset;
receiving, over a network connection, the portion of the first media asset from the content provider; and
generating for display on the second display device the portion of the first media asset received from the content provider.

11. A system for enhancing a media viewing experience of a user, the system comprising:
input circuitry configured to receive, at a first time, a first selection of a first media asset for display on a first display device associated with a first user equipment device; and
control circuitry configured to:
in response to receiving the first selection at the input circuitry, generate for display, at the first user equipment device, the first media asset on the first display device;
detect, at a second time, a user action preventing a viewing of the first media asset;
in response to detecting the user action:
retrieve data associated with a portion of the first media asset within a time window following the second time;
retrieve from memory a criterion characterizing important content in media;
determine that the portion of the first media asset includes important content in response to determining that the retrieved data associated with the portion matches the criterion;
in response to determining that the portion of the first media asset generated for display on the first display device includes important content:

search a database comprising a plurality of user equipment devices for a second user equipment device of the plurality of user equipment devices that matches a unique identifier associated with the user;

in response to identifying the second user equipment device matching the unique identifier, query the second user equipment device for a listing of authorization data associated with the second user equipment device;

determine whether the authorization data associated with the second user equipment device matches authorization requirements associated with the portion of the first media asset; and in response to determining that the authorization data associated with the second user equipment device matches authorization requirements associated with the portion of the first media asset, generate for display on a second display device associated with the second user equipment device, the portion of the first media asset.

12. The system of claim 11, wherein the control circuitry configured to determine that the portion of the first media asset includes important content is further configured to:

receive metadata corresponding to the first media asset, wherein the metadata identifies content corresponding to the portion;

retrieve, from a database, a set of criterion that identifies important content types;

compare the content corresponding to the portion to the set of important content types to determining whether the content corresponding to the portion matches an important content type from the set;

determine that the portion of the first media asset includes important content when the content corresponding to the first media asset matches the important content from the set; and determine that the portion of the first media asset does not include important content when the content corresponding to the first media asset does not match the important content type from the set.

13. The system of claim 11, wherein the control circuitry configured to determine that the portion of the first media asset includes important content is further configured to:

receive metadata corresponding to the first media asset, wherein the metadata identifies an important portion of the first media asset, wherein a beginning of the important portion is delimited by a first position in the first media asset, and wherein an ending of the important portion is delimited by a second position in the first media asset, later than the first position;

identify a third position in the first media asset corresponding to the second time;

compare the third position to the first and the second position to determine whether the third position is within the important portion;

determine that the portion of the first media asset includes important content when third position is within the important portion; and determine that the portion of the first media asset does not include important content when the third position is not within the important portion.

14. The system of claim 11, wherein the control circuitry configured to determine that the portion of the first media asset includes important content is further configured to:

retrieve a frame of the first media asset generated for display on the first display device at the point within the time window from the second time;

analyze the frame to determine whether a characteristic of the frame matches an image-processing rule;

determine that the portion of the first media asset includes important content when the characteristic of the frame matches the image-processing rule; and determine that the portion of the first media asset does not include important content when the characteristic of the frame does not match the image-processing rule.

15. The system of claim 14, wherein the image-processing rules correspond to one of detecting fast action within the frame, identifying text matching a predefined string, and identifying an object having significance to the user.

16. The system of claim 11, wherein the control circuitry configured to determine that the portion of the first media asset includes important content is further configured to:

retrieve a user profile from memory;

identify a preference from the user profile, wherein the preference identifies a media characteristic of interest to the user;

retrieve metadata corresponding to the first media asset, wherein the metadata comprises a set of media characteristics corresponding to the first media asset;

determine whether the media characteristic of interest to the user matches a media characteristic of the set of media characteristics;

determine that the portion of the first media asset includes important content when the media characteristic of interest to the user matches the media characteristic of the set of media characteristics; and determine that the portion of the first media asset does not include important content when the media characteristic of interest to the user does not match the media characteristic of the set of media characteristics.

17. The system of claim 11, wherein the control circuitry configured to detect the user action preventing the viewing of the first media asset is further configured to:

determine, at the first time, that the second user equipment device is within a first distance of the first user equipment device, wherein the first distance is less than a threshold maximum distance between the first user equipment device and the second user equipment device;

determine, at the second time, that the second user equipment device is within a second distance of the first user equipment device, wherein the second distance is greater than the threshold maximum distance between the first user equipment device and the second user equipment device;

detect the user action preventing the viewing responsive to determining that the second distance is greater than the threshold maximum distance.

18. The system of claim 11, wherein the control circuitry configured to detect the user action preventing the viewing of the first media asset is further configured to receiving, at the first user equipment device, selection of a second media asset, wherein generating for display the second media asset, at the first display device, prevents the viewing, by the user, of the first media asset.

19. The system of claim 11, wherein the control circuitry is further configured to:

retrieve a user profile from memory;

based on the user profile, identify the second user equipment device from a plurality of user equipment devices associated with the user;

retrieving, from the second user equipment device, data identifying a plurality of content providers accessible to the user via the second user equipment device; and identifying a content provider of the plurality of content providers that is capable of providing access to the first media asset via the second user equipment device.

20. The system of claim 11, wherein the control circuitry configured to generate for display on a second display device associated with the second user equipment device, the portion of the first media asset is further configured to:

request, from the content provider, the portion of the first media asset;

receive, over a network connection, the portion of the first media asset from the content provider; and generate for display on the second display device the portion of the first media asset received from the content provider.

\* \* \* \* \*